US012578086B2

(12) United States Patent
Spiro

(10) Patent No.: US 12,578,086 B2
(45) Date of Patent: Mar. 17, 2026

(54) ADAPTIVE LIGHTING SYSTEM, METHOD AND COMPUTER PROGRAM PRODUCT

(71) Applicant: Exposure Illumination Architects, Inc., Scottsdale, AZ (US)

(72) Inventor: Daniel S. Spiro, Scottsdale, AZ (US)

(73) Assignee: EXPOSURE ILLUMINATION ARCHITECTS, INC., Scottsdale, AZ (US)

( * ) Notice: Subject to any disclaimer, the term of this patent is extended or adjusted under 35 U.S.C. 154(b) by 0 days.

(21) Appl. No.: 19/094,189

(22) Filed: Mar. 28, 2025

(65) Prior Publication Data

US 2025/0305668 A1 Oct. 2, 2025

Related U.S. Application Data

(60) Provisional application No. 63/571,885, filed on Mar. 29, 2024.

(51) Int. Cl.

*F21V 23/04* (2006.01)
*F21V 19/04* (2006.01)
*F21V 23/00* (2015.01)

(52) U.S. Cl.

CPC .......... *F21V 23/0442* (2013.01); *F21V 19/04* (2013.01); *F21V 23/003* (2013.01); *F21V 23/0435* (2013.01)

(58) Field of Classification Search

CPC .... F21V 23/0442; F21V 19/04; F21V 23/003; F21V 23/0435

See application file for complete search history.

(56) References Cited

U.S. PATENT DOCUMENTS

| | | | |
|---|---|---|---|
| 1,883,621 | A | 10/1932 | D'Olier Jr. |
| 1,891,756 | A | 12/1932 | Olier, Jr. |
| 3,985,417 | A | 10/1976 | Fenton |
| 4,645,286 | A | 2/1987 | Isban et al. |
| 4,645,289 | A | 2/1987 | Isban |
| 6,146,191 | A | 11/2000 | Kerr, Jr. et al. |
| 6,210,018 | B1 | 4/2001 | Kassay et al. |
| 8,939,634 | B2 | 1/2015 | Leadford et al. |
| 9,574,750 | B1 | 2/2017 | Hetrick |
| 9,626,847 | B2 | 4/2017 | Spiro |
| 9,990,817 | B2 | 6/2018 | Spiro |
| 10,323,824 | B1 | 6/2019 | Lim et al. |
| 11,050,230 | B1 | 6/2021 | Gretz |

(Continued)

FOREIGN PATENT DOCUMENTS

WO 2021/046108 A1 3/2021

OTHER PUBLICATIONS

Office Communication (PCT Article 17(3)(a) and Rule 40.1 and 40.2(e)) issued on Jan. 30, 2025, in corresponding International application No. PCT/IB2024/061185, 15 pages.

(Continued)

*Primary Examiner* — Bryon T Gyllstrom
(74) *Attorney, Agent, or Firm* — XSENSUS LLP

(57) ABSTRACT

An orientation specific lens coupled to a light emitting device suspended above an elongated space configured to illuminate specific horizontal and vertical subfields of the elongate space, producing illumination uniformity ratios. An AI engine and remote communications assist the lighting source to serve as an intelligence egress path according to various operational conditions.

20 Claims, 32 Drawing Sheets

(56) References Cited

U.S. PATENT DOCUMENTS 11,149,936 B2 10/2021 Spiro
11,573,005 B1 * 2/2023 Spiro ........................ F21V 23/06
11,629,852 B1 * 4/2023 Spiro .................. G09F 13/0413 362/311.01
11,788,692 B1 * 10/2023 Spiro .................... F21V 23/009 362/20
11,892,148 B2 * 2/2024 Vancorenland ....... F21V 14/003
12,085,274 B1 9/2024 Spiro
2009/0059602 A1 3/2009 Santos et al.
2010/0270933 A1 10/2010 Chemel et al.
2010/0296285 A1 11/2010 Chemel et al.
2011/0121654 A1 * 5/2011 Recker ................... H05B 47/19 307/64
2012/0026726 A1 * 2/2012 Recker ................... H05B 47/13 362/157
2012/0307503 A1 12/2012 Wilcox et al.
2014/0376220 A1 12/2014 Shen et al.
2016/0348855 A1 12/2016 Zampini
2016/0365691 A1 12/2016 Khazeni
2017/0175953 A1 6/2017 Van Boven et al.
2017/0231061 A1 * 8/2017 Deese .................. G06V 10/751
2017/0257925 A1 9/2017 Forbis et al.
2018/0188018 A1 * 7/2018 Brown ................. H05B 47/115
2018/0231200 A1 8/2018 Hierzer
2018/0292071 A1 10/2018 Tarsa et al.
2019/0013658 A1 1/2019 Thomas
2019/0338917 A1 11/2019 Chen et al.
2021/0108771 A1 * 4/2021 Park ..................... A61N 5/0613
2021/0254820 A1 8/2021 Spiro
2022/0034497 A1 * 2/2022 Spiro ...................... F21V 29/74
2022/0243741 A1 8/2022 Wang
2025/0275041 A1 * 8/2025 Feit ........................ H05B 47/17

OTHER PUBLICATIONS

International Search Report and Written Opinion issued Oct. 14, 2022 in corresponding International Patent Application No. PCT/US2022/36938, 11 pages.

U.S. Appl. No. 18/433,140, filed Feb. 5, 2024 in the name of Exposure Illumination Architects, Inc.

* cited by examiner

ADAPTIVE LIGHTING SYSTEM, METHOD AND COMPUTER PROGRAM PRODUCT

CROSS REFERENCE TO RELATED PATENT APPLICATION

The present application claims the benefit of the earlier filing date of U.S. provisional application No. 63/571,885, filed Mar. 29, 2024, the entire contents of which being incorporated herein by reference.

BACKGROUND

Technical Field

The present disclosure relates to luminaires, and more particularly luminaires that illuminate vertical and horizontal surfaces, as well as luminaires that have built in computer intelligence that can adaptively illuminate paths of egress.

Discussion of Background

Low and high bay luminaires are often mounted at mounting heights that typically range between 15 feet and 50 feet above a finished floor. Today, the most common luminaire light source is based on a set of light emitting diodes (LEDs). The LED light source is planar and hosts an array of individual LEDs, with the light emitted from this planar LED light source directed toward the floor below. The luminaire is typically suspended from a structure above by cables, chains, or a conduit.

As discussed in U.S. patent application Ser. No. 18/401,448 (see FIG. 1a and FIG. 1b therein), the entire contents of which is incorporated herein by reference, inefficiencies exist with present-day vertical illumination provided by low and highbay luminaires when mounted above an elongated space such as a racked aisle. FIG. 1a of U.S. patent application Ser. No. 18/401,448 is for one main brand highbay luminaire, and FIG. 1b of U.S. patent application Ser. No. 18/401,448 is for another main brand luminaire. The racked aisle is an elongated space with at least one vertical surface, and the figures are shown from the perspective of facing the one vertical surface, with a person walking in an aisleway which runs from left to right in the figures. Two luminaires are shown suspended above the racked aisle spaced apart by a distance. The luminaire's height from the floor is H1, and H2 is the top edge of the vertical surface of the rack illuminated by the luminaires. These figures show that the highest vertical light levels emitted by the luminaire across the face of the vertical plane occurs well above an adult human eye level, contrary to where it should be. A band of higher light intensity should extend above and below the adult human eye level, in a range, along the length of the face of the vertical surface. Herein, the range is an inclusive range of 3' above the finished floor 1 to 7' above the finished floor 1—this range of 3' to 7' is sometimes referred to herein as "the inclusive range" and is intended to cover a height above finished floor of the aisleway on the vertical surface that defines one side of the aisleway, the vertical surface usually being racks of goods, or a wall. A portion of the energy (region 6*a*) associated with the exceedingly intense light levels is wasteful. Further, the human eye is configured to home in on well-lit surfaces. As a result, surfaces within the range in these figures is relatively dim.

These figures also show a poor vertical uniformity ratio between maximum light levels that occur in a region in which light levels exceed 60% of a target, and minimum light levels in a region in which light is below 60% of a target. Most striking is the relatively short distance between an intense light level surface and a dim lit surface nearby. According to the IESNA guidebook for indoor illumination, an acceptable ratio between maximum to minimum light levels is 3:1. The present figures exceed this ratio as is evident from light levels seen in Tables 1 and 2, as will be discussed below.

The building egress code in the US was amended in 2022. Most notably, section UL924 governing emergency lighting relays and UL1008 governing transfer switches were amended. As a result, today the building code allows for:

a. Remote back-up power conveyance to an emergency lighting device through a line voltage conductor.
b. An activation of an emergency lighting device can be triggered wirelessly.
c. Diagnostic of the operational condition of an emergency lighting device can be done wirelessly.
d. A controller can govern a transfer switch where control over emergency lighting can be a scene among several scenes governed by the controller.
e. The controller recognizes only two primary conditions. First, all power consuming devices operate under house power. Second, only power consuming devices associated with emergency conditions are powered. The controller discerns when house power is interrupted and activates the transfer switch accordingly.

These changes significantly alter the design of emergency lighting devices' architecture primarily for systems that are powered by remote back-up power. Remote back-up systems include inverters and generators. For the end user, the changes in code will ultimately result in reduced emergency lighting installed cost. The changes are likely to maintain building means of egress lighting in better conditions as the technology associated with the new changes can automate the diagnostic reporting of the operational condition of an egress device in a building.

For non-residential "legal means of egress", building codes require visual signage designating the location of a legal egress door and corresponding signage directing occupants toward the legal egress door, which is identifiable by an exit sign luminaire. In addition, when house power is interrupted, building codes require an illumination of a path (means of egress) to guide occupants to the legal egress door. This illuminated egress path shines on the floor below a luminaire (the source of the light) and is referred to herein as an egress luminaire. Some conventional egress luminaires can also couple to an audio and testing device. Together, the exit sign luminaire and the egress luminaire constitute a non-residential building illuminated means of legal egress.

For decades, manufacturers of lighting means of egress have relied on incandescent and fluorescent light sources in egress luminaires to provide the egress path of illumination, while LED light sources have been the common light source for exit sign luminaires. To a large degree, the form of the egress luminaire has been dictated by the form factor of the light source. For example, an egress luminaire employing a halogen MR16 lamp requires at least one 2" diameter aperture 2" deep. The inefficient light source power consumption of this type of lighting required a sizeable housing to retain a battery therein. To meet building code requirements in the U.S., the luminaire battery is to maintain the light for a minimum of ninety minutes.

Further, the light source includes optical lenses that could not easily be of scale and shape to efficiently collect and direct the light so as to illuminate a uniform linear path of egress. Moreover, the luminaire's light source/s required manual aiming. The limitation of the dated egress lighting technology translated into short luminaire spacing, which in turn contributed to additional labor, material, and maintenance costs.

With the advent of a planar LED light source, the form factor of the egress path light source and luminaire can be significantly reduced. Compared with the dated incandescent light source, the LED light source is at least five times more efficient. As a result, the power storage demands on the egress luminaire with an integral battery has been reduced by at least 80%. As recognized by the present inventor, pairing the efficient planar LED light source with advances in optical technology efficiencies can contribute to wider egress luminaire spacing with light better uniformity along the path of egress.

Finally, as recognized by the present inventor, advances in computer coding techniques and hardware developments in device integration have made possible today for building means of egress to become better suited to protect life and property. Example integrated devices include Internet-of-things (IOT) devices. The totality of the technological advancements underscore a need to re-examine the form and functionality of present-day building means of egress.

Technical Problems

As recognized by the present inventor, a deficiency of present-day luminaires installed in elongated spaces (such as over aisleways) is that the emitted light forms “hot spots” over the vertical surfaces that define the elongated space. The light emitted is cast on surfaces well above eye level for an adult human, and thus is not distributed in an efficient manner. Furthermore, another issue of ceiling-supported luminaires is their respective spacing because ineffective spacing often results in uncomfortable glare as experienced by occupants in the aisleway.

In view of the above, there are four primary constraints that architects, engineers, and lighting designers face when designing the illumination of elongated spaces with low and high bay luminaires. These constraints include:

1. Luminaire selection is decided based on light dispersion patterns dictated by the luminaire’s form, thus limiting the selection of luminaire/s due to their form.
2. More than one mounting point to a support structure is required for most luminaires.
3. Inability to illuminate horizontal and vertical surfaces with a high degree of uniformity, regardless of the luminaire’s form.
4. The most intense light falls on a portion of a vertical surface that is well above an adult human’s eye level, and with some applications a portion of the light emitted is perceived as direct glare.

Further issues include a lack of adaptability to use overhead lights, such as high bay lights, for illuminating paths of egress, under varying conditions, such as adapting to the presence of an active shooter or blocked aisleway conditions. Furthermore, there is a lack of adjustability when installing such lights to allow for self-alignment in an aisleway.

Solutions

According to one non-limiting aspect of the present disclosure, the present innovation solves the luminaire form driven optical constraints by introducing orientation specific optical lens/es over the LED light source/s. The use of orientation specific optics can be comprised in conjunction with at least one of, a mechanical orientation mounting device and a heat dissipating structure with coupled light sources and optical lens/es configured to rotate horizontally about a driver housing.

Consistent with the prior applications, the present application describes and shows an orientation specific luminaire suspended from a support structure adjacent to at least one vertical surface. The orientation specific luminaire comprises a housing that supports a lamp, the housing including a downward facing side that faces a floor of an elongated space, and has a predetermined orientation set in relation to at least one of a longitudinal axis of the elongated space and the first vertical surface that defines a first side of the elongated space. The elongated space described herein is referred to as the aisle.

A lamp comprising a plurality of light sources that are distributed across the planar structure is covered by at least one lens, and the lens disposed over the plurality of light sources directs the light emitted from the plurality of light sources to provide directional light that illuminates a plurality of vertical subfields distributed along the first vertical surface and across a plurality of horizontal illuminated subfields distributed along at least one of the floors of the aisle and a specified height above the floor of the aisle.

The first vertical surface includes an inclusionary range subfield that extends at least a portion of the length of an aisle. The inclusionary range subfield can be defined as a longitudinal area with a vertical midpoint that can be located 2'-0" above and 2'-0" below the average adult human eye level. In the present application, an adult human eye level is defined as 5'-0" as vertically measured on a surface of the first vertical surface above an aisle floor. While the vertical height of the midpoint of the inclusionary range subfield above the surface the aisle floor can remain at or in the proximity to 5'-0" adult human eye level mark.

The height of the bottom and/or the top boundaries of the inclusionary range subfield from the aisle floor can vary. The height of the inclusionary range boundaries from the aisle’s floor can be defined as the distance an adult human cone of vision extends up and down from an adult human facing a first vertical surface of an aisle, wherein the adult human eyes are perpendicular to the first vertical surface. The 2'-0" top and bottom range boundaries are common to racked merchandising displays.

The orientation specific luminaire is configured to support a lamp with at least one of symmetrical and asymmetrical lensed optics. The lamp coupled to the down facing side that faces the floor can provide space ambient illumination. In addition, at least one second lamp can be oriented in the opposite direction to the downward facing lamp. The second lamp, while also providing ambient illumination, can be configured to illuminate at least one surface above the luminaire. The second lamp can be disposed above the down facing lamp that illuminates at least one of a floor and a floor and at least one first surface.

The orientation specific luminaire can also be configured to support at least one egress lamp emitting at least one of a linear light emittance pattern. The egress lamp can be supported by the downward facing side of the housing. At least one egress lamp coupled to the downward facing side of the housing can rotate about its vertical axis. The central longitudinal axis of the linear light emittance pattern of the egress lamp emitted light is configured to align with a longitudinal central axis of a path of egress below the orientation specific luminaire.

Both the ambient lighting lamp and the egress lighting lamp can be controlled. The control of these light sources and their associated electronic devices can be by wire and/or wirelessly. At least one device coupled to an orientation specific luminaire can have a unique digital address. At least one wireless communication device can provide point to point or mashed network connectivity. A microprocessor with code coupled to at least one of the ambient lighting lamp and the egress lighting lamp can be configured to perform at least one of monitoring, testing, reporting, and alerting a remote client about the operational condition of an ambient and/or egress lighting lamp.

Prior orientation specific luminaire applications of the present family described advances in optical lens design that enable directing light to subfields where needed at the right illumination intensity. The applications also described several benefits associated with incorporating novel egress lamp technology with an ambient lighting orientation specific luminaire. The present application expands on novel illumination ratios that contribute to reducing power consumption while improving visual acuity and other utilities resulting from incorporating egress illumination with ambient illumination in one orientation specific luminaire.

To enable self-reporting, the controller may be coupled (directly via hardwire, or wireless) to a controllable transfer switch with access to a back-up power supply. The controller uses RF communications (e.g., Wi-fi, LTE, 5G, Bluetooth, wireless LAN such as IEEE 802.11 compliant networks that use a set of medium access control (MAC) and physical layer (PHY) specifications for implementing Wireless Local Area Network (WLAN) communication). The controller communicates wirelessly with other devices in other luminaires, IoT devices, power supplies, controllers and the like via determined networks or ad-hoc communication networks such as IEEE 802.15 compliant networks (e.g., P802.15.15). The controller includes a wireless transceiver that directly, or via one or more relays, convey message traffic and data communicating signal to remotely, and uniquely, addressable devices. The device address can be generic that results in activation of a plurality of devices that are set apart, or an individual device address or devices located within a defined zone. One network approach is the use of the wireless LAN, although a meshed network is also applicable since it allows for the adaptation and optimization of communication traffic among devices, even as new device are brought on-line, removed from the network, or possibly subject to channel interference due to signal path blockage, multi-path, etc.

In a most basic configuration, the desired elements on board the local emergency lighting device include a communication device (transceiver) coupled to one or more processor with control code (stored in a memory) and a controllable switch (e.g., a microswitch). The system controller referred herein as the "client" can then exchange signals via the communication device with the local emergency lighting device. Once received, the signal is detected and conveyed to the processor(s) which in turn switches the microswitch to turn on the emergency light source as directed by the remote client controller. The emergency lighting device can be a stand-alone device or can be coupled to an ambient lighting device.

Other solutions are provided throughout the detailed description that follows.

Adding intelligent processing circuitry to the luminaires, such as processing circuitry with wireless communication capability to bi-directionally communicate information with a remote client allows for further flexibility. Likewise, having the processing circuitry implement a self-learning AI engine provides adaptability to a lighting network (a series of luminaires that are individually addressable and controllable), especially when adjusting for obstructions in aisleways when the lighting network is responsible for providing an illumination of a path of egress.

SUMMARY

According to an aspect, the directional lighting aspects of the present disclosure (as shown in FIGS. **1-9*d*, and discussed below) may be mountable in a self-adjusting mounting structure (as shown and discussed with respect to FIGS. 10-18), and may also include programmable electronics and host lighting platforms that include Artificial Intelligence (AI) capabilities (as shown and discussed with respect to FIGS. 19-29** for example).

According to an aspect of the present disclosure, an orientation specific lensed optics disposed over a light source of a luminaire illuminates vertical and horizontal surfaces regardless of the luminaire form. The luminaire is coupled to a mounting device and the mounting device is free to rotate about its vertical axis to align the luminaire with other like luminaires and/or room geometry while the mounting device is coupled to a structure above by a single point of attachment.

The Orientation Specific Luminaire-Illuminating elongated spaces such as narrow walkways with adjacent high vertical surface/s is known to be difficult. The orientation specific luminaire is designed to overcome this illumination difficulty. The orientation specific luminaire is coupled to a plurality of lenses. The luminaires lenses' optical design enables illuminating surfaces within elongated spaces no matter the space geometry.

Within the elongated space, mounting the orientation specific luminaire coupled to the lensed optics requires orienting the luminaire in relation to at least one vertical surface. The orientation of the luminaire can take place when a luminaire light source is electrified or unelectrified.

Orienting the luminaire can be done by directly coupling the luminaire to a support structure with optimal mounting orientation or by employing an intermediate orientation device/s. The intermediate orientation device/s can be coupled to the luminaire's support structure and/or to the luminaire.

The Luminaire's Light Source—The luminaire's light source can include a plurality of planar LED lamps that couple to a retaining surface. The retaining surface can be a planar board or a luminaire planar surface that faces the floor below. Most commonly, the planar board with a plurality of LED lamps is configured to couple the luminaire's planar surface that faces the floor below.

The plurality of the coupled lamps is arranged on at least one planar surface in substantially the same orientation. The lamps arranged on the retaining planar surface can be configured in at least one of, a concentric and an orthogonal fashion. The retaining planar surface can be square, round, rectangular, or any irregular form. The lamps' size, form, luminosity, chromaticity, color temperature, and input power can be substantially the same. In at least one embodiment, a lamp/s with at least one different property and/or functionality can couple to the retaining planar surface.

The Luminaire's Lensed Optics—At least two optical lenses can be placed over at least two lamps that are coupled to a planar lamp retaining surface. As will be discussed herein, the lenses can have 3D structure the produce pre-configured optical light emittance properties. The lenses can be configured as a stand-alone structure that is placed over a single LED lamp, or as a structure that can include a plurality of lenses that are dedicated to and placed over a plurality of LED lamps. The latter structure can be shaped to complement the form of the lamp retaining planar surface.

All or the plurality of the floor facing orientation specific luminaire's lenses can employ substantially the same optics above the same plurality of lamps. The light emittance pattern of the lenses is configured to illuminate at least one vertical surface and one horizontal surface below. The illuminance light level intensity over any one surface within the elongated space is determined by the number of lamps coupled to the planar retaining surface with dedicated lenses above.

The lenses are configured to direct the lamp's light in a specific light emittance pattern. In an elongated space, the horizontal light transmittance pattern is generally rectangular, wherein the central longitudinal axis of the generated pattern typically coincides with the central longitudinal axis of an aisle or a corridor.

The intensity of the light emitted through the plurality of lenses can be directed toward different regions of the elongated space surfaces. Typically, the light level and illumination uniformity ratio for an elongated walkway surface, disregarding power consumption efficacy, can be accomplished rather easily. Not so for vertical illuminance.

The average adult human eye level is approximately 5'-0" above floor. The eyes of a person looking forward in an elongated space land on vertical surfaces that are approximately 30° above and below the person's eye. Hence, the illuminance of the vertical surface/s 2'-0" above and below the human eye must be higher than other illuminance levels on the same vertical surface beyond the stated range.

Furthermore, it has been established among persons trained in the art of illumination that high light emittance angles exceeding 45° from a luminaire nadir constitute offensive glare angle. The person traversing an elongated space subject to high glare angles will experience visual discomfort and compromised visual acuity. The present innovation lens design is configured to include directing a lamp light where needed at the specified intensity and reducing or eliminating luminaire emitted offensive glare angles in an elongated space.

The present application describes an orientation specific luminaire with coupled lensed optics that can deliver a prescribed light level intensity where needed and predetermined prescribed uniformity ratios within a surface and between surfaces within an elongated space while increasing spacing between like luminaires, reducing luminaire energy consumption, and reducing apparent glare.

North American building codes require means of emergency lighting egress in buildings. Such means include illuminated exit signage and egress lighting. Egress lighting illuminates a defined legal path of egress inside a building interior floor, leading to a building's legal egress door to the exterior. Over the door and along the path of egress illuminated exit signs show the direction to follow toward the legal egress doors.

The illuminated building means of egress are powered by other than the primary power source commonly illuminating at least other light emitting devices. Such secondary backup power sources can include generators, inverters, and batteries.

U.S. Pat. No. 11,573,005, and U.S. patent application Ser. No. 17/843,540, further articulated the building illuminated means of egress, introducing a novel light source, incorporating IOT devices, incorporating a processing and controlling capability supported by AI code, and expanding the illuminated means of egress to ambient light sources.

The present disclosed subject matter teaches of an alternate approach to illuminate the code mandated path of egress using ambient lighting luminaires with coupled egress lighting light sources. Occupied spaces employ lighting devices. The lighting devices are tasked with producing ambient illumination. Advances in LED light source efficiency and optical lensing design have contributed to evolutionary changes in the physical size and power consumption of ambient luminaires. Today, luminaires' form can be reduced and the light exiting the luminaires can be better directed where needed when primary power fails.

According to some aspects of the disclosed subject matter, the form and functionalities of a forward-looking building means of egress on the luminaire and on the system levels can be reconfigured. The overriding design consideration is today's reduced power demands on the light emitting luminaire. In fact, while integral batteries can be used with the present innovative egress and exit sign luminaires, this innovation advocates the use of a centralized remote emergency power supply that can power the egress illuminated means of an entire building.

According to some embodiments, reconfiguration of the egress luminaire form by studying the form factors of critical components of the luminaire, the luminaires' mounting applications alone or coupled to an exit sign luminaire, IOT devices that can be coupled to the luminaire, and provide a platform to accommodate yet-to-be-developed applications for egress luminaires that can be supplied at a later date.

An additional overriding design parameter of the present subject matter is system modularity on the device and the luminaire levels. "Plug n' play" luminaire devices can be interchangeably used and the entire means of egress luminaires can operate as stand-alone units or coupled, can be mounted on any surface, and can employ interchangeable components that conform to at least one of: a mechanical form, electrical power consumption, and a data communication protocol. The present building means of egress luminaires can be used indoors and outdoors and can integrate additional utility for both building means of egress and quasi and unrelated building disciplines.

Ambient lighting luminaires can be placed over building spaces with some luminaires located over circulatory pathways. At least one circulatory pathway inside a building leads to a legal egress door. Over the path, at least one ambient lighting luminaire is configured to illuminate the path under primary power. Since the path leads toward the legal egress door, the path is also designated as a legal path of egress. Building code requires that a path of egress be illuminated when primary power fails.

At least one egress light module can couple to the ambient lighting luminaire transforming the luminaire into at least dual-functional luminaire. In so doing, dedicated ceiling and/or wall mounted egress light luminaires can become legacy.

The egress lighting light sources coupled to the ambient lighting luminaires can have a local back-up power source and/or a remote power source (secondary power source). The benefits of integrating the planar egress light module with ambient lighting luminaires include, but are not limited to:

a. Reduced light source form factor, mitigating optical conflicts with ambient lighting
b. Multiple egress lighting light sources can be coupled to an ambient light source
c. In non-emergency mode, the egress lighting light source can provide utility (night light)

d. The rotational egress lighting light source provides precise and permanently positioned illumination of the path of egress below e. The egress lighting light source receptacle is adaptable and can receive different light sources configured for different mounting heights f. The egress lighting light source receptacle is adapted to receive power, or power and data g. At least one IOT device aside from a light source can be coupled to the receptacle of the egress lighting light source h. The labor and material costs associated with installing the illuminated means of egress for a building coupling egress lighting light sources to ambient lighting luminaires is less than installing a dedicated illuminated means of building egress lighting.

There are several design strategies for illuminating a building path of egress using ambient lighting luminaires with egress light modules. For example, starting with a basic configuration: a building can have a plurality of same type recessed 2'-0"×4'-0" luminaires in a tile ceiling. Several luminaires are disposed over a linear path of egress that is code required to be illuminated. The luminaires' mounting height is 10'-0" AFF and is spaced on an 8'-0"×8'-0" grid. In this configuration, every third ambient lighting luminaire over the egress pathway can be coupled to a pair of egress light modules. The light sources direct their light at 180° to one another, providing a 24'-0" long illuminated path of egress.

In another application, a plurality of high bay luminaires are suspended from a ceiling at 23'-0" AFF. The luminaires are placed on a 25'-0"×25'-0" grid, with several luminaires placed above a linear path of egress. With this application, two coupled egress lighting light sources disposed at 180° to one another can illuminate a path of egress below that is approximately 75'-0" long. It is noted that the form factor of the egress light module coupled to the 10'-0" AFF mounted ambient lighting luminaire can be the same as the 25'-0" AFF mounted high bay ambient lighting luminaire or an even higher mounted luminaire.

The variability in luminaire height is addressed by at least one of: the egress light module input power, the number of light sources coupled to the retaining surface of the light source, and the dedicated optical covering over the light source. The dedicated optical covering can be dedicated to a plurality of lamps of the light source or to a single lamp.

In another application, the path of egress is nonlinear. Regardless of the ambient lighting luminaire mounting height, at least one egress light module coupled to the ambient lighting luminaire can be oriented with its center light beam aligned in proximity to the approximate center of the egress path below. No aiming of a light source is needed to illuminate the egress path below the luminaire and aligning the light source center beam with the path of egress is done by horizontally rotating at least one of: the light source, or the light source and the light source receptacle.

In yet another application, a path of egress can diverge into two or more directions. In addition, the activities in this diverging location may require monitoring. The present innovation can couple multiple egress light modules to the ambient lighting luminaire, and to IOT device/s such as a camera. The ambient lighting luminaires can then provide egress lighting over the path of egress while the camera provides a monitoring feed. The feed input can be streamed under normal primary power as well as secondary power during power interruption.

Other than the egress light module, the secondary power source can power, or power and communicate with other coupled devices deemed essential during a power outage. The current application can employ five receptacles, wherein four light sources couple to receptacles and the remaining receptacle couples to a camera. The receptacle can provide power or power and data to a coupled device.

The ambient lighting luminaire can be coupled to at least one of: a processor/controller with code, a communication device, and a sensing device other than the camera and the egress light modules. The ambient luminaire can have an onboard back-up power supply and/or remote power supply. The ambient lighting luminaire coupled to at least one egress lighting light source can operate as a stand-alone or can be communicatively coupled to at least one like device and/or a remote client.

The present example demonstrates the capacity to expand the ambient lighting luminaire by coupling it to egress light modules, back-up power, and at least one of: a processor/controller, a switching device, and an IOT device. The devices can provide cross utility under primary power and secondary power. For example, a camera operating under house power can also become a light sensor and an occupancy sensor, while during the night an egress light module can become a nightlight. Similarly, a speaker coupled to the ambient lighting luminaire can provide audio feeds during operational hours and can change to different feeds when house power is interrupted, directing occupants toward egress doors.

For reasons of brevity, the present application does not expand on the numerous permutations the present subject matter can provide. According to some aspects of the disclosed subject matter the design of building means of egress by coupling at least one egress light module with or without processing/controlling capabilities and IOT devices to transform an ambient lighting luminaire.

The present innovation incorporates elements of the allowed egress lighting patents with ambient lighting luminaires, expanding egress lighting luminaires' utility, further reducing, or eliminating the need for stand-alone ceiling mounted egress lighting luminaires.

It should be noted that the directional optics and luminaires discussed in reference to FIGS. 1-9*d* may be used with other luminaires and light sources discussed herein (e.g., FIG. 20). Likewise, the directionally adjustable support structures discussed with respect to FIGS. 10-18, for example, may be used in combination with other luminaires and light sources discussed herein. Furthermore, the programmable control features discussed with regard to FIGS. 19-29, may also be incorporated into the luminaires and light sources described throughout this document.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 13*a* and 3*b* show perspective views of the rotational hubs shown in FIGS. 11*a*, 11*b*, 12*a*, and 12*b* respectively coupled to a luminaire without a refractor.

FIG. 15*a* includes a power/data cord that couples to the J box and FIG. 15*b* includes a power/data cord for the device that couples to a modular wiring system.

DETAILED DESCRIPTION

Figure 1:
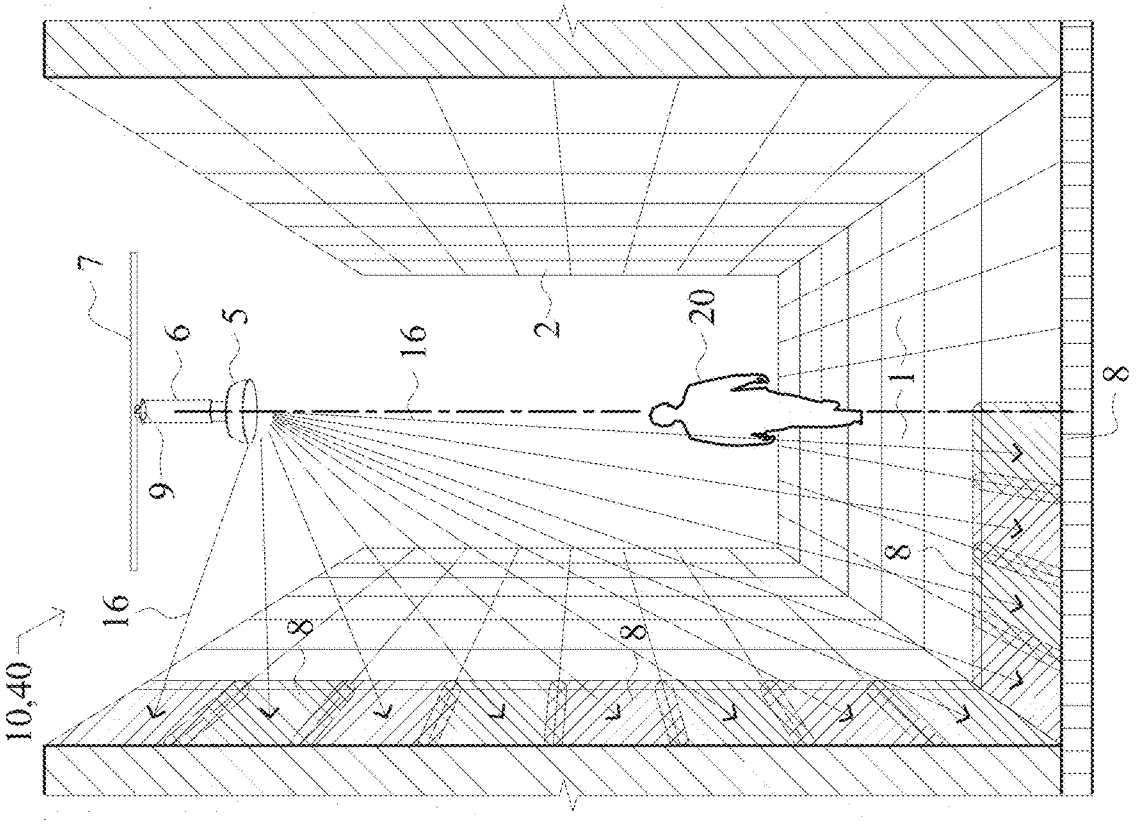
FIG. 1 shows a perspective view of an elongated space with subfields of a light emittance across a vertical wall/rack and a horizontal floor surface of an elongated space.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

General Discussion of Embodiments

A luminaire's light source can be covered by an optical lens (which itself may include sub lenses) that controls the directionality of the emitted light. The light source may also be covered by a translucent protective lens, which disperses the luminaire's light in roughly a natural +/−120° light dispersion pattern of a LED lamp.

The LED luminaire with coupled LED lamps can also employ a reflector and/or a refractor. At least the refractor, or the refractor and reflector, can substitute for a protective optical lens over the LED light source. In embodiments discussed herein, both a protective lens over the LED and a refractor may be used together or separately.

The LED luminaire can have several forms including round, square, and rectangular. The decision to use one form of luminaire over another is driven by architectural, economic, and performance considerations. Among the performance considerations a designer must consider is whether each luminaire form provides for the light emittance pattern compatible with the needs of the space to be illuminated. These illumination needs can include at least one of, a horizontal and a vertical surface/s.

As recognized by the present inventor, objectives for a project to illuminate an elongated space at specified intensity levels to targeted surface/s should include using a minimal amount of energy, and generating minimum glare, while maintaining a good uniformity ratio (e.g., 3:1). To achieve these objectives, a lighting designer, when specifying a luminaire, would first need to evaluate whether the luminaire's form with its light emittance pattern is compatible with the space needs. The lighting designer may also have to consider the luminaire's orientation. Such a consideration becomes relevant where orientations of at least two like formed neighboring luminaires must be common and set in relation to the space in which the luminaires are mounted. For this reason, with at least one luminaire form, the lighting designer must consider the choice of the mechanical means of the luminaire support as it affects the associated labor component, the production time, and material costs.

The lens optics over the light source of a rectangular formed luminaire can generate a variety of light dispersion patterns; however, its architectural form imparts lighting directionality by having one horizontal central axis longer than the other horizontal central axis. Further, its installation may require more than one point of mounting support. As recognized by the present inventor, more than one mounting support point, as compared with a single support point, necessitates additional costly structural support members and requires longer installation time and thus increases the installation costs.

Lens optics over a square luminaire can also generate a variety of light dispersion patterns; however, for architectural reasons, it requires orientation alignment with other like luminaires. An advantage of the square luminaire over the rectangular luminaire, as recognized by the present inventor, is that it can be mounted from a single mounting point, and its form is directionally neutral.

Lens optics over the light source of a round luminaire are also directionally neutral. The luminaire can also be mounted from a single mounting point. Round luminaires are often used in retail and institutional spaces which are wide open, but conventional optics over round luminaires are not conventionally viewed as conducive for use in elongated spaces, mainly for their lack of directionality. The elongated spaces, for example, can be racked aisles within a big box retail space.

Corridors and aisles where rectangular, square, and round shaped luminaires are used represent a substantial portion of all real estate for retail "big box" outlets, warehousing spaces, and manufacturing spaces.

U.S. patent application Ser. No. 18/406,136 describes a mechanical orientation mounting device, which may be used with the orientation specific luminaire described herein. The present disclosure further elaborates on the mounting device's connectivity to a luminaire below it and a supporting structure above it.

A luminaire with or without orientation specific light source optics coupled to the orientation specific mechanical mounting device is able to have a user-settable alignment with a like luminaire and/or with a feature of the space in which it is disposed such as an aisleway below or a supporting structure above. Once the luminaire's orientation is set by way of setting the orientation of the mechanical mounting device, the mechanical mounting device can then be permanently secured, which in turn secures the luminaire in position. It is noted that having two cables and/or chains connecting the luminaire to a mounting device assures restoration of the luminaire's orientation to its set position under a condition where the luminaire is accidently hit by a moving object (e.g., a ladder being moved, etc.).

Further, the two suspended support mounting members provide redundant restraints, and thus can protect life and property, when one support mounting member fails. The orientation specific mechanical mounting device can be configured for a single point of connectivity to the structure above. The mounting device coupled to a luminaire can facilitate luminaire alignment regardless of the luminaire form and its optical light dispersion pattern.

In elongated spaces that include racked aisles (aisles have a floor flanked with racks/shelves or a wall on at least one side, but often on both sides), the luminaires can be tasked with illuminating the horizontal surfaces including the floor and furniture that rests on the floor, and the vertical surfaces including walls and/or face of the rack/s. In spaces intended to display merchandising product, the illuminance of the rack's vertical surface is of great importance, as this is where the merchandise is displayed and a shopper will observe it.

The merchandise is often displayed in proximity to an adult human's eye level (e.g., in an inclusive range of 3' to 7', but typically an average height of 5'). For convenience, this document will refer to eye level as being five feet above a finish floor, but the level can be anywhere between three feet and seven feet depending on the circumstances. Therefore, in elongated spaces where merchandise is displayed on racks, the luminaires are configured to provide the most intense light level/s to fall on the vertical face of the rack at about an adult human's eye level, where merchandise that is on display for sale is located. Above, and possibly below, the human eye level, the rack may include storage space for items that are housed until needed. The racked region above the rack(s) around human eye level are accessible via a lift, or ladder, by store personnel and often extend up to 30 feet or so above the finished floor.

Luminaires placed above an aisle flanked by elongated rack space are expected to deliver specified light levels at specific locations, or subregions, along the horizontal and vertical surfaces that define the aisleway. In merchandising and stocking spaces the intense light levels should illuminate vertical surface at, above and below an adult human eye level. In addition, in some applications, the luminaires may be configured to also illuminate the ceiling or support structure above.

An aspect of the presently described luminaire is that it directs its primary light source toward the floor below and/or at least one adjacent vertical surface. In at least one embodiment a plurality of luminaires with LED light sources coupled thereto are located above a racked aisle and are incrementally spaced apart from one another at predetermined distances, usually along a center plane that extends from the middle of the aisle and is parallel to at least one vertical racked wall at the edge of the aisle. Each of the luminaires' light sources are tasked with illuminating at least a portion of a vertical surface comprising the face of a rack adjacent to an aisle, and at least a portion of the aisle's floor surface.

To attain optimal efficiency, the form of a printed circuit board (PCB) that hosts the plurality of the LED lamps comes into play. The orientation of the LED lamps coupled to the PCB can differ from legacy practices, and include planar as well as non-planar topologies (e.g., curved such as parabolic surfaces, and the like). Over the LED light source (i.e., between the LEDs and the regions illuminated by the LEDs), an optical lens is positioned that directs the light toward horizontal and vertical targeted fields of illumination. The lens optionally includes a plurality of sub-lenses that can include at least one dedicated optical lens per LED. Likewise, the sub-lenses may provide the directed optics for a group of LEDs, such as 2, 3, 4 . . . 50. The group of LEDs may be linearly arranged, or grouped in two dimensional arrays if the PCB is planar, or even a 3 dimensional grouping with a PCB that is non-planar.

The present exemplary embodiment includes two crescent shaped PCB's populated with planar LED lamps. Each crescent shown in this embodiment is tasked with illuminating one or more sub fields of illumination on a vertical surface of a rack, as well as one or more sub fields of illumination of the floor of the aisle, adjacent to the lower edge of the vertical surface of the rack. In a different embodiment, the same PCB arrangement includes one or several sections. For example, a three section PCB can be configured with two sections to illuminate the racks, and the third section configured to illuminate the floor between the two racks. As a complement to the LEDs arranged on the crescent shaped PCBs, additional LEDs with optional directional, and orientation settable optics, maybe be hosted in a central hub region that is unoccupied by the pair of crescent shaped PCBs, where the crescent shaped PCBs have an arcuate shape.

The PCB that retains a plurality of LED lamps thereon may be segmented into one or several boards, wherein the board/s can have at least one of a different form, orientation, and number of light sources coupled thereto. The optical lens/es (sometimes referred to herein as "optics") disposed over the PCB retaining the plurality of lamps directs the light emitted from the plurality of the LED lamps toward a designated subfield of illumination target. The targeted subfield of illumination can have at least one of, a specified horizontal and vertical light level intensity value. A subfield of illumination is a sub region of the vertical surface or horizontal surface of the elongated space (aisleway flanked with one or more vertical structures on either or both sides of the floor of the aisleway).

The PCB is fabricated with wiring that provides controllably amounts of electricity to the plurality of the coupled LED lamps and can be configured to controllably operate an individual lamp or groups of lamps. The control of the LED lamps can be different from one another and/or in unison with one another, having optical lens/es over a single or a plurality of LED lamps. The control can be provided by hardwired circuitry (e.g., application specific integrated circuit, ASIC) or programmable circuitry such as one or more processors having one or more central processing units (CPUs) coupled to one or more memories that hold computer readable code therein that, upon execution by the one or more processors, configures the processors to control the electrical flow and illumination control of the LEDs, and/or a luminaire driver, hosted by the luminaire.

The LED lamps coupled to the PCB can differ by at least one of, shape, size, input power, color temperature, and chromaticity. The luminaire driver/s and/or a controller can drive different LED lamps and/or plurality of grouped LED lamps.

The PCB, with or without the dedicated optics, can be replaceable. The PCB can be configured either as orientation specific or non-orientation specific. A switch and/or a rotatable dial device coupled to the luminaire can be configured to manually control (or controlled electrically via a controllable motor such as a stepping motor controlled by a local controller, or a remote wireless controller) at least one aspect of the operation of at least a portion of the lamps coupled to the PCB. In addition, the light emitted can be controlled via at least one of a local/remote communication device and/or sensing device/s.

To maintain an acceptable uniformity ratio of illumination, the light pattern emitted on a subfield of illumination from at least one luminaire can overlap another subfield of illumination. The subfield of illumination can be on a horizontal surface, a vertical surface, or a combination thereof. Given the small size of LED lamps, in at least one embodiment, the orientation of each LED lamp does not have to follow the same form as the surface of the PCB. For example, legacy round PCB's with coupled LED lamps commonly distribute the lamps in concentric rings about a vertical center axis of the PCB. By contrast, in at least one embodiment the LED lamps coupled to a PCB can be arranged orthogonally. In this arrangement, the orientation of at least one side of any one square LED lamp coupled to the PCB is substantially parallel to the orientation of the rack, and at least the adjacent side of the square LED lamp is substantially perpendicularly oriented to the rack.

As will be discussed in more detail below, the present innovation uses both the concentric and the orthogonally arranged LED lamps coupled to a crescent formed PCB of a luminaire mounted above a racked aisle. The LED lamp arrangement described can apply to any form of luminaire light source retaining surface. The orthogonal arrangement of the LED light sources with their respective optical lens/es enable better design control over the zonal distribution of the light emitted by the PCB section/s.

The design of the optical lens of the orientation specific luminaire accounts for at least one of, the luminaire's mounting height from the floor, the distance between a targeted surface and at least one luminaire coupled LED light source, the horizontal and/or vertical target light level intensity specified over a subfield of illumination, offensive glare angles, and inherent optical losses for the light emitted in any one direction.

Aisle widths of elongated spaces can vary by the building use type; however, in retail, manufacturing, and distribution spaces, the width of an aisle commonly ranges from six to twelve feet. Both the vertical surfaces of the elongated space and the elongated space floor can be divided into subzones configured in relation to a luminaire mounted above. The subzones can be further divided into short, medium and long zones. These zones can further be divided into a plurality of subfields of illumination that are contiguous to one another.

The luminaire mounted above an elongated aisle space can employ zone specific lens optics configured to illuminate at least two of the subfields of illuminations. In at least one embodiment, a luminaire with a plurality of lamps can target one or several subfields of illumination, wherein a subfield of illumination near the luminaire can be illuminated by wide angle optical lens/es covering a large subfield area, while a remote subfield can be illuminated by a narrower lens optics (with higher directivity) that may cover a smaller subfield area, albeit with a higher light intensity than without the higher gain optics.

The optics of the orientation specific luminaire is configured to attain specified light levels within a subfield of illumination. The specified light level is referenced herein as the target light level intensity. The lens/es can be placed over at least one of, a single LED lamp, a plurality of LED lamps, a single LED PCB, and a plurality of PCB's. The lens/es can couple to at least one of the PCB and the heat dissipating structure of the luminaire.

DETAILED DESCRIPTION WITH REFERENCE TO DRAWINGS

FIG. 1 shows a conceptual zonal diagram for a light dispersion arrangement illuminating vertical wall/rack and horizontal floor surfaces of an elongated space. The orientation specific luminaire 5 is shown suspended by two cables/chains 6 over a racked aisle 10. The cable/chain 6 suspension elements are coupled to a mechanical orientation device 9 that is secured to a support structure 7 above. It is noted that the present arrangement converts a two-point mounting to a single point mounting. The luminaire's two-point mounting enables plumbing and orienting the luminaire regardless of the luminaire form. It also ensures restoring the luminaire to its original orientation following colliding with a moving object.

In a different embodiment, at least one element of the mechanical orientation device can couple the top surface of the luminaire enabling the luminaire to rotate about its central vertical axis. The single point mount can eliminate the need for a secondary support structure (not shown), saving material costs and installation production time.

The single point mount can eliminate the need for a secondary support structure (not shown), saving material costs and installation production time. The present embodiment includes an orientation specific luminaire 5 with orientation specific optics and a mechanical orientation device that enables orienting the luminaire 5 in relation to at least one of, the longitudinal axis of the racked aisle 10 and a vertical surface of a rack face 2.

FIG. 1 shows an adult human 20 traversing the racked aisle 10. Light rays emanating from the orientation specific luminaire 5 are shown directed toward subfields of illumination 8. The subfields of illumination 8 are quilted across the horizontal floor surface 1 and the vertical rack faces 2. The subfields of illumination 8 extend the full length of the racked aisle 10 wherein in a long aisle a plurality of orientation specific luminaires 5 are spaced apart at increments that enable adequate illumination coverage across the horizontal surface 1 and the vertical racked surfaces 2. In this example, the subfields are 2.5' high by 4' wide, although subfields of different dimensions may be used as well (e.g., heights varying between 6" to 6', and widths from 6" to 10').

For graphic clarity the present figure shows the light rays 16 extending away from the orientation specific luminaire across only one half of the racked aisle 40. The light rays 16 also show only one vertical slice of light rays 16 extending from the aisle floor 1 to the top tier of the racked surface 2. The light rays illuminating the targeted subfield of illumination can overlap their illumination coverage onto at least one adjacent subfield of illumination 8. It is noted that precisely overlapping the illumination coverage over the subfields of illumination 8 can improve the illumination uniformity of the entire field of illumination.

Figure 2B:
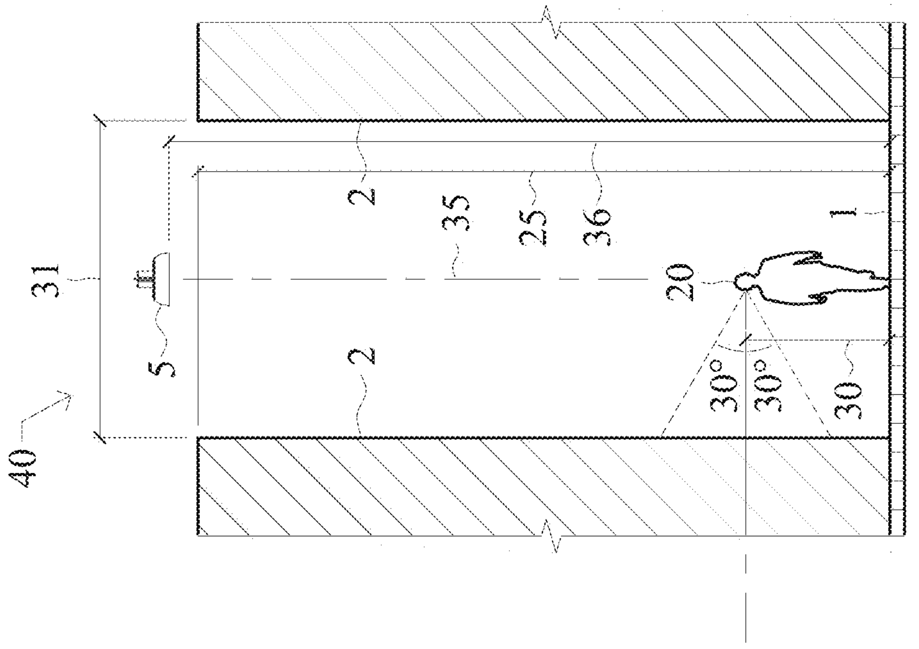
FIG. 2*b* shows a transverse section of a typical racked aisle in relation to the eye level for the typical adult human.
Figure 2A:
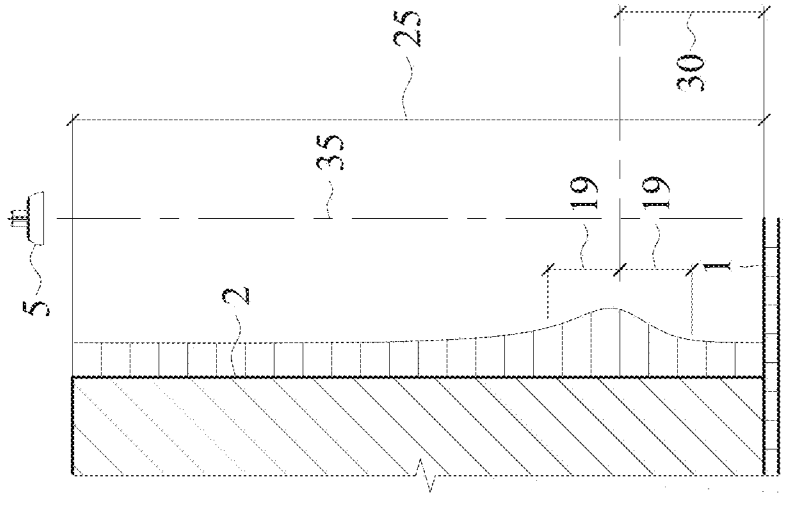
FIG. 2*a* shows a partial transverse section through a vertical surface with an illustration of an overlaid vertical light level distribution over the vertical surface in reference to eye level for a typical adult human.

FIG. 2*a* shows a partial transverse section through a vertical surface showing with a conceptual vertical light level illuminance intensity (region shown with horizontal lines therein) in reference to an average adult human eye level. FIG. 2*b* shows a transverse section of a typical racked aisle in relation to the adult human eye level.

FIG. 2*a* shows the intensity of the vertical illuminance on a vertical surface within an elongated space peaking at an adult human eye level 30, or adjacent to and above and/or below an adult human eye level, where the highest light intensity is needed. The specific lensed optics of the orientation specific luminaire 5 mounted above the horizontal aisle surface 1 is configured to direct light from nadir outwardly in an asymmetrical pattern. In this example, the light intensity distribution has a peak level in a subzone (subfield) that is a height occurring at the height of eye level of an average adult human. The shape around the peak is generally Gaussian in distribution (i.e., bell curve), which is a result of overlapping light patterns directed toward the height of eye level of an average adult human, although having some dispersion about the peak level defined by a standard deviation 19 around the peak level as set by an overlapping of a relatively large number of dispersion patterns from respective LED/lens groups (e.g., pairs). A light level intensity below the inclusive range is no less than 0.6 times the light level intensity within the inclusive range.

The exit angles of the emitted light, the lens light dispersion optical pattern, and the LED lamp intensity are set in relation to the height 25 of the vertical surface 2 that the orientation specific luminaire 5 is tasked to illuminate. FIG. 2*a* shows a ratio that is limited to maximum to minimum ratio of 3:1 between the highest and the lowest vertical illuminance on the vertical surface 2 vertically measuring across the full height 25 of the vertical surface 2 from the floor 1 up. For example, if the specified vertical light level target on a vertical surface of an elongated space is set for 30FC at the height of an adult human eye level within the inclusive range, the lowest vertical light level measured vertically across the same surface from the floor surface 1 up does not fall under 10FC—as shown in FIG. 2*a*.

It is noted that the structure of the present embodiment re-directs light from a light source from a horizontal planar surface of the orientation specific luminaire 5 onto a vertical surface 2 of an elongated space, concentrating the light emitted along a horizontal band 19 at a specific height above a floor 30 while maintaining an excellent maximum to minimum uniformity ratio of 3:1 across the entire surface of the vertical surface 2. The vertical uniformity ratio discussed can be constructed as a base line for good design. The lensed optics of the present orientation specific luminaire can be configured to provide better lighting uniformity ratios.

FIG. 2*b* shows a transverse section of a typical racked aisle in relation to the adult human eye level. Visually pairing the side-by-side FIGS. 2*a* and 2*b*, one can see that the adult human eye 30 has a cone of vision of approximately 60° from the horizontal −30° up and 30° down.

Therefore, the eye coverage of an adult human looking straight at a vertical surface 2 of an elongated space illuminated by an orientation specific luminaire 5 falls on a higher vertical illuminance band extending across a portion of the vertical height 25 of the vertical surface 2. The vertical illuminance band width can vary based on the width of the horizontal aisle 1 and/or the placement of the orientation specific luminaire 5 above. However, the illumination ratios pertaining to the vertical illuminance on the vertical surface 2 of the elongated space can remain unchanged.

Figure 3B:
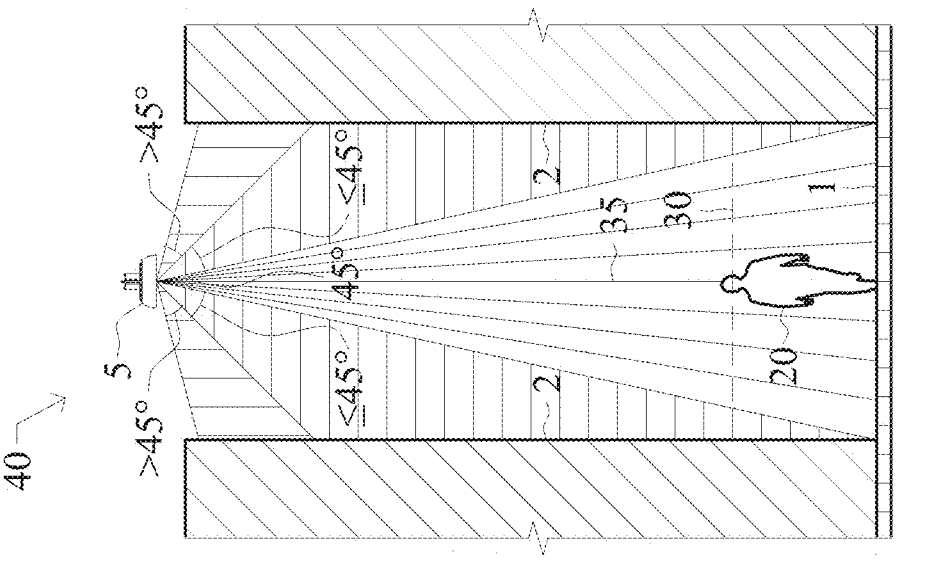
FIG. 3*b* shows the light exit angles of the same luminaire as in FIG. 3*a* although taken transversely across the elongated space.
Figure 3A:
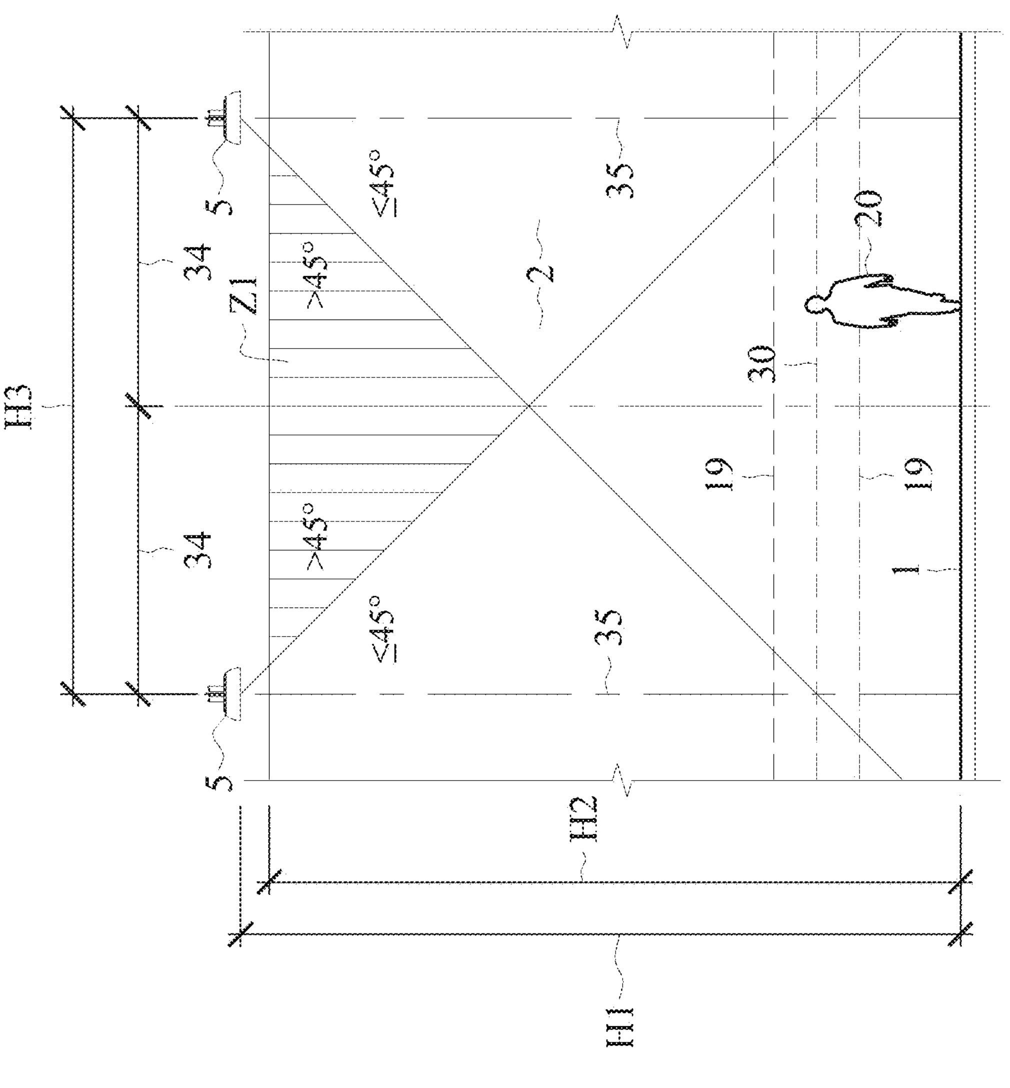
FIG. 3*a* shows light exit angles above a luminaire nadir of a luminaire suspended above a surface of an elongated space.

FIG. 3*a* shows light exit angles above a luminaire nadir of a luminaire suspended above a surface of an elongated space. FIG. 3*b* shows the light exit angles of the same luminaire taken transversely across elongated vertical space.

FIG. 3*a* shows two orientation specific luminaires 5 mounted above a horizontal aisle surface 1 illuminating a vertical surface 2. The luminaires' spacing H3 and mounting height H1 shown corresponds to the luminaires' light source output and the lensed optics arrangement. The present figure shows 45° to nadir 35 as the highest light exit angle from the luminaire 5. Light emitted by the luminaire 5 and directed toward the horizontal aisle surface 1 is configured to be glare free (<46° exit angle) and to uniformly illuminate the aisle surface 1.

A scaled adult human traversing the horizontal surface of the elongated space aisle 1 is shown juxtaposed next to a high vertical surface 25. The vertical surface 2 represents a racked surface. The adult human eyes level 30 above the horizontal aisle surface is approximately 5'-0" as shown in dashed line.

The adult human cone of vision is approximately 60°. The eyes of an adult human looking straight at the rack 2 face perceive a vertical area centered at approximately the human eye level 30. The intense illuminance band extending the length of the vertical surface 2 face is formed by the adjacent surfaces above/below (dashed lines 19) the human eye level 30. The portion of the surface within the upper and lower dashed lines of horizontal band 19 is an illustration of the inclusive range.

The figure illustrates that by dividing the light emitted through each luminaire 5 lensed optics into a horizontal surface and a vertical surface, the overall luminaire efficiency is increased. Limiting the horizontal surface 1 optical light exit angle of the luminaire 5 to a maximum of 45° reduces luminaire's optical losses and eliminates veiling glare, wherein the balance of the downwardly directed light of the luminaire 5, that includes high exit angle light rays, can then be directed away from the eyes of an adult human traversing the horizontal surface of the aisle 1 toward the vertical racked surface 2.

FIG. 3*a* shows the light exit angles of the same luminaire as shown in FIG. 1 taken transversely across elongated vertical space. The figure shows the luminaire 5 mounted over an elongated space of a racked aisle 1. The luminaire 5 shown is positioned at approximately a mid-point of the aisles' width having the same illumination requirement on the faces of the racks 2, as the racks are equal in height. In a different embodiment (not shown), the light pattern emitted from one side of an orientation specific luminaire 5 can be different from the light emitted by the opposite side of the luminaire.

The distance between the two luminaires 5 mounted above an elongated space has financial implications for material, installation, energy, and maintenance costs. Therefore, spacing luminaires as far apart as possible is desirable.

The optical lenses of the orientation specific luminaire are configured to provide the light level intensity where needed, maintain lighting uniformity, and reduce glare while positioned far apart. It is noted that the H3/H1 ratio (known as the spacing to mounting height ratio) of the present orientation specific luminaire coupled to the lensed optics can be at least 1.35.

FIG. 3*b* shows a symmetrical light emittance pattern (distribution) of two luminaires' light emittance angles in reference to their respective nadirs 35. The luminaires are arranged in relation to at least one of, the vertical surfaces of the racks' face 2 and the central longitudinal axis of the elongated space racked aisle 1. The luminaire's lensed optics is shown to divide the emitted light into a component tasked with illuminating the horizontal surface 1 and a component tasked with illuminating the vertical surface 2 of the elongated space.

The component tasked with illuminating the vertical surface 2 is further divided into two horizontal bands, one that illuminates vertical surfaces equal to or less than a 45° exit angle in relation to nadir, referred to herein as the low angle band, and the other band where the light exit angles in relation to nadir exceed 45° referred to herein as the high angle band. It is noted that the high angle band is higher than the eye level of an adult human 30.

Further, a review of FIGS. 3*a* and 3*b* shows that the distance to the mid-point of a pair of luminaires 5 spaced apart H3 is relatively short in relation to nadir. That said, the proximity from the luminaire's nadir to the high band mid-point 34 vertical surface 2 is relatively short (see FIG. 5*a* crosshatched triangle). While high angle optics emitted through a horizontal planar surface facing downwardly can incur greater losses, the small area and the proximity to the luminaire 5 nadir 35 can offset these losses. In at least one different embodiment (not shown) at least one secondary non-horizontal planar surface with at least one light source coupled with a lensed optics can illuminate a vertical surface 2 more efficiently having a lesser light exit angle.

Figure 3C:
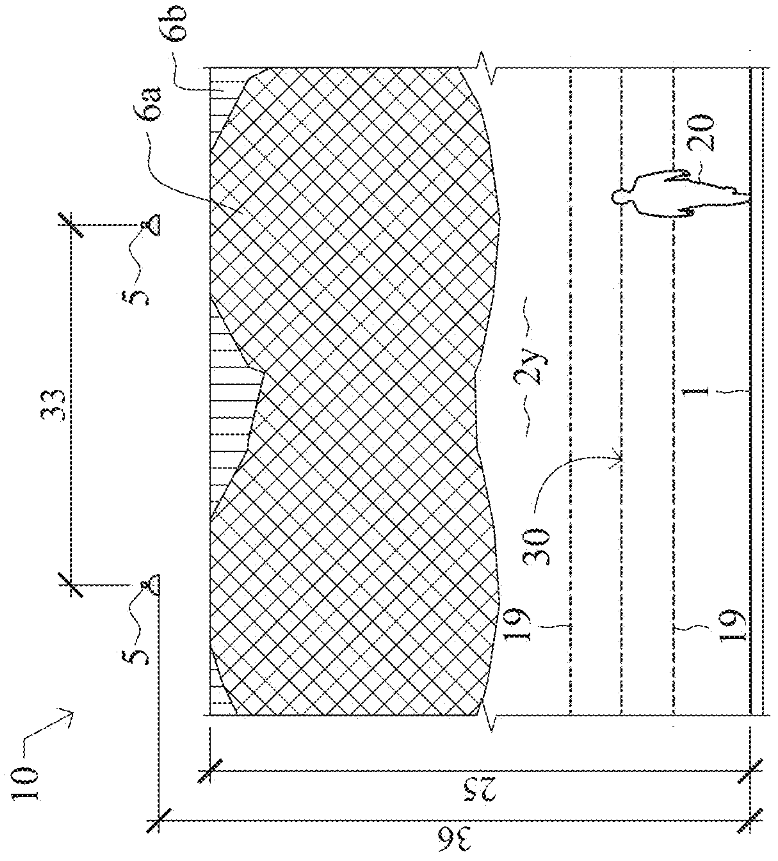
FIG. 3*c* and FIG. 3*d* illustrate illumination vertical illumination inefficiencies of two conventional main brand highbay luminaires and their respective light emittance over vertical racked surfaces.
Figure 3D:
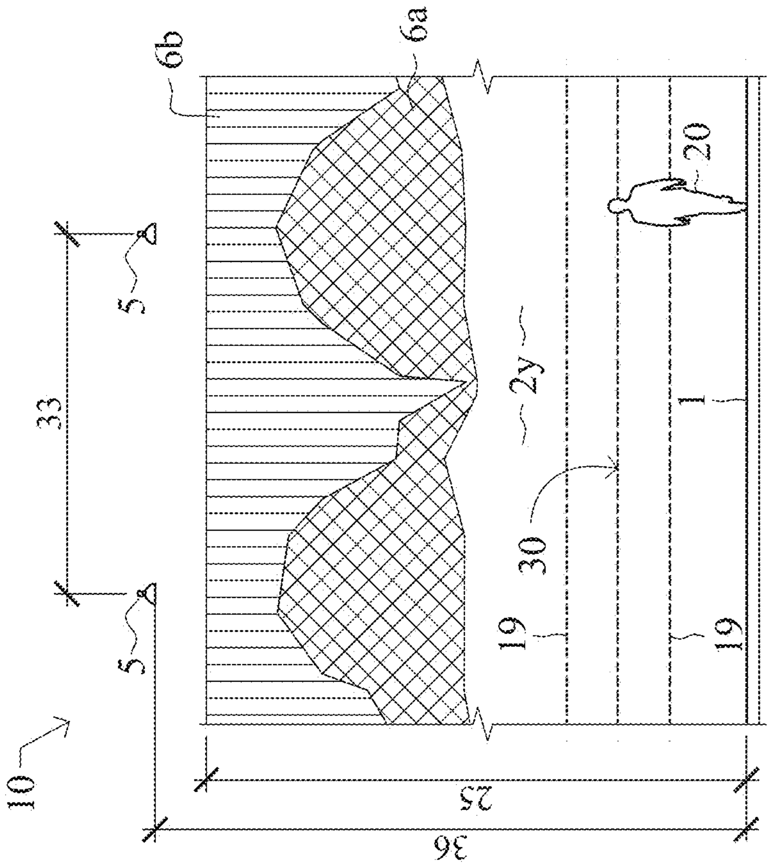

As recognized by the present inventor, FIG. 3*c* and FIG. 3*d* illustrate inefficiencies with present-day vertical illumination provided by low and highbay luminaires when mounted above an elongated space such as a racked aisle. FIG. 3*c* is for one main brand highbay luminaire, and FIG. 3*d* is for another main brand luminaire. The racked aisle 10 is an elongated space with at least one vertical surface 2*y*, and FIGS. 3*c* and 3*d* shown from the perspective of facing the one vertical surface, with a person 20 walking in an aisleway which runs from left to right in the figures. Two luminaires 5 are shown suspended above the racked aisle 10 spaced apart by a distance H3. The luminaire's height from the floor is H1, and H2 is the top edge of the vertical surface 2*y* of the rack illuminated by the luminaires 5.

FIGS. 3*c* and 3*d* show that the highest vertical light levels emitted by the luminaire 5 across the face of the vertical plane 2*y* occurs well above an adult human eye level 30, contrary to where it should be. A band of higher light intensity should extend above and below the adult human eye level 30, in a range 19, along the length of the face of the vertical surface 2*y*. Herein, the range 19 is an inclusive range of 3' above the finished floor 1*y* to 7' above the finished floor 1—this range of 3' to 7' is sometimes referred to herein as "the inclusive range" and is intended to cover a height above finished floor of the aisleway on the vertical surface that defines one side of the aisleway, the vertical surface usually being racks of goods, or a wall. A portion of the energy (region 6*a*) associated with the exceedingly intense light levels is wasteful. Further, the human eye is configured to home in on well-lit surfaces. As a result, surfaces within the range 19 in these figures is relatively dim.

The present figures also show a poor vertical uniformity ratio between maximum light levels that occur in region 6*a* (a region in which light levels exceed 60% of a target), and minimum light levels (like that in region 6*b*, which is a region in which light is below 60% of a target). Most striking is the relatively short distance between an intense light level surface (see region 6*a*) and a dim lit surface nearby (see region 6*b*). According to the IESNA guidebook for indoor illumination, an acceptable ratio between maximum to minimum light levels is 3:1. The present figures exceed this ratio as is evident from light levels seen in Tables 1 and 2, as will be discussed below.

Tables 1 and 2 show light levels, in foot candles, on 2.5'×4' (height×length) subregions of a vertical surface of respective conventional lighting systems over aisleways. In these examples, the height of the vertical surface is 22.5' although a similar distribution is present for higher vertical surfaces. In each of Tables 1 and 2 eye level is just above the second row from the bottom. As can be seen, while the light levels at eye levels are around 30 to 32 foot candles, subregions above eye level far exceed the light levels at eye level, with some subregions reaching over 100 foot candles. In the case of Example 1 (Table 1), the peak light intensity is not near eye level, where the goods for sale are often located, but well above eye level, around 17.5'. Thus, significant energy is wasted illuminating less interesting portions of the vertical surface, and the unnecessarily high light intensities gives rise to more glare than desirable for the consumer walking in the aisleway. In the case of Example 2 (Table 2) the luminaires are tilted toward the vertical surface, and have lower output candle power. These combine to lower the peak level to about 15' above the floor ($6^{th}$ row from the bottom), but also cause a much larger region of lower light intensity toward the top of the vertical surface (see the top three rows) as well as create "hot spots" (light exceeding 60% of target) on the vertical surface with large bright subregions compared to surrounding dim subregions: compare the bright subregions at the $3^{rd}$ and $4^{th}$ rows from the top and in the $3^{rd}/4^{th}$ columns (first bright subregions with illumination levels as high as 92 foot candles), and $7^{th}/8^{th}$ columns (second bright subregions with illumination levels as high as 96 foot candles) as compared to adjacent dim subregion (light levels below 60% of target) such as at the $3^{rd}$ row from the top and $5^{th}/6^{th}$ columns (20 and 14_y_ foot candles). Furthermore, in example 2 (Table 2) the upper portion of the vertical surface (see the top two rows) are dimly illuminated. This variation in illumination level is highly disparate with hot spot subregions at 96 foot candles, and dim subregions in the single digits. As with the case of example 1 (Table 1), the peak light intensity is well above eye level. Thus merely tilting the luminaire toward the vertical surface, and adjusting the output levels of adjacent luminaires does not provide the ideal illumination pattern on the vertical surface of an elongated space, and the does not create a peak illumination at eye level.

TABLE 1

Example 1, Light Levels (foot candles) in subregions 2.5' × 4' subregions of vertical surface

| | | | | | | | | | |
|---|---|---|---|---|---|---|---|---|---|
| 11 | 13 | 17 | 15 | 12 | 12 | 15 | 17 | 14 | 12 |
| 41 | 67 | 107 | 88 | 49 | 45 | 81 | 109 | 72 | 42 |
| 56 | 70 | 95 | 84 | 61 | 59 | 79 | 97 | 75 | 57 |
| 51 | 63 | 77 | 71 | 55 | 53 | 69 | 77 | 65 | 52 |
| 46 | 49 | 51 | 50 | 48 | 48 | 50 | 51 | 49 | 46 |
| 39 | 38 | 38 | 38 | 38 | 39 | 38 | 38 | 38 | 39 |
| 31 | 31 | 30 | 31 | 31 | 31 | 31 | 31 | 31 | 31 |
| 26 | 27 | 27 | 27 | 26 | 26 | 27 | 27 | 27 | 26 |

TABLE 2

Example 2, Light Levels (foot candles) in subregions 2.5' × 4' subregions of vertical surface

| | | | | | | | | | |
|---|---|---|---|---|---|---|---|---|---|
| 8 | 9 | 10 | 10 | 8 | 8 | 9 | 10 | 9 | 8 |
| 11 | 12 | 16 | 14 | 11 | 11 | 13 | 16 | 13 | 11 |
| 12 | 36 | 92 | 74 | 20 | 14 | 59 | 96 | 53 | 13 |
| 45 | 56 | 68 | 64 | 49 | 47 | 62 | 68 | 59 | 45 |
| 48 | 46 | 45 | 45 | 47 | 48 | 45 | 45 | 45 | 48 |
| 37 | 37 | 37 | 37 | 37 | 37 | 37 | 37 | 38 | 37 |
| 30 | 30 | 32 | 32 | 30 | 30 | 31 | 32 | 31 | 30 |
| 27 | 27 | 28 | 28 | 27 | 27 | 27 | 28 | 27 | 27 |

Figure 4:
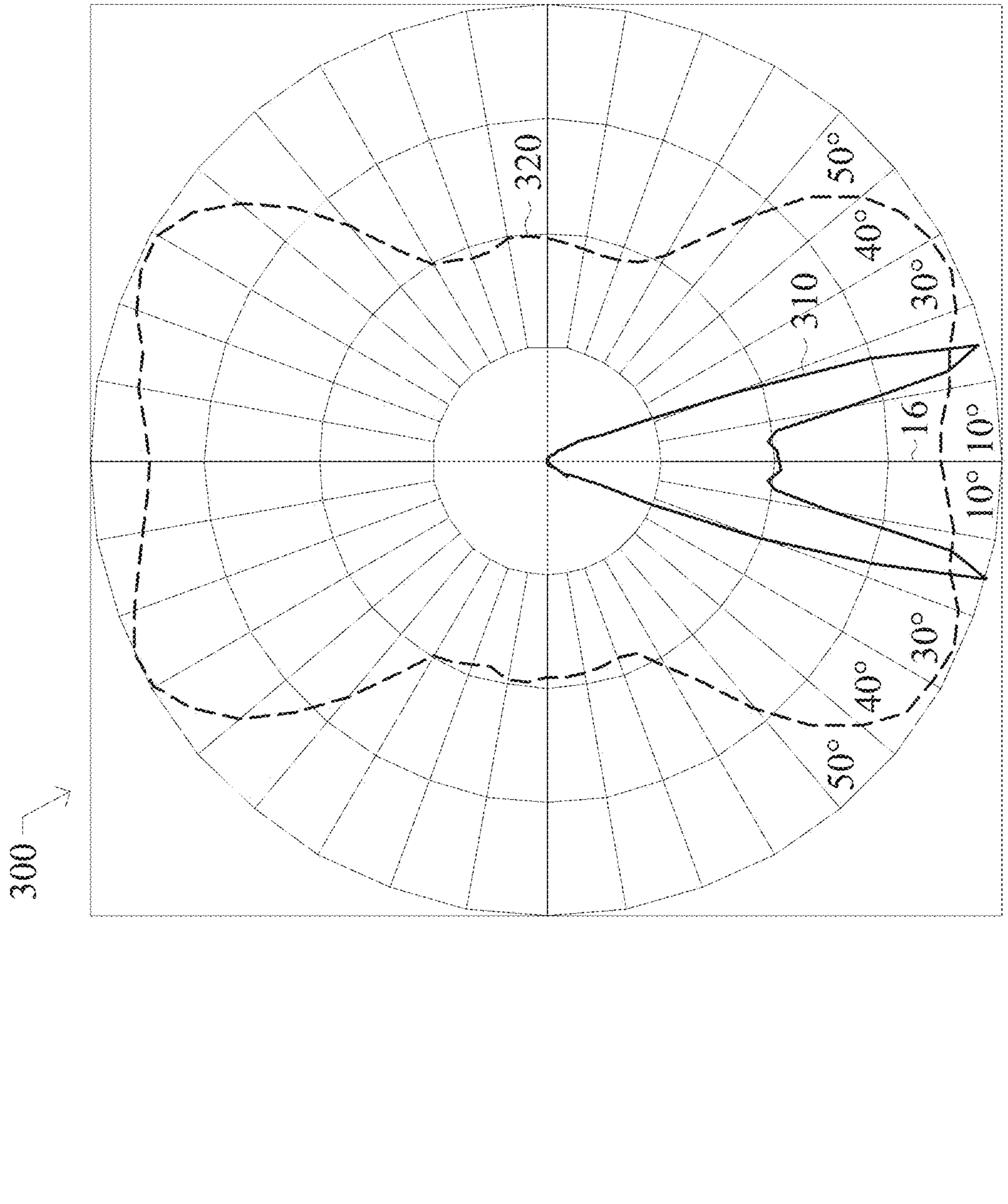
FIG. 4 is a polar diagram of the light intensity emitted by lensed optics of the orientation specific luminaire, with one contour in dashed lines being a light intensity envelope horizontal (looking sideways) to the lensed optics, and the other contour in solid line being vertical to the lens optics (looking down).

FIG. 4 is a polar diagram 300 of the optical light distribution pattern from the lensed optics of the orientation specific luminaire. The polar diagram 300 a vertical component and a horizontal component of the light distribution pattern. The vertical light distribution pattern 310 shows the light distribution in vertical plane from the luminaire and the horizontal light distribution pattern 320 from the luminaire. The diagram is divided into four quadrants. The luminaire (not shown) is positioned at the vertex common to the four. Concentric rings are shown arranged around the vertex. Each ring shows a different luminosity intensity of the light emitted. Rings closer too the vertex have less light intensity emitted than rings closer to a periphery of the polar plot. Radial lines originating outside the vertex indicate polar angles by degree wherein nadir is pointed down. The polar angle dividing lines are shown at 10° increments.

The polar diagram of the lensed optics of the orientation specific luminaire shows that peak vertical light emittance from the luminaire in relation to nadir 16 is between 20° and 20° (e.g., 15°) on either side of nadir 16 transversely to the elongated space longitudinal axis. The radiation pattern in the vertical component is highly directional as it has no up-light component and a lower light emittance intensity between nadir 16 and 10° at both sides of nadir 16.

The polar diagram of the lensed optics of the orientation specific luminaire shows that the horizontal light emittance pattern from the luminaire is roughly rectangular, with no null zones, wherein the longitudinal long axis of the pattern generated coincides with the long longitudinal axis of the elongated space or is parallel to at least one adjacent vertical surface. The pattern also shows relative equal light emittance intensity along the long "legs" of the rectangular pattern. The light emitted along the long legs is configured to illuminate the vertical surfaces of the elongated space.

FIGS. 5_a_ and 5_b_ show the bottom and side views of the lensed optics light distribution pattern.

FIG. 5_a_ shows a bottom view of a 3D wire frame web 330 representing the light emittance pattern for light emitted through the optical lenses of the orientation specific luminaire. The lines drawn represent both light emittance intensity and directionality. The "butterfly" pattern shows asymmetrical light distribution. The luminaire optics is configured to be placed over a walking aisle of an elongated space. The "wings" of the "butterfly" extending outwardly from the center show the vertical surfaces directed light 332.

The present figure shows the "wings" extending outwardly and away from one another in the opposite direction. This emission pattern shown infers that each of the "wings" is configured to illuminate vertical surfaces at an opposite side to one another. In a different optical arrangement, where an only one sided "butterfly" wing is used, the luminaire light emittance is directed toward a single vertical surface. In at least one lens optical embodiment, the other side of the lens can have a different light distribution.

The floor directed light 332 of the present wire frame 3D web is shown between the two "wings". The floor directed light 332 intensity outwardly is shorter than the vertical surface directed light 332. The present innovation restricts the light emitted over the horizontal surface of the elongated space to eliminate/reduce apparent glare by limiting the light exiting the luminaire to below 45° from the luminaire's nadir. As a result, the light emission intensity pattern is shorter.

As with the horizontal light emittance pattern shown in FIG. 4, the generated 3D wire frame web form of the present figure shows the outer sides of the "butterfly" "wings" relatively long and straight. The linearity of the "wings" form indicates a relatively consistent light emission intensity across the illuminated vertical surfaces.

Figure 5B:
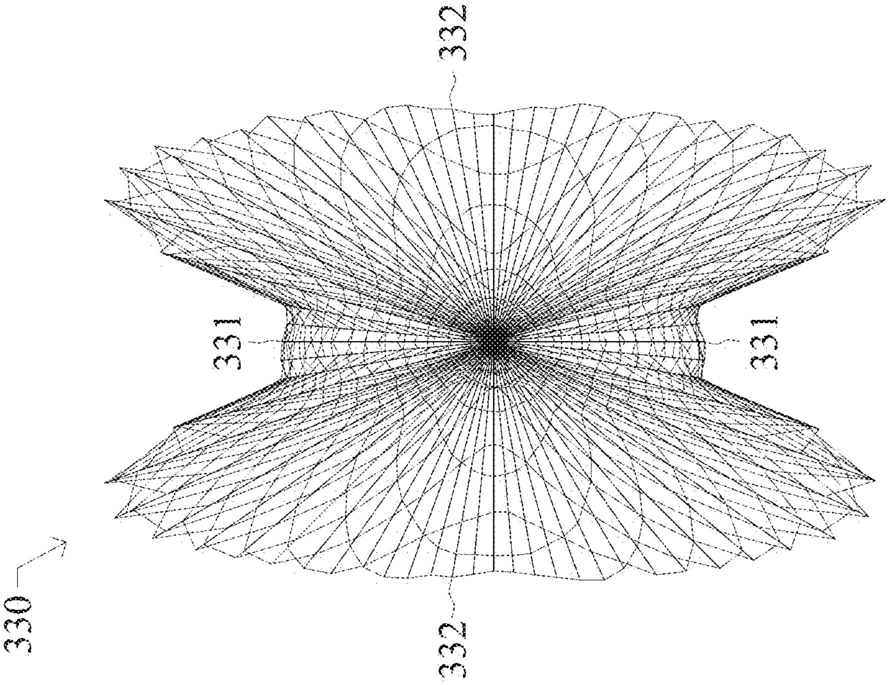
FIG. 5*a* and FIG. 5*b* show bottom and side views of the lensed optics light distribution pattern.
Figure 5A:
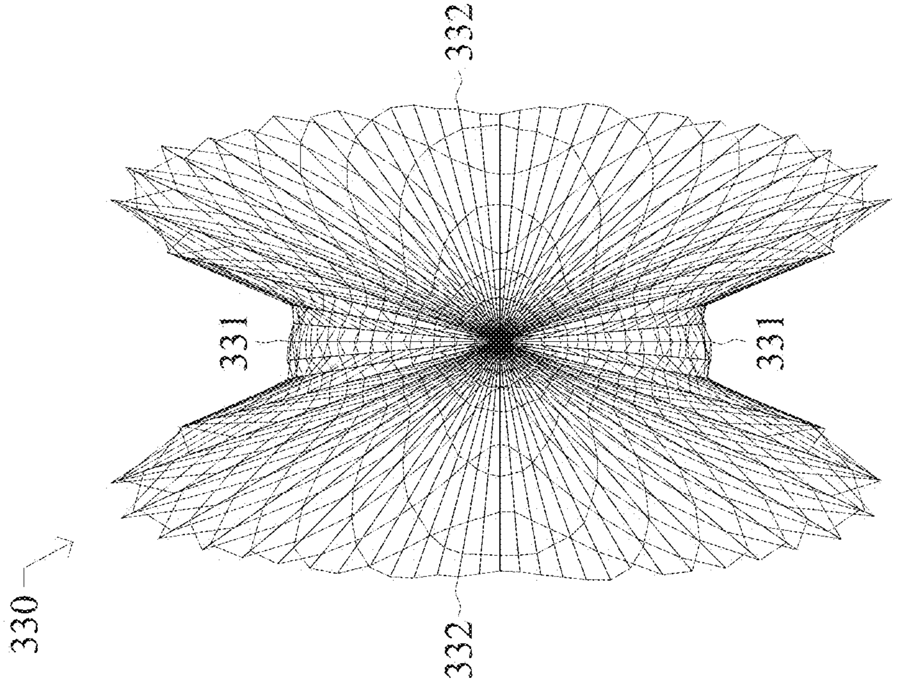

FIG. 5*b* shows a top view of a wire frame web 3D representing the light emittance pattern for light emitted through the optical lenses of the orientation specific luminaire. The light intensity pattern from the above view is substantially like the view from below shown in FIG. 5*a*.

Figure 6B:
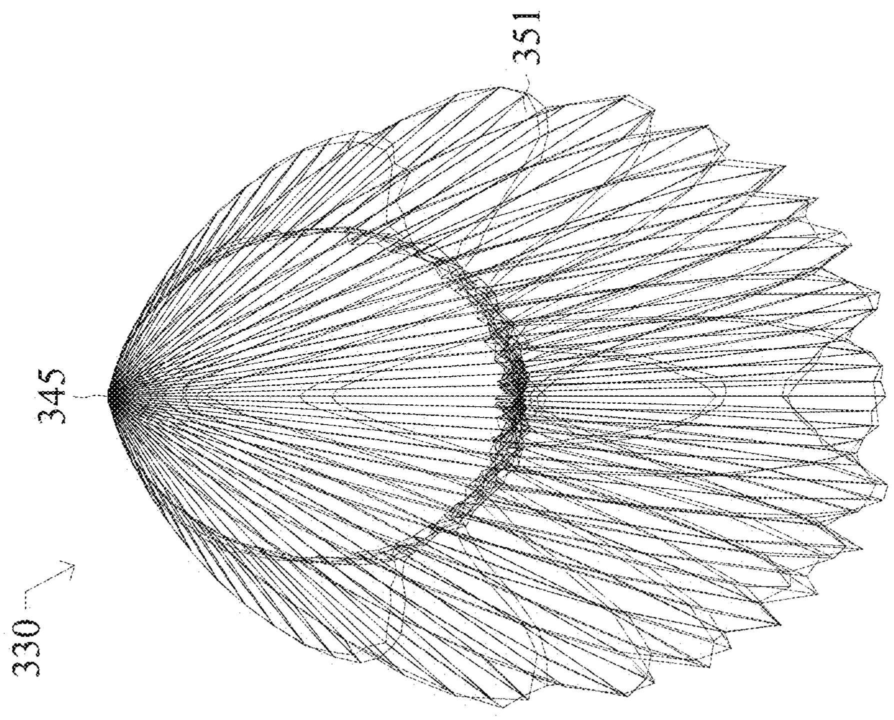
FIG. 6*a* and FIG. 6*b* show a longitudinal cross view and a parallel side view of the lensed optics light distribution pattern.
Figure 6A:
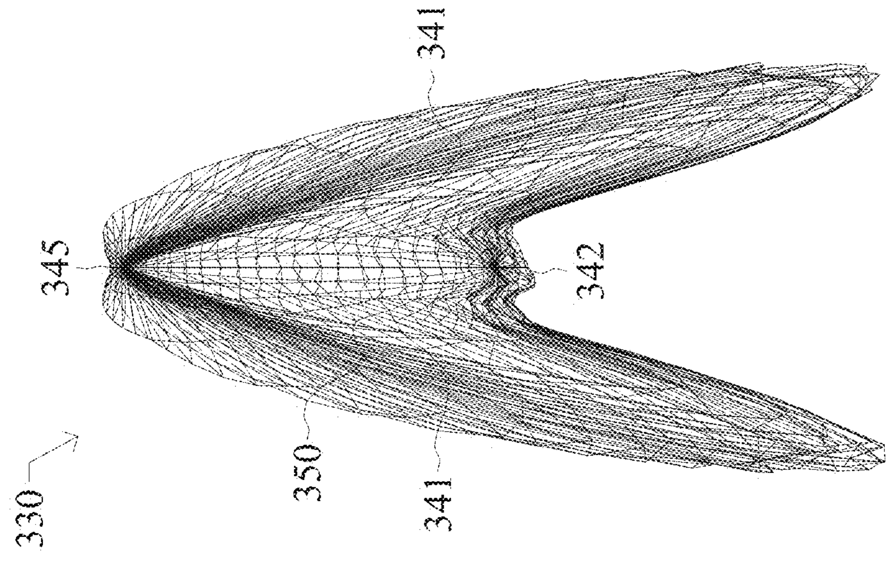

FIGS. 6*a* and 6*b* show the cross elongated space section and a longitudinal section through the lensed optics 3D wire frame web of the luminaire, respectively.

FIG. 6*a* shows the light source position 345 above the cross-emission pattern 350 3D wire frame web 330. The cross pattern shows the profile of two legs of light emission beams 341 extending down and away from the light source position 345. Each of the legs is configured to illuminate a vertical surface in the elongated space. Between the two legs, the intensity of light emittance is shown shorter. The bottom directed light beam profile 342 is configured to primarily illuminate the horizontal surface below the luminaire.

FIG. 6*b* shows a longitudinal section through the lensed optics 3D wire frame web of the luminaire parallel with the longitudinal long axis of the elongated space. The light source position 345 is shown at the top of the wire frame web 330. The vertical ellipsoidal form of the light emitted shows a wide longitudinal emittance pattern 351 when placed side by side next to the FIG. 6*a* cross section view. The darkened smaller ellipse outline represents the light intensity pattern directed toward the floor surface below.

Figure 7A:
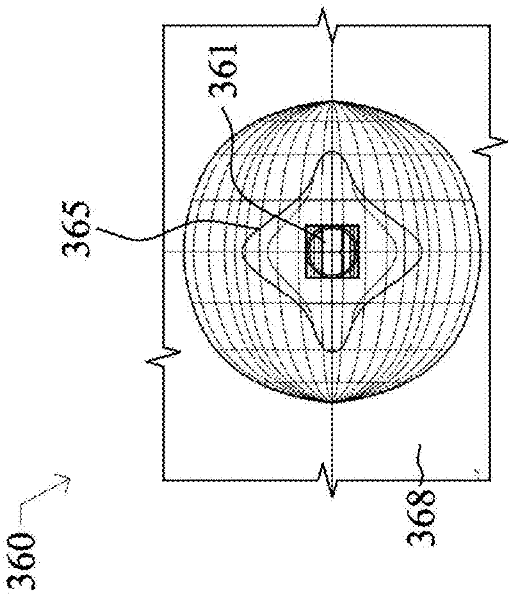
FIG. 7*a* is an upward view of a single optical lens.

FIG. 7*a* is an upward view of the structure of an optical lens (domed lens 360) that is disposed over a lamp 361 (e.g., LED) mounted on a lamp retaining surface 362 of a substrate (lens board structure 368). The LED 361 is mounted at the center such that light emitted from the LED 361 propagates through the material of the optical lens and is redirected by the optical lens according to the light emittance patterns discussed above with respect to FIG. 4 through FIG. 6*b*. The optical lens structure 365 from the upward view in FIG. 7*a* has a rounded outer perimeter, and 4-pointed star inner shape with rounded edges, as seen in FIG. 7*a*. The domed structure can be coupled to at least one more like dome structure to form an optical lensed board structure 368.

The lens board structure 368 with the plurality of lamp dedicated lenses can be mounted to a luminaire structure positioned precisely over the lamp the individual lens is dedicated to. A luminaire can employ at least one lens board structure. The lens board structure 368 can include domed lenses that are at least one of, a symmetrical light distribution pattern, an asymmetrical light distribution pattern, and a combination of both light distribution patterns thereof.

Figure 7B:
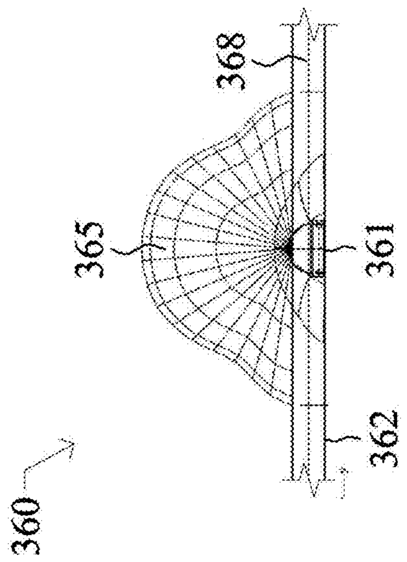
FIG. 7*b* is a view of the optical lens that is from a direction parallel to the vertical sidewalls of the walkway.

FIG. 7*b* is an elevation viewed from a direction that is parallel to the vertical rack faces 2 (FIG. 1). The optical lens profile in this view is somewhat bell-shaped and optimized to direct light over the height of the adjacent rack. Directing light in this manner creates a maximum illuminance at eye level with a smooth decrease over the top of the rack.

Figure 7C:
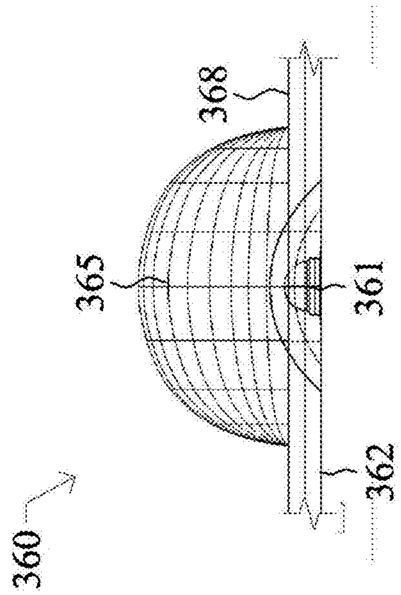
FIG. 7*c* is a view of the optical lens orthogonal to that of FIG. 7*b*.

FIG. 7*c* is an elevation viewed perpendicular to the view in FIG. 7*b* and has a shape that is optimized for glare control in a vicinity of the person 20 (FIG. 1).

Figure 7D:
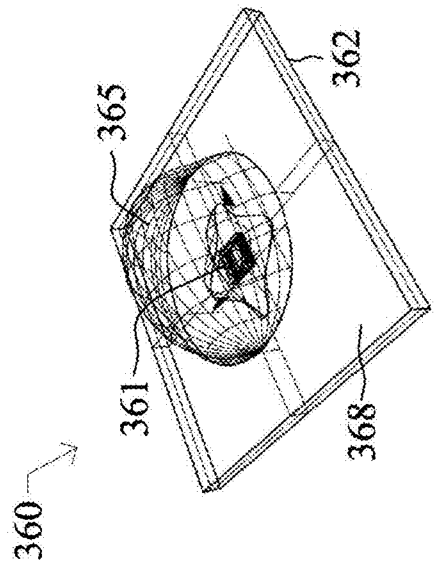
FIG. 7*d* is a perspective view of single optical lens.

FIG. 7*d* is a perspective view of the optical lens with lines showing the contours of the outer periphery of the optical lens structure 365, and the internal contours showing the opening that allows the lens to be placed over the LED 361 shown in the center thereof.

Figure 8B:
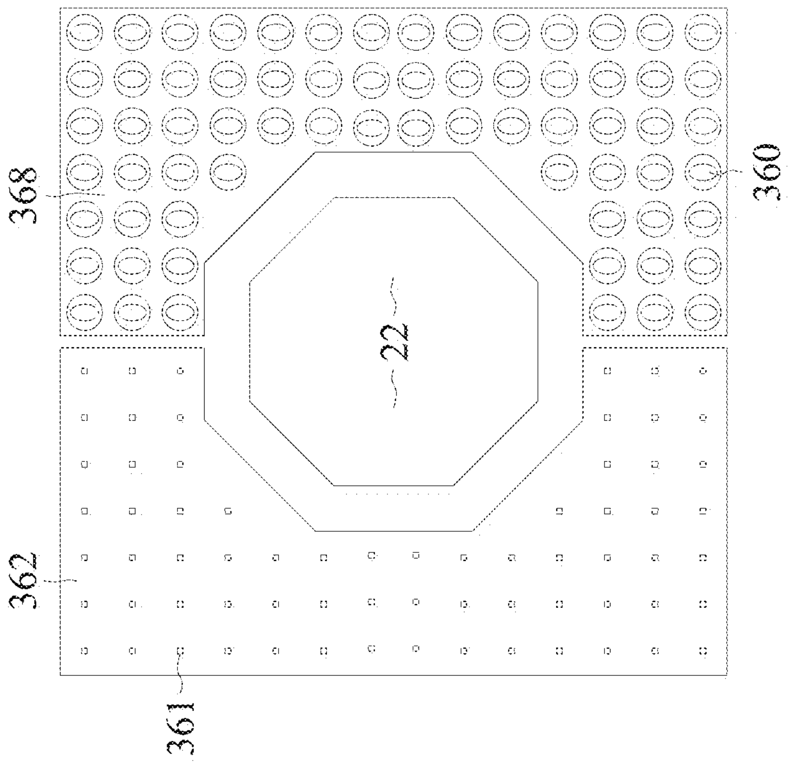
FIG. 8*a*, FIG. 8*b*, FIG. 8*c*, FIG. 8*d*, and FIG. 8*e* show an exemplary planar lamp retaining surfaces populated by lamps with lensed optic above a round form and a square form luminaire respectively.
Figure 8A:
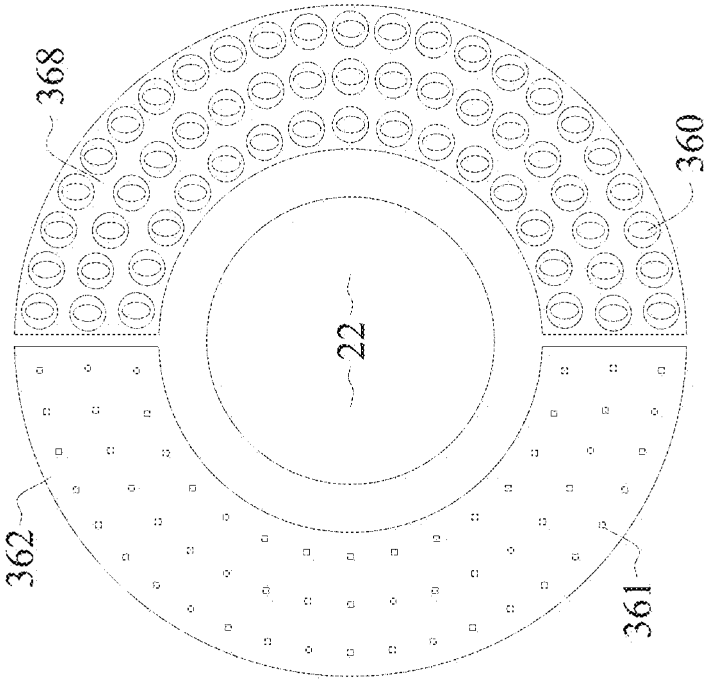

FIGS. 8*a* and 8*b* show an exemplary planar lamp retaining surfaces populated by lamps with lensed optic above a round form and a square form luminaire respectively.

The light source retaining board with lensed optics 24 above, of the orientation specific and/or the non-orientation specific luminaire 5 can take any form. The use of reduced form light source in conjunction with dedicated reduced lens optics is a relatively new optical design approach. This design approach marks a departure from art that relies on a light source retaining board with a lens optical distribution of narrow, medium, and wide light patterns.

The lenses used with the luminaire 5 may be customized for an application while capable of illuminating at least one vertical and horizontal surface/s meeting light levels targeted.

FIG. 8*a* shows two optical lens systems arranged about a central axis of a round opening: the lens system on the left shows LED lamps 361 that are not covered by lenses (although in practice some or all would be covered by lenses), and the lens system on the right is covered by lenses 360 on a lens board structure 368. The lens systems in FIG. 8*a* can couple to two crescent shaped PCBs 15, 362 with LED lamps arranged in correspondence to coupled optical lenses 360. In at least one embodiment, at least one first optical lens 360 can be configured to direct light toward a surface near by the luminaire and at least one second lens is configured to direct light to a remote surface wherein the optical arrangement of the at least one first optical lens 360 differs from the optical design of the at least one second optical lens 360.

The present figure orientation specific lens optical light emittance pattern is pre-configured in relation to at least one horizontal surface and at least one adjacent vertical surface, and a plurality of same design lenses placed over their respective dedicated lamps illuminate the targeted surfaces at the targeted illuminance levels where needed.

FIG. 8*b* shows a single square formed optical lens system that fits over a PCB 15, 362 with a polygonal-shape (e.g., square, rectangular, polygonal, etc.). Similarly to the crescent shaped lensed optics of FIG. 8*a*, the lens shown can be comprised of a plurality of lenses configured to direct the LED light emitted through the lens toward a pre-configured field of illumination below and/or at the side of the luminaire. On the left, the lens board structure 368 and lens 360 are omitted for clarity and to show a spatial correspondence to the lamps 361 and the lenses 360.

The present figure orientation specific lens optical light emittance pattern is pre-configured in relation to at least one horizontal surface and at least one adjacent vertical surface, and a plurality of same design lenses placed over their respective dedicated lamps illuminate the targeted surfaces at the targeted illuminance levels where needed.

Figure 8E:
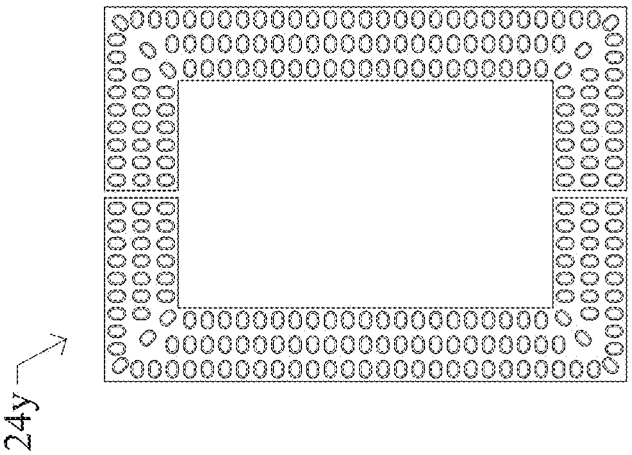
Figure 8D:
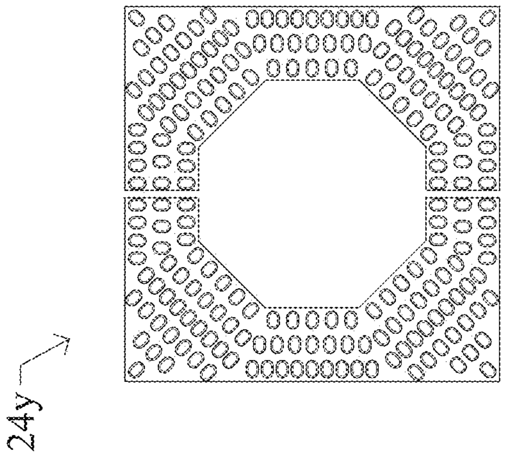
Figure 8C:
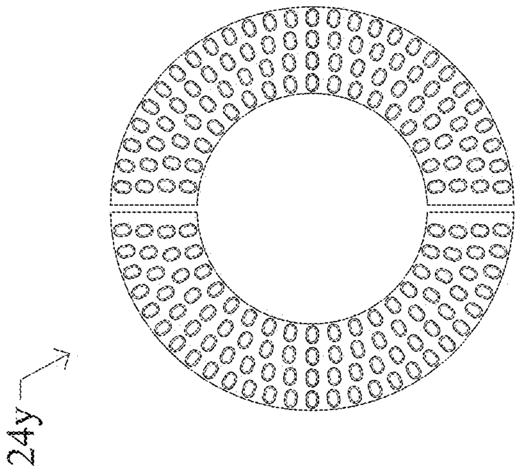

FIGS. 8*c*, 8*d* and 8*e* show by example three forms of optical lenses that can couple to an orientation specific and/or an orientation non-specific luminaire.

The lensed optics 24*y* of the orientation specific and/or the non-orientation specific luminaire 5 can take any form. This also marks an optical design departure from art that provides generic light optical distribution by form of narrow, medium, and wide light pattern distribution. The lenses used with the luminaire 5 may be customized for an application while capable of illuminating at least one vertical and horizontal surface/s meeting light levels targeted.

FIG. 8*c* shows two optical lenses 24*y* arranged about a central axis of a round opening. The lenses 24*y* in FIG. 8*c* can couple to two crescent shaped PCBs 15*y* with LED lamps arranged in correspondence to the coupled optical lens 24*y*. At least one first optical lens 24*y* is configured to direct light toward a surface near by the luminaire and at least one second lens is configured to direct light to a remote surface wherein the optical arrangement of the at least one first optical lens 24*y* differs from the optical design of the at least one second optical lens 24*y*.

FIG. 8*d* shows a single square formed optical lens 24*y* that fits over a PCB with a polygonal-shape (e.g., square, rectangular, polygonal, etc.). Similarly to the crescent shaped lensed optics of FIG. 8*a*, the lens shown can be comprised of a plurality of lenses configured to direct the LED light emitted through the lens toward a pre-configured field of illumination below and/or at the side of the luminaire.

FIG. 8*e* shows a rectangular lensed optics comprising two "U" shaped lenses abutting one another at their short legs. The U-shaped lenses fit over a U-shaped PCB that hosts the LEDs. Unlike the round and the square formed optical lenses that are symmetrical about their vertical central axis, the present rectangular lensed embodiment is asymmetrical. Further, the present example shows different sized lensed optics wherein the short leg of each section shows larger sized lenses.

The exemplary lens configurations show that the light delivery form of a luminaire is not contingent on the luminaire form but rather what the light level intensity is expected at the face of a horizontal and/or a vertical subfield of illumination.

Figure 9A:
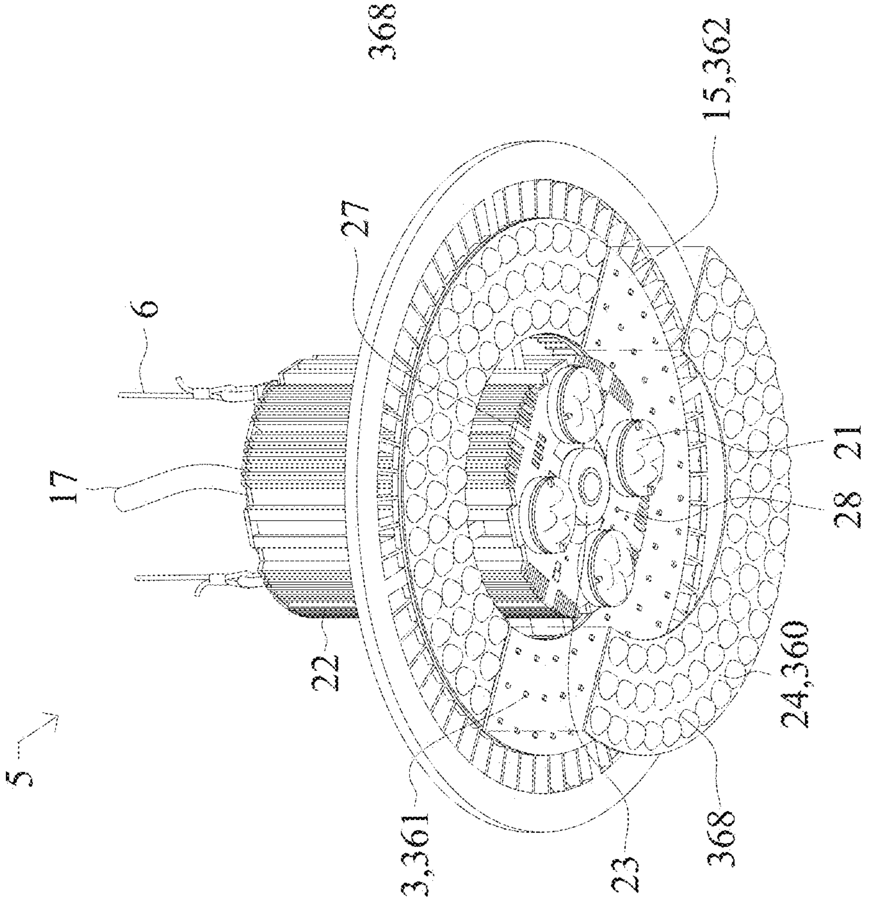
FIG. 9*a* and FIG. 9*b* show respective bottom perspective and top perspective views of an exemplary luminaire with optical lenses coupled to the luminaire's floor facing and ceiling facing surfaces.
Figure 9B:
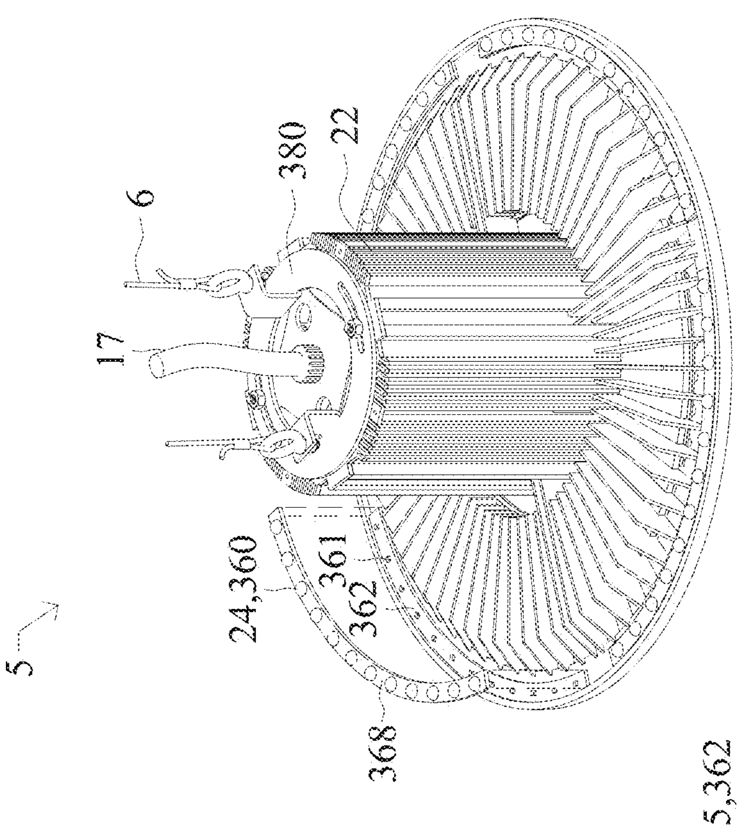

FIGS. 9*a* and 9*b* show bottom perspective and top perspective views of an exemplary luminaire with optical lenses coupled to the luminaire's floor facing and ceiling facing surfaces respectively.

FIG. 9*a* shows a worm eye perspective view of a round form orientation specific luminaire coupled to orientation specific lensed optics. A dedicated lensed optics 24, 360 is shown for each light source 3, 360. In another embodiment a lensed optics 24, 360 can be placed over a plurality of light sources 3, 360 (not shown). Further, a plurality of light sources 3, 360 can couple the PCB 15, 360 of at least one of different, size, watt input, color rendition, and chromaticity (not shown).

The light sources 3, 361 coupled to the PCB 15, 362 can be energized by at least one circuit (not shown). The plurality of circuits can control the light emitted by an individual PCB 15, 362 or individual lights on the PCB 15, 362. For example, during off hours, LEDs that emit UV light can decontaminate a space. The PCB 15, 362 with its coupled light sources 3, 361 and lensed optics can be detachable and replaceable by different lensed optics 24, 360 as needed.

FIG. 9*a* also shows the luminaire 5 with an electronic device housing 22, a cable/chain 6, an emergency egress light source 21, switches 27, an indicator light 28, and an IOT device (with a processor and memory, and optional a transceiver) as an occupancy sensor/camera 23.

FIG. 9*b* shows a top-down perspective view of the round form orientation specific luminaire 5 coupled to ceiling facing lensed optics 368. The up-light component of the luminaire 5 can be used with the orientation specific luminaire and the non-orientation specific luminaire. A wide-angle lensed optic 24, 360 placed on the lamps 3, 361 can uniformly illuminate a ceiling above.

The present embodiment shows at least two lamps 3, 361 covered by the lensed optics 24, 360 at opposite side of the luminaire 5 structure. Having the lamps 3, 361 positioned above and away from the electronic device housing 22 of the luminaire 5 eliminates the risk of shadowing a portion of the ceiling. Further, placing the up-light lamps 3, 361 at the luminaire's 5 outer perimeter having a through air gap between these up-light lamps 5 and the downlight directed lamp 5 light helps cool the lamps 5 during operation.

FIG. 9*b* shows the top surface of the orientation specific luminaire 5 coupled to a rotational orientation hub 380. The luminaire 5 rotates about its central vertical axis, secured to the mounting rotational hub 380, to optimally illuminate at least one of, a vertical surface and a horizontal surface within the elongated space.

Other elements shown coupled to the luminaire 5 include a mounting cable/chain 6, a power and/or data conductor 17, and the luminaire's electronic device housing 22.

Figure 9C:
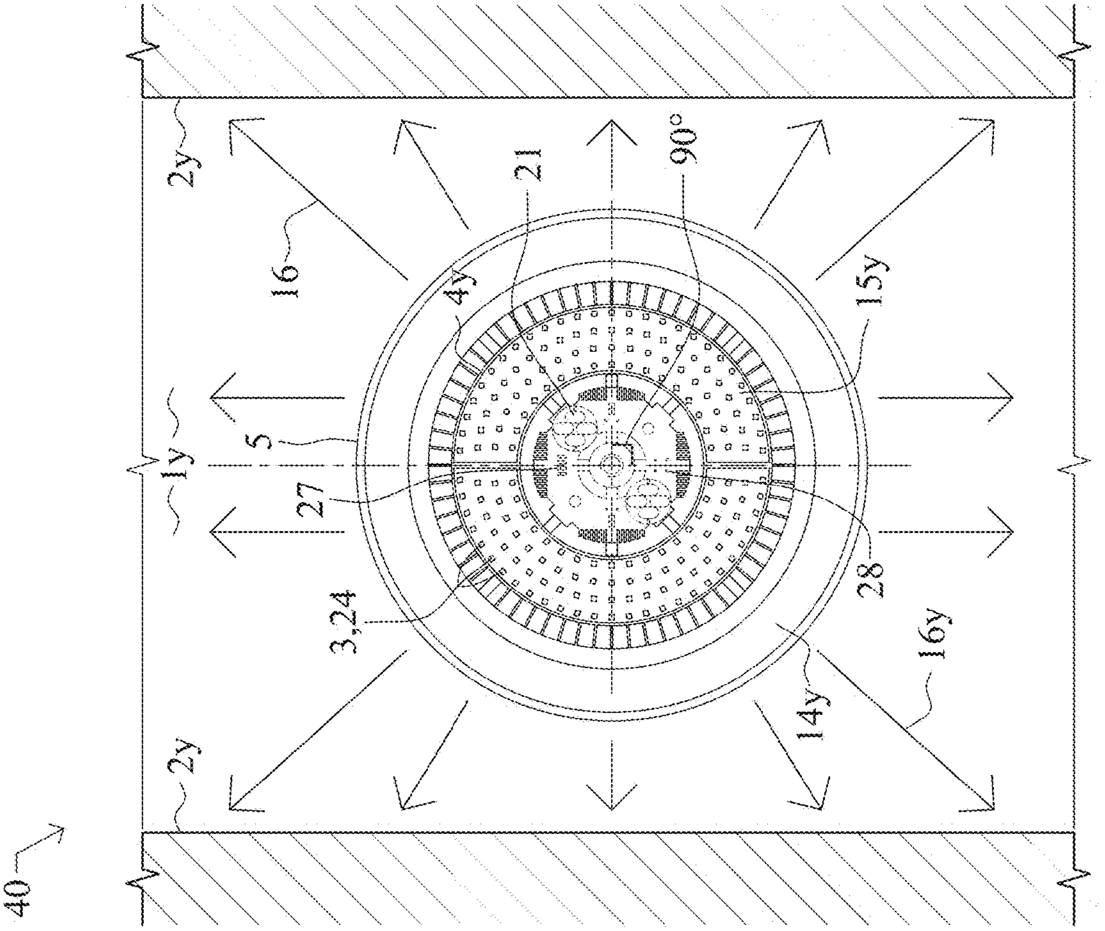
FIG. 9*c* shows a round luminaire with two coupled crescent shaped PCBs retaining a plurality of LED lamps disposed over an elongated space.

FIG. 9*c* shows a round orientation specific luminaire 5 with two coupled crescent formed PCB's retaining a plurality of LED lamps mounted above an elongated space aisle 40. The elongated space 40 includes at least a horizontal surface/floor 1*y* (sometimes referred to as an aisle horizontal surface), and vertical surfaces 2*y* (sometimes referred to as a face or a rack). FIG. 9*c* is shown from the perspective of a ceiling above the luminaire 5 and to which the luminaire 5 is supported directly, or indirectly. The elongated space 40 is typically defined by an aisle floor 1*y* with vertical surfaces 2*y* adjacent to the long side of the aisle's floor surface 1*y*. The orientation specific luminaire 5 is configured to be mounted above an aisle 1*y* of an elongated space 40 with specific orientation lensed optics 24*y*. The specific orientation lensed optics is disposed over a plurality of LED lamps 3 coupled to at least one PCB 15*y*. The at least one PCB 15*y* is coupled to a retaining heat sink 4*y* that in FIG. 9*c* is shown coupled to the luminaire's electronic device housing 22 (see FIG. 9*d*). In this embodiment two crescent shaped PCBs 15*y* are included, along with a central hub that includes egress light sources 21, switch 27, and indicator lights 28.

Figure 9D:
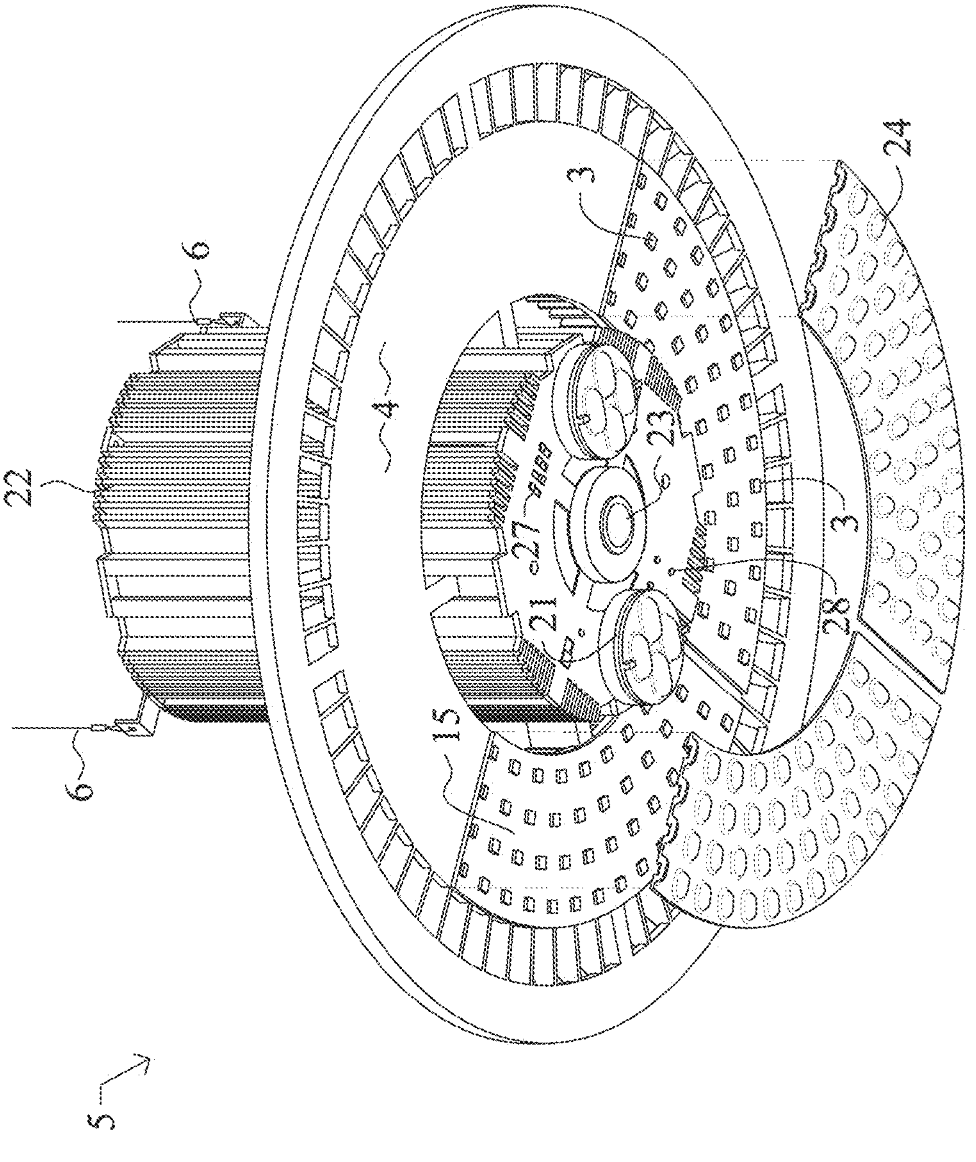
FIG. 9*d* is a bottom view perspective of the orientation specific luminaire with a crescent shaped optical lens detached from the PCB with coupled LED lamps.

In FIG. 9*c* the orientation specific luminaire 5 is shown mounted above a racked aisle 10 (as shown in FIG. 5), and in FIG. 9*d* a perspective view of the luminaire 5 is shown. At the bottom face of the luminaire's electronic device housing 22 several power consuming devices are shown coupled. The devices shown include an emergency egress light source 21 (which itself includes multiple LED lamps as shown), a camera/occupancy sensor 23, and a transceiver 26. The transceiver may be wired or wireless, and provides signals to/from a controller that is also housed in the luminaire's electronic device housing 22. A plurality of electronic devices with different functionality are optionally coupled to the electronic device housing 22. These devices can couple to the electronic device housing by a plurality "plug n' play" universal low voltage receptacles. The receptacles can be configured to convey only power, or power and data.

Briefly touching on the emergency egress light source 21, FIGS. 9*c* and 9*d* show two such emergency egress light sources 21 coupled to the electronic device housing 22. Each of these devices has a directional light beam, the orientation of which is set by rotation to align over a path of egress. The two devices are arranged back to back to illuminate a linear path of egress on the aisle surface 1*y*.

Briefly touching on the occupancy sensor/camera with transceiver 23, in at least one embodiment the occupancy sensor/camera with transceiver 23 include one or more processors that provide image detection, and can identify a forklift stopped in its vicinity and cause the light to dim under condition the forklift it detected. Dimming the light reduces the eye strain of the forklift operator and can help avoid injury and/or damage. Similarly, a communication device coupled to the forklift automatically or an operator of the forklift manually can direct a luminaire in the immediate vicinity to dim its output light intensity.

Other electronic features that can be integrated with the electronic device housing 22 include at least one of, an indicator light 28 and a switch 27. In at least one embodiment the switch 27 can control at least one of, a lighting circuit, light output, power input to a light source, color temperature of a light source, and/or associated other device/s with the light source/s such as an up-light lighting component.

The orientation specific luminaire 5 shown in FIG. 9*c* includes a reflector/refractor 14*y* extending downwardly from a perimeter of the luminaire. While the optics of the orientation specific luminaire directs the output light from the LED lamps to meet all illumination requirements within an elongated space, architecturally in specifically retail spaces, a reflector, or a refractor appearance and/or added performance is often desired as a compliment. Thus, the present embodiments include the reflector or refractor and an optional accessory.

Arrows in FIG. 9*c* represent light rays emanating from the specific orientation luminaire 5. The arrows represent a controlled approach to casting the luminaire's light within the elongated space 40. A portion of the light emitted is configured to illuminate the face of the racks of the vertical surface 2*y* and the remainder of the light emitted illuminate the floor surface 1*y* below. In at least one different embodiment (not shown), the orientation specific luminaire 5 can have an additional light source illuminating at least one surface above the luminaire 5.

The illumination solution of the present embodiment employs a substantially horizontally disposed planar light emitting surface to illuminate both horizontal and vertical surfaces.

Furthermore, the light delivered over the horizontal and vertical surfaces is precisely configured to fall where needed at the specified light level intensity. To achieve this fit, dedicated lensed optics are positioned above at least one LED lamp to direct light from the individual LEDs toward particular locations on the vertical surface. Overlap of separate light combine to provide a total luminance in respective subregions across the vertical surface.

FIG. 9*c* shows two crescent formed PCBs 15*y* coupled to the orientation specific luminaire 5 heat sink 4*y*. The PCBs 15*y* show a plurality of LED lamps 3 coupled with the lensed optics 24*y* (also see FIG. 9*d*) disposed over the LED lamps 3. Each one of the PCBs 15*y* is configured to illuminate at least one vertical and horizontal surface 1*y*, 2*y* (FIG. 5) from the orientation specific luminaire 5. In a different embodiment, one PCB or several PCBs with coupled LED lamps and lensed optics can equally illuminate these surfaces; however, for clarity the present figure shows the two crescent formed PCB's arranged about the longitudinal axis of the aisle surface 1*y* below.

The distribution pattern of LED lamps around the PCB 15*y* are typically printed in concentric arcs (portions of a ring) about the vertical central axis of the PCB. Another approach that can be useful in designing and forming the lensed optics placed above the LED lamps 3 is orthogonal printing. For illustration purposes, the LED lamps 3 shown on the left side PCB 15*y* are printed concentrically, while the LED lamps 3 shown on the right side PCB 15*y* are printed orthogonally (e.g., in a grid array).

The PCB/s with the coupled LED lamps and lensed optics above can be scaled up/down. The assembly can be detached from the luminaire wherein the luminaire can be fitted with a different PCB lamp/optics arrangement. Such an arrangement can configure different luminaire mounting heights and/or aisle widths. The arrangement of LED lamps with their respective lensed optics can zone the lamps differently, employ different lamp size, color temperature, lamp chromaticity and input power.

Further, each PCB can have at least one power circuit and where more than one circuit is used, each circuit can be controlled differently or in unison. For example, referring to dimming a portion of the luminaire 5 light during stocking, when a sensing device such as an occupancy sensor and/or the camera with transceiver 23 sends a signal to the luminaire, only the circuit illuminating the horizontal aisle surface 1*y* is dimmed or turned off while the racked vertical surface 2*y* is fully or partially illuminated. The transceiver can also be separate from the camera.

FIG. 9*d* shows a bottom perspective view of the orientation specific luminaire with a crescent form optical lens detached from the PCB with coupled LED lamps. FIG. 3 shows a partial view of a crescent shaped luminaire heat sink 4*y*. The heat sink 4*y* is exposed and sized to receive a PCB 15*y* with a plurality of LED light source/s 3 and optics 24*y* over the PCB 15*y*.

On a bottom side of the exposed heat sink 4*y*, there are two partial PCB 15*y* sections with coupled light sources 3 that are shown to be coupled to the luminaire's heat sink 4*y*. Two partial lensed optics 24*y* shown below the PCB's 15*y* are configured to be positioned below and in proximity to corresponding light sources 3. The lensed optics 24*y* is key for delivering the specified light levels onto designated surfaces.

For this reason, both the orientation specific and the non-orientation specific lensed optics is/are designed by computer modeling, with design variables including at least one of, luminaire mounting height, luminaire spacing, the horizontal distance from the luminaire's nadir to a vertical illuminated surface, luminaire distance from targeted horizontal and/or vertical light levels, the light emitted uniformity ratio on the horizontal and/or vertical surfaces, directivity of respective lenes, and output levels from each LED. Composite light levels (overlapping light from different LEDs and corresponding lenses) set the illumination level experienced at particular subregions on the vertical surface and horizontal surface of the aisleway.

FIG. 9*d* also shows a dedicated lensed optics 24*y* for each light source 3. In another embodiment a lensed optics 24*y* can be placed over a plurality of light sources 3 (not shown). Further, a plurality of light sources 3 can couple the PCB 15*y* of at least one of different, size, watt input, color rendition, and chromaticity (not shown).

The light sources 3 coupled to the PCB 15*y* can be energized by at least one circuit (not shown). The plurality of circuits can control the light emitted by an individual PCB 15*y* or individual lights on the PCB 15*y*. For example, during off hours, LEDs that emit UV light can decontaminate a space. The PCB 15*y* with its coupled light sources 3 and lensed optics can be detachable and replaceable by different lensed optics 24*y* as needed.

Figure 10:
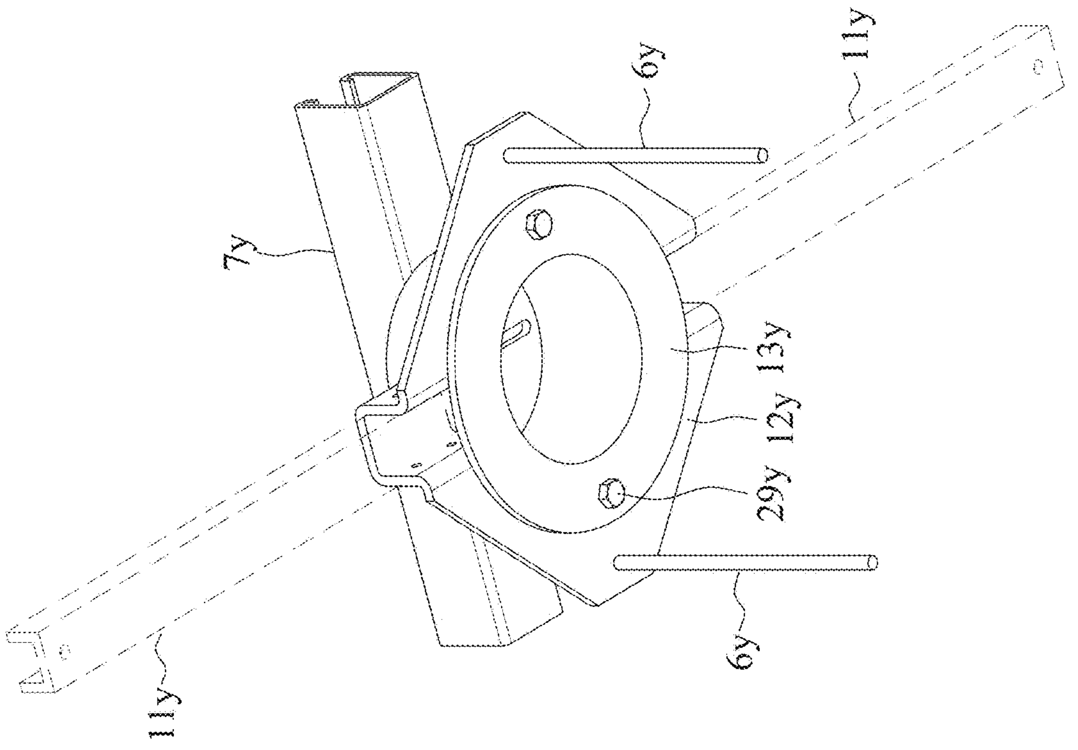
FIG. 10 is a diagram of a single point mechanical orientation mounting device for a luminaire with horizontal rotational capability.

FIG. 10 is a diagram of a single point mechanical orientation mounting device for a luminaire with horizontal rotational capability.

FIG. 10 shows a single point mechanical orientation mounting device for a luminaire with horizontal rotational capability. Moreover, this mechanical orientation mounting device may be used in conjunction with the orientation specific luminaires discussed herein. A more detailed description of the mechanical orientation mounting device is provided in U.S. patent application Ser. No. 18/381,231. The present disclosure elaborates more fully on a system arrangement having the mechanical orientation mounting device 9*y*, the luminaire coupled below, and the suspension cable and/or chain 6 coupling the two elements.

The mechanical orientation mounting device is configured for use with all luminaire forms requiring alignment, especially with luminaire lighting optical dispersion patterns that require an alignment with at least one of, a horizontal surface and a vertical surface. In addition, in at least one embodiment, the mechanical orientation mounting device can include power or power and data conveyance circuit/s to the luminaire and/or beyond (not shown).

The mechanical orientation mounting device can house a "plug n' play" power or power and data distribution device. Modular power or power and data conductors can then couple to the power/data distribution module from the exterior of the mechanical orientation mounting device including a drop cable that can couple to the luminaire (not shown). It is noted that the "all in one system" described above can provide luminaire orientation capability by a mono-point mounting device and power or power and data conveyance.

The mechanical orientation mounting device comprises two key elements—an alignment device flange 13*y* and a rotational disk 12*y*. The alignment device flange 13*y* is affixed to the support structure 7*y* above. The rotational disk 12*y* is positioned above the alignment device flange 13*y* and is configured to rotate about the vertical central axis of the mechanical orientation mounting device.

The rotational disk 12*y* at opposing sides of the flange 13*y* below, has elongated crescent shaped through bores arranged about the vertical central axis of the mechanical orientation mounting device (not shown). These elongated bores are configured to vertically align with through bores in the flange of the alignment device flange 13*y* (not shown).

At least two suspension cables/chains 6*y* couple to the rotational disk 12*y*. The suspension cables/chains 6*y* at their opposite sides couple to a luminaire. FIG. 10 shows the cables/chains 6*y* coupling directly to the rotational disk 12*y*. In a different embodiment where large size luminaires and/or other voluminous objects are mounted to the mechanical orientation mounting device, extender arms 11*y* can be used. FIG. 10 shows the extender arms 11*y* disposed at 90° to the direct mount arrangement.

FIG. 10 also shows alignment bolts 29*y* coupled to the bottom side of the alignment device flange 13*y*. These bolts secure the alignment of the luminaire in place. The bolts fixedly engage the rotational disk 12*y* to the alignment device flange 13*y* through their reciprocating bores. An installer installing a luminaire that requires a specific orientation can then either align and secure the rotational disk 12*y* in place or suspend the luminaire first and then align and secure the rotational disk 12*y* in place.

Figure 11B:
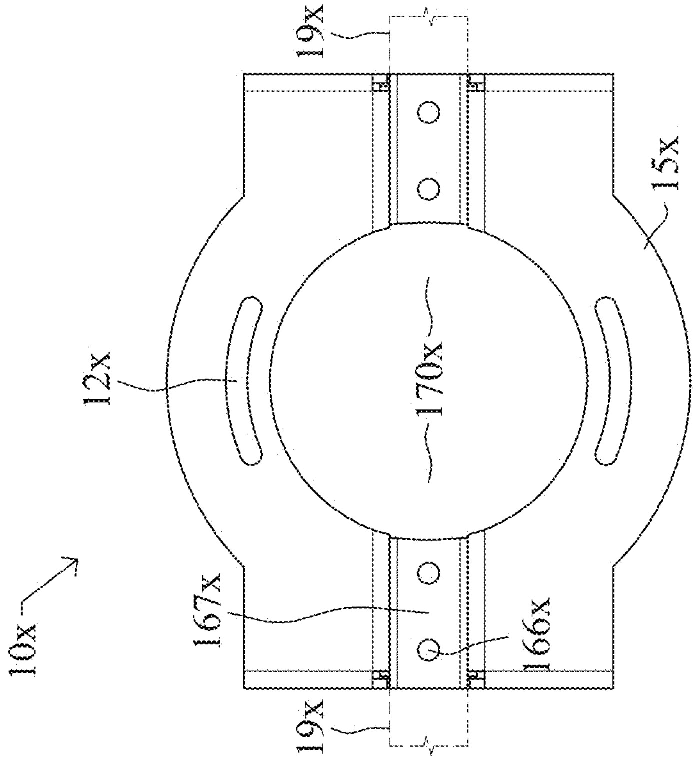
FIGS. 11*a* and 11*b* show enlarged top and bottom views of the rotational hub embodiments.
Figure 11A:
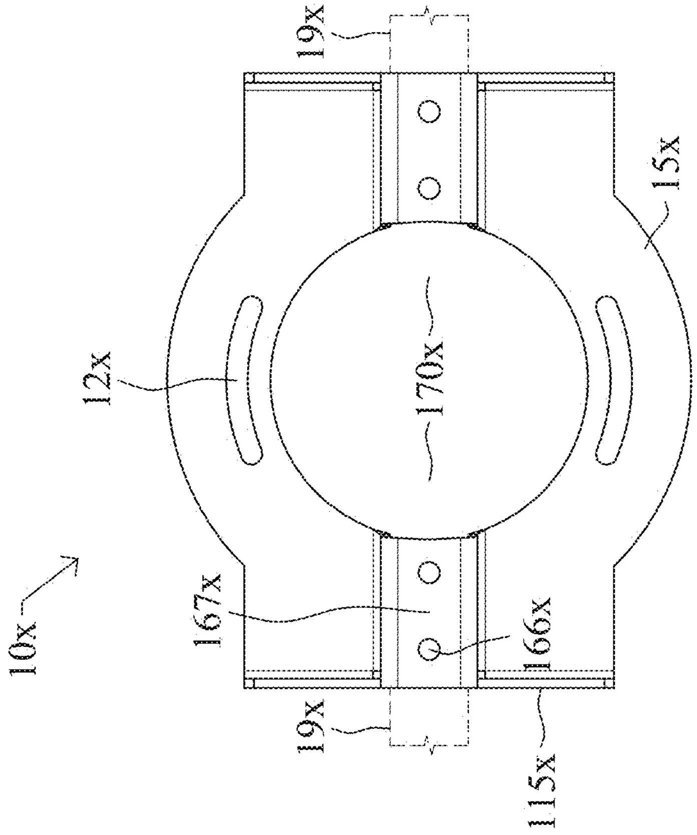

FIGS. 11*a* and 11*b* show enlarged top and bottom views of the rotational hub embodiments.

FIG. 11*a* shows a top view of hub 10*x*. The hub 10*x* is functionally the same as the hub shown in U.S. patent application Ser. No. 18/406,136. In U.S. patent application Ser. No. 18/406,136 (see FIGS. 11a and 11b therein) the hub is shown resting on a J box flange wherein the J box is coupled to a support structure above. FIG. 11*a* and FIG. 11*b* in the present application show a portion of the hub's disk 15*x* trimmed to align the hub's disk 15*x* with the vertical walls of the luminaire device housing to which the hub couples. The elements shown include a central opening 170*x*, an elongated bore (or opening) 12*x*, the hub disk 15*x*, an extender arm base 167*x*, a mounting bore 166*x*, and in dashed line a portion of an extender arm 19*x*.

The hub 10*x* is configured to be mechanically coupled (e.g., via fasteners) to a top surface of a mechanical or electromechanical device (not shown). The hub 10*x* enables the alignment of a coupled device by rotational orientation. The hub 10*x* can be configured to be used with both mechanical and electromechanical embodiments of different shapes and sizes.

The present embodiment hub 10*x* is configured to couple to a luminaire (not shown) by two coupling protrusions 13*x* (FIG. 13*b*) configured to extend upwardly from the top surface of the luminaire's device housing. Each protrusion 13*x* can be a threaded studs that extend through the elongated bores 12*x* of the hub disk 15*x* upwardly with fasteners coupling the device to the hub disk 15*x*. In different embodiments, bores formed in the top surface of the device can be configured to receive a threaded bolt from above through the elongated bore 12*x* of the hub disk 15*x*.

Once coupled to the hub 10*x*, the luminaire can pivot about its vertical axis using the elongated bore as guide tracks for aligning with at least one of, a like luminaire, a mechanical/electromechanical device, and a target surface to be illuminated by an orientation specific luminaire optics. The protrusions 13*x* coupled to the orientation hub 10*x* can provide at least one of a means to rotate a luminaire/device to align a luminaire with a like luminaire and/or orient luminaire optics to illuminate target surface. Orienting the luminaire can be done powered or non-powered.

The top surface of hub 10*x* can have marking corresponding to at least one reference marking on a surface of a coupled luminaire below or any other coupled device (not shown). The marking on hub 10*x* in relation to the at least one reference marking of the coupled device, can provide angular rotational displacement reading of the coupled device from base reference. Using the marking to rotationally orient the coupled luminaire/device about the central vertical axis of the hub 10*x* enables setting in place the device orientation prior to lifting and mounting the coupled assembly.

At opposite ends of the hub 10*x*, hub extender arm bases 167*x* are configured to retain extender arms 19*x*. The hub extender arm bases 167*x* are shown elevated above the surface of the hub's disk 15*x*. The present figure shows partial extender arms 19*x* drawn in dashed line. The extender arms 19*x* are secured to the hub disk 15*x* by fasteners that can be placed from the top of the extender arm base 167*x* mounting bores 166*x*. The extender arms 19*x* at the opposite ends are coupled to a suspension cable or chain (not shown).

The cable or chain can couple directly to the extender arm/s 19*x* or couple to an intermediate fasteners like an eye loops that coupled the extender arms. The present figure also shows folds 115*x* in the hub disk 15*x* flat surface. The folds 115*x* provide the hub disk 15*x* extra structural strength to support the load imposed by the coupled device on the hub 10*x*.

The hub central opening 170*x* is sized to accommodate at least one of power or power and data conductor/s connectivity to the luminaire device housing (not shown), through air flow for heat dissipation, switching devices, receptacles, and access to any other devices coupled to the top surface and or inside the luminaire device housing. The form and size of the rotational orientation hub 10x can vary to adapt to the form, size and weight of the device coupled from below.

Summarizing the coupled to a device (including a luminaire) rotational hub utility:

a. The hub two-point suspension connectivity provides a redundant safety measure to protect life and property below. When one suspension member fails, the other has the structural capacity to support the suspended assembly.
b. The hub two-point suspension connectivity maintains the orientation of the coupled device intact even when the device encounters a moving object.
c. The hub enables the rotation of the coupled device to have it aligned with a surface and/or a like device. The alignment orientation can be performed powered or unpowered.
d. The hub structure is structurally configured to securely support the entire assembly weight.
e. The hub is an inexpensive and easy to fabricate structure that can be formed anywhere across the planet.
f. The hub coupled to extender arms enables widening the distance between mounting suspension points where needed.

FIG. 11b shows the bottom side of hub 10x that is configured to, at least in part, to couple to the top surface of the luminaire device housing. The planar surface of hub disk 15x is substantially flat except for the inverted hub extender bases 167x that are located at opposite sides of the hub central opening 170x. The inverted hub extender bases 167x show a plurality of mounting bores 166x. The mounting bores 166x correspond to reciprocating bores in coupled extender/s arms 19x secured together by mechanical fastener/s. The hub 10x couples from above to a mechanical or electromechanical device and is configured to support the device weight with or without extenders.

Figure 12B:
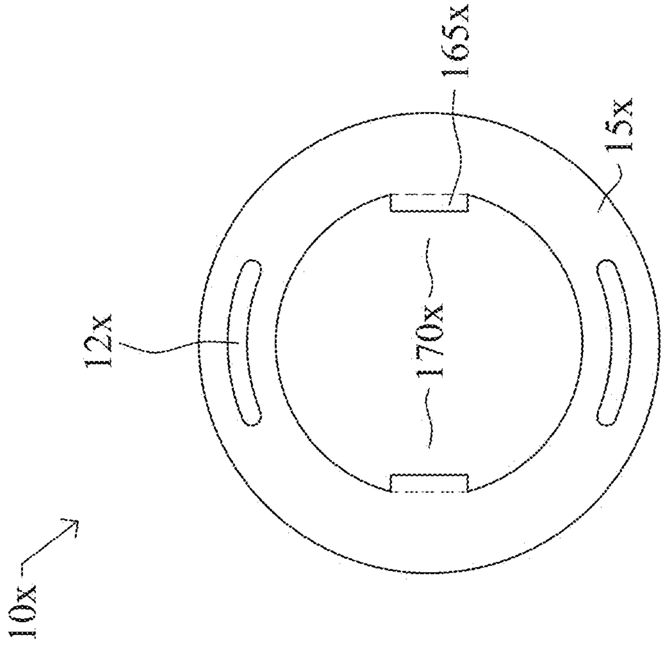
FIGS. 12*a* and 12*b* show enlarged top and bottom views of alternate rotational hub embodiments.
Figure 12A:
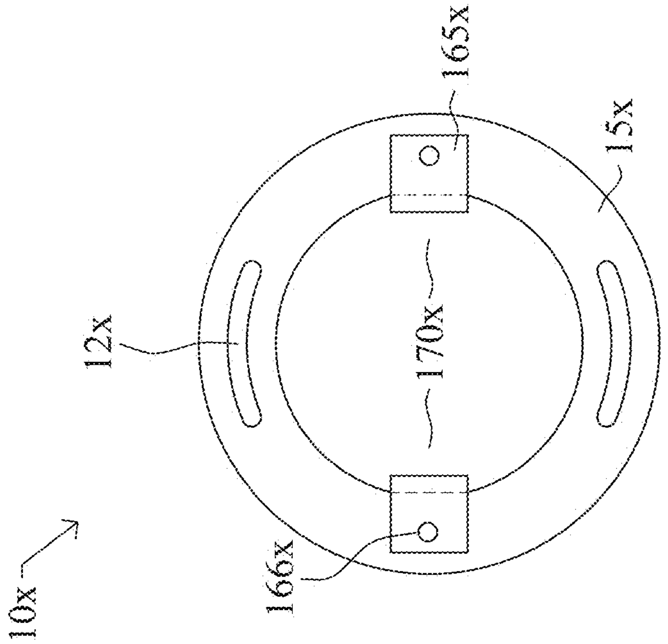

FIGS. 12a and 12b show enlarged top and bottom views of rotational alternate hub embodiments.

FIG. 12a shows an exemplary top view of an alternate hub 10x. The alternate hub 10x is configured as a streamlined embodiment of the hub shown in FIGS. 11a and 11b. The alternate hub 10x excludes a provision for extender arms and is configured to be directly mounted to a support structure above or to a J box above. Functionally the alternate hub 10x is configured to perform the same device alignment task as the orientation hub 10x shown in FIGS. 11a and 11b. The alternate hub 10x coupled to the mechanical or the electromechanical device, is configured to align the device coupled from below to at least one of, a like device, a horizontal axis, and a vertical surface.

At least one defining feature of the alternate hub 10x is its mounting tab 165x. The present figure shows the alternate hub mounting tab 165x extending upwardly from an inner perimeter of the hub central opening 170x. In at least one different embodiment, the hub mounting tab 165x can extend upwardly and/or sideways from the exterior perimeter of the alternate hub 10x. The mounting hub tab 165x has at least one mounting bore 166x. The mounting bore 166x is configured to couple to suspension cable/s or chains directly or indirectly by an intermediate fastener.

The alternate hub 10x is configured to couple to a top surface of a mechanical or an electromechanical device. The alternate hub 10x can couple mechanical and electromechanical devices of different weights, shapes, and sizes. The present application describes an alternate hub 10x coupled to a luminaire. The present figure of the alternate hub 10x shows two elongated through bores 12x at opposite sides of the alternate hub central opening 170x. The alternate hub 10x couples to the luminaire by protrusion 13x that extend upwardly through the elongated bores 12x.

The protrusions 13x extend through the elongated bore 12x of the hub disk 15x securing the hub disk 15x to the luminaire by fasteners from above (not shown). Once coupled to the alternate hub 10x, the luminaire can pivot about its central vertical axis using the elongated bore 12x as guide tracks for alignment. The alternate hub 10x in its various configurations facilitates alignment of luminaires that employ orientation specific optics.

Each protrusion 13x can be a threaded stud that extends through the elongated bores 12x of the hub disk 15x upwardly with fasteners coupling the device to the hub disk 15x. In different embodiments, bores formed in the top surface of the device can be configured to receive a threaded bolt from above through the elongated bore 12x of the hub disk 15x.

The luminaire powered or unpowered can be rotated horizontally about its vertical central axis to optimally illuminate a targeted surface. Once oriented in position, the luminaire or any other coupled device can be secured to the hub disk 15x by fasteners that couple to the through protrusions 13x in the elongated bore. The secured assembly, even if it encounters (e.g., is bumped by) a moving object, will always revert to its secured orientation position.

The top surface of the alternate hub 10x can have marking/s corresponding to at least one reference marking on a surface of a coupled luminaire below or any other coupled device (not shown). The marking on the alternate hub 10x in relation to the at least one referenced marking of the coupled device, can provide angular rotational displacement reading of the coupled device from base reference. Using the marking to rotationally orient the coupled luminaire/device about the central vertical axis of the alternate hub 10x enables setting in place the device orientation prior to lifting and mounting the coupled assembly.

The alternate hub central opening 170x is configured to allow at least one of, power or power and data conductor connectivity to the luminaire device housing (not shown), through air flow for heat dissipation, switching devices, receptacles, and access to any other devices coupled to the top surface and or inside the luminaire device housing. The form and size of the rotational orientation hub and the rotational orientation alternate hub can vary to adapt to the form, size, and weight of the device coupled from below.

Summarizing the coupled to a device (including a luminaire) rotational alternate hub utility:

a. The hub two-point suspension connectivity provides a redundant safety measure to protect life and property below. When one suspension member fails, the other has the structural capacity to support the suspended assembly.
b. The hub two-point suspension connectivity maintains the orientation of the coupled device intact even when the device encounters a moving object.
c. The hub enables the rotation of the coupled device to have it aligned with a surface and/or a like device. The alignment orientation can be performed powered or unpowered.
d. The hub structure is structurally configured to securely support the entire assembly weight.
e. The hub is an inexpensive and easy to fabricate structure that can be formed anywhere across the planet.

FIG. 12*b* shows the bottom side of an alternate hub 10*x* that is configured to, at least in part, couple to the top surface of a luminaire device housing. The planar surface of the hub disk 15*x* is substantially flat. Inside and at opposite sides of the hub central opening 170*x*, hub mounting tabs 165*x* are shown extending away from the alternate hub disk 15*x*. Elongated bores in the hub disk 15*x* shown at opposite sides of the hub central opening 170*x* are configured to receive reciprocating through protrusions that extend upwardly from the top surface of the luminaire device housing or any other coupled device.

Figure 13B:
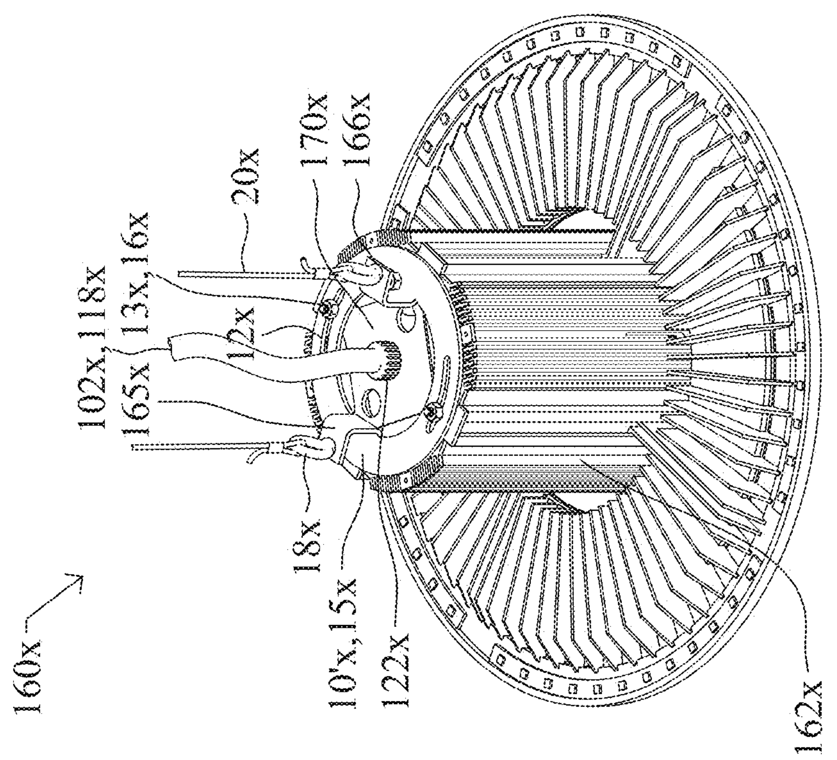
Figure 13A:
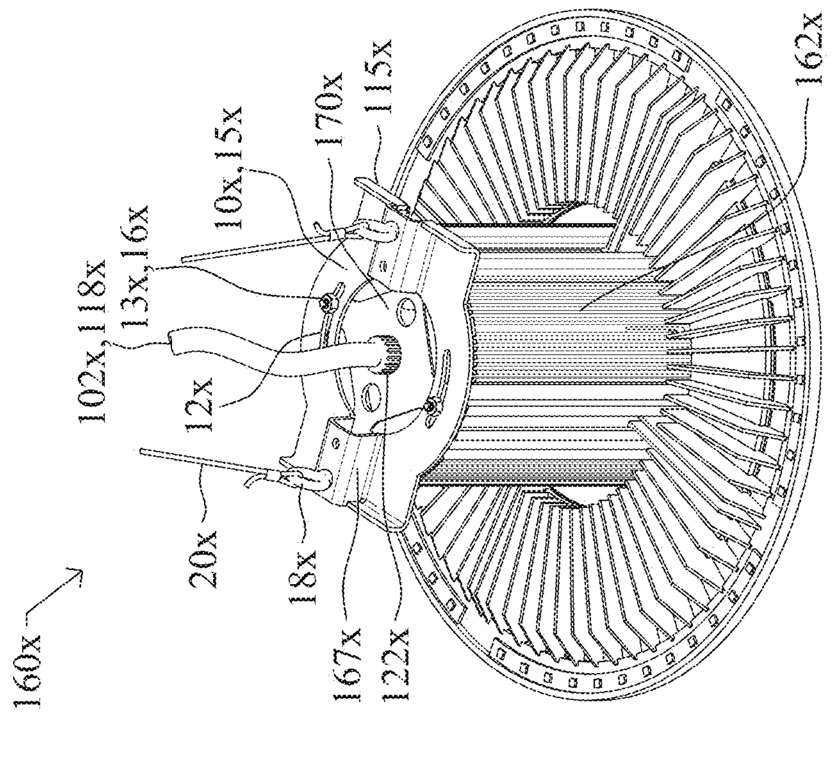

FIGS. 13*a* and 13*b* show perspective views of the rotational hubs shown in FIGS. 11*a*, 11*b*, 12*a*, and 12*b* respectively coupled to a luminaire without a refractor.

FIG. 13*a* shows the top view of the rotational hub 10*x* coupled to a top portion of a luminaire 160*x*. The assembly includes a luminaire device housing 162*x* coupled to the rotational hub 10*x* from below. Above, eye loops 18*x* coupled to the hub 10*x* with aircraft cables 20*x* extending to the above. The aircraft cables suspend the assembly from a support structure or a J box above (not shown). In a different embodiment aircraft cables/chains 20*x* can directly couple to the mounting bores of the hub 10*x* extender arm base 167*x*.

At the center of the hub 10*x*, a power or power and data drop cord 102*x* is shown coupled to the top surface of the luminaire device housing 162*x*. The drop cord 102*x*, 118*x* can be configured to couple by a coupler 122*x* to a reciprocating "plug 'n play" connector in the luminaire device housing 162*x*. Bores shown on the top of the luminaire device housing 162*x* can be configured for at least one of, receive additional conductor, receive an IoT device, couple to a switching device and/or provide a venting opening to dissipate heat rising from below.

Elongated bores 12*x* in the hub disk are shown at opposite sides of the hub central opening. Protrusions 13*x* extending upwardly through the elongated bores 12*x* from the top surface of the luminaire device housing 162*x* secure the luminaire 160*x* to hub 10*x* by mechanical fasteners 16*x*. When aligning the luminaire 160*x*, the luminaire 160*x* is free to travel along the elongated bore 12*x* guide track to the desired alignment position. Once there, the mechanical fastener locks the assembly in its permanent orientation position.

FIG. 13*b* shows the top view of the rotational alternate hub 10' coupled from above to a top portion of a luminaire 160*x* device housing 162*x*. Above, eye loops 18*x* are shown coupled to the hub mounting tabs 165*x*. The eye loops 18*x* are also shown coupled to aircraft cables 20*x* that extend upwardly. The aircraft cables 20*x* suspend the assembly from a structure above (not shown). In a different embodiment the aircraft cables/chains 20*x* can directly couple to the mounting bores 166*x* of the alternate hub 10'.

At the center of the alternate hub 10' a power or power and data drop cord 102*x*, 118*x* is shown coupled to the top surface of the luminaire device housing 162*x*. The drop cord 102*x*, 118*x* can be configured to couple by a coupler 122*x* to a reciprocating "plug 'n play" connector in the luminaire device housing 162*x*. Bores shown on the top of the luminaire device housing 162*x* can be configured for at least one of, an additional conductor, an IoT device, a switching device, and/or a venting aperture.

Elongated bores 12*x* in the hub disk 15*x* are shown at opposite sides of the hub central opening 170*x*. Mechanical fasteners 16*x* coupled to the protrusion 13*x* that extend upwardly through the elongated bores 12*x* secure the luminaire device housing 162*x* to the alternate hub 10'. When aligning the luminaire 160*x*, the luminaire is free to travel along the elongated bore 12*x* guide track to the desired alignment position. Once there, the mechanical fastener 16*x* locks the assembly in its permanent orientation position.

Figure 14B:
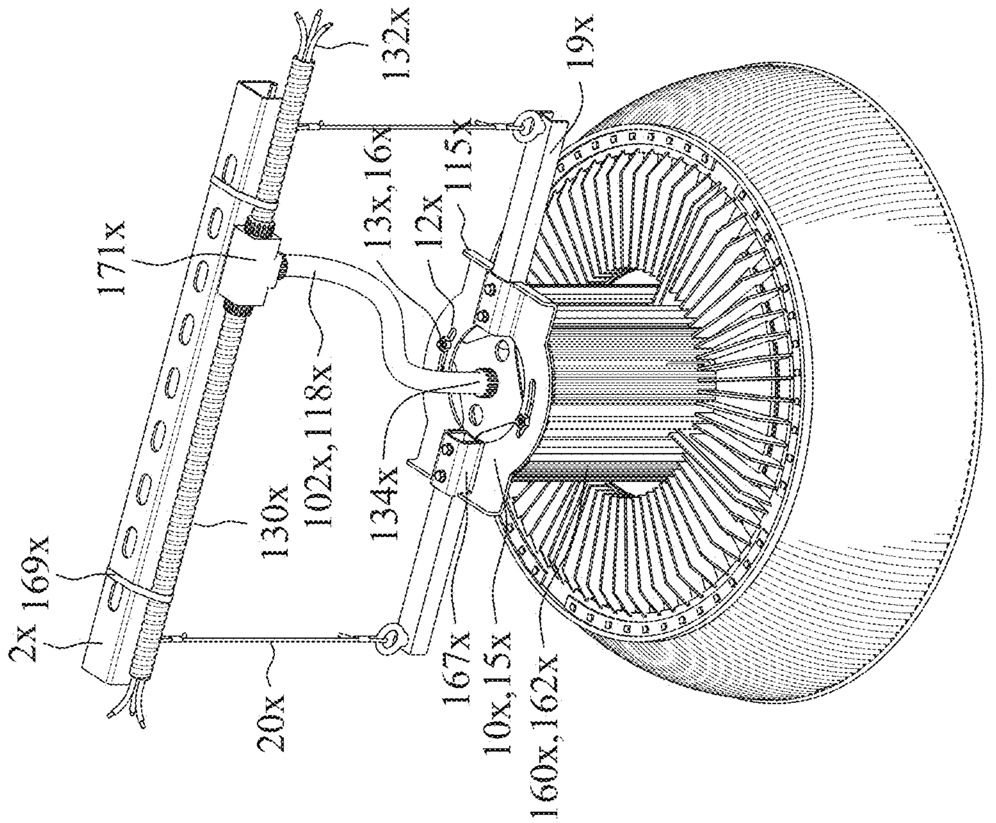
FIGS. 14*a* and 14*b* are perspective views of luminaires coupled to orientation hubs corresponding to FIG. 11*a* with extenders. The luminaires are directly suspended by aircraft cables from the support structure above. Power/data is conveyed to the luminaire in FIG. 14*a* through a J box and in FIG. 14*b* by modular wiring drop cord.
Figure 14A:
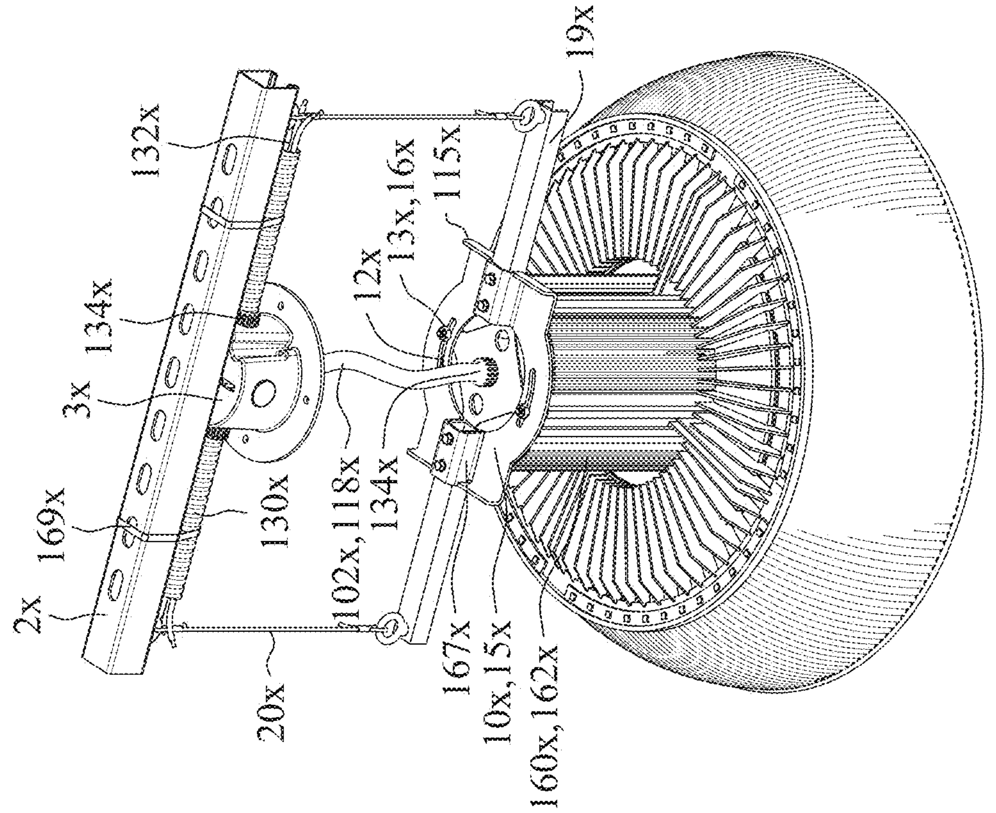

FIGS. 14*a* and 14*b* show perspective views of luminaires coupled to orientation hubs with extender arms corresponding to FIG. 11*a*'s hub.

FIG. 14*a* shows a luminaire 160*x* coupled to a hub 10*x* with extender arms 19*x* extending outwardly. The assembly including the luminaire 160*x* and the hub 10*x* are suspended from a support structure 2*x* above by aircraft cables 20*x* that couple to the extender arms 19*x*. Power or power and data to the luminaire originate/s from inside the J box 3*x*.

The elements shown include the rotational hub 10*x*, 15*x* coupled from above to the luminaire device housing 162*x*. Extender arms 19*x* coupled to the extender base 167*x* of the hub 10*x* are shown extending outwardly. Aircraft cables 20*x* coupled to the extender arms 19*x* below on the other end are coupled to the support structure 2*x* above. The entire assembly weight including the luminaire (device) coupled, the hub 10*x*, the extender 19*x* and the suspension cables 20*x* with corresponding fittings of the present figure are directly supported by the support structure 2.

The coupling of the hub disk 15*x* to the luminaire device housing 162*x* gives the luminaire its rotational capability. Protrusions 13*x* extending through the elongated bores 12*x* fasten the hub disk 10*x*, 15*x* to the luminaire 160*x*, 162*x*. Fastened by fasteners 16*x* from above, the hub disk 15*x* gives the luminaire the rotational ability for rotational orientation as well as, once aligned, fixates, and secures the assembly in place.

The present figure shows a power or power and data conductor 102*x*, 118 coupled at one end to the luminaire device housing 162*x* and at the other end coupled to a J box 3*x*. Above, power or power and data extender cables 130*x* are shown coupled to the J box and supported by straps 169*x* to the support structure 169*x*. The power/data extender cables 130*x* shown can include at least one conductor 132*x* that conveys power/data to the J box 3*x* and a plurality of conductors 132*x* inside cables and/or cords that convey power or power and data to a device mounted below and power consuming devices in the vicinity.

A power/data distribution hub (not shown) can be housed inside the J box 3*x*. The power/data distribution hub can be an element of a factory preconfigured modular wiring system. The extender cables 130*x* can couple the power/data distribution hub directly by couplers 134*x* wherein the power distribution hub position inside the J box 3*x* is fixed. The power/data distribution hub can be coupled to the J box 3*x* cover.

The conductor 102*x*, 118*x* of the luminaire can couple the power/data distribution hub through the J box cover by a coupler. The conductor 102*x*, 118*x* can be supplied with the modular wiring system elements and can be field installed. The field installed conductors can couple to a reciprocating "plug n' play" receptacle disposed on a surface of the device below. In other embodiments, power/data can be delivered to a luminaire through the J box by conventional pipe and wire assembly.

The present figure demonstrates one example of an "all in one" luminaire assembly system and a construction method wherein the mechanical, electrical and luminaire alignments can be accomplished in one step. This method requires a single "pass" where more traditional construction practices require at least two passes.

FIG. 14*b* shows a luminaire 160*x* coupled to a hub 10*x* with extender arms extending outwardly. The assembly including the luminaire 160*x* and the hub 10*x* are suspended directly from a support structure 2*x* above by aircraft cables 20*x* that couple to the extender arms 19*x*. Power or power and data to the luminaire 160*x* is/are conveyed by means of modular wiring system from above.

The elements shown include a rotational hub 10*x*, 15*x* coupled from above to the luminaire device housing 162*x*. Extender arms 19*x* coupled to the extender base 167*x* of the hub 10*x* are shown extending outwardly. Aircraft cables 20*x* coupled to the extender arms 19*x* below on the other end are coupled to the support structure 2*x* above. The entire assembly weight including the luminaire (device) coupled, the hub 10*x*, the extender 19*x* and the suspension cables 20*x* with corresponding fittings of the present figure are directly supported by the structure 2*x*.

The coupling of the hub disk 15*x* to the luminaire device housing 162*x* gives the luminaire its rotational capability. Protrusions 13*x* extending through the elongated bores 12*x* of the hub disk 10*x*, 15*x* fasten the luminaire 160*x*, 162*x* to the hub 10*x*. Fastened by fasteners 16*x* from above, the hub disk 15*x* gives the luminaire the rotational ability for rotational orientation as well as, once aligned, fixates, and secures the assembly in place.

The present figure shows a power or power and data conductor 102*x*, 118*x* coupled at one end to the luminaire device housing 162*x* and at the other end to a modular wiring system splitter 171*x*. The power or power and data cables 130*x* are shown coupled to the support structure 2*x* by straps 169*x*. The power/data extender cables 130*x* shown can include at least one conductor 132*x* that conveys power/data through the splitter 171*x* to power consuming devices beyond. Through the splitter 171*x* the power/data can be conveyed to conductor/s 102*x*, 118*x* that conveys power/data to a device coupled by a coupler 134*x* to the luminaire 160*x* below and at least one additional power/data consuming device in the vicinity. In other embodiments where modular wiring systems are not used, power/data can be delivered to a luminaire by a conventional pipe and wire assembly that can include a J box.

The present figure demonstrates one example of an "all in one" luminaire assembly system and a construction method wherein the mechanical, electrical and luminaire alignments can be accomplished in one step. This method requires a single "pass" where more traditional construction practices require at least two passes.

Figure 15B:
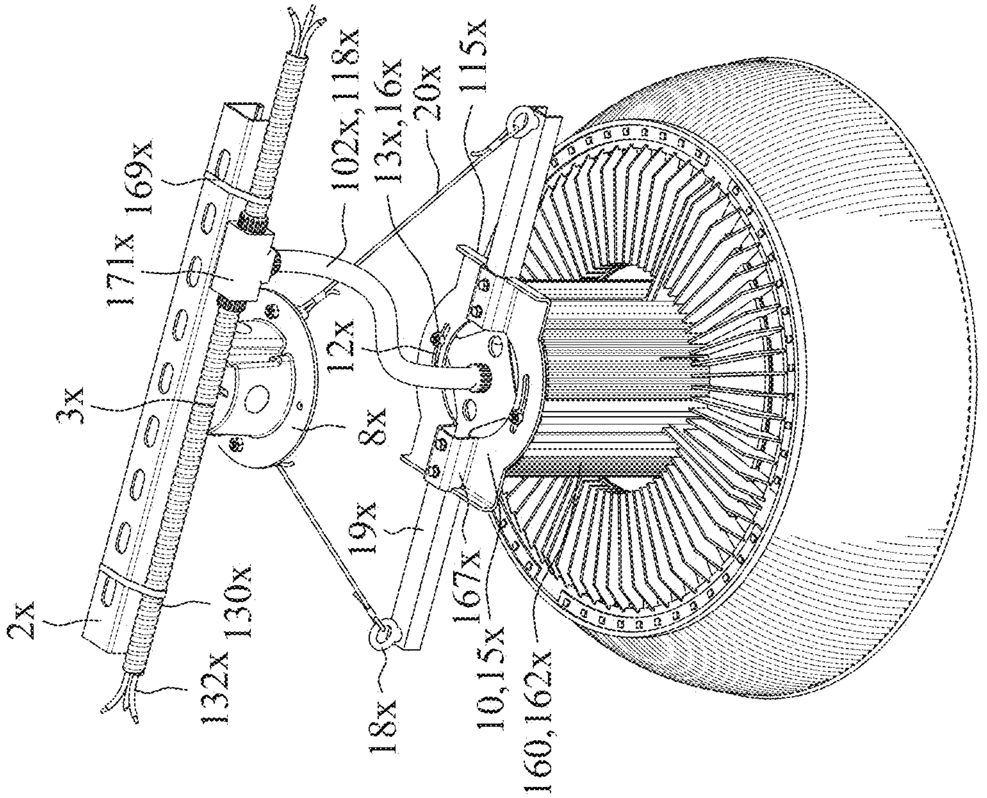
FIGS. 15*a* and 15*b* show perspective view of luminaires with extenders coupled to the orientation hub of FIG. 11*a*. The assembly is suspended by aircraft cables from a J box flange of a J box coupled to support structures above.
Figure 15A:
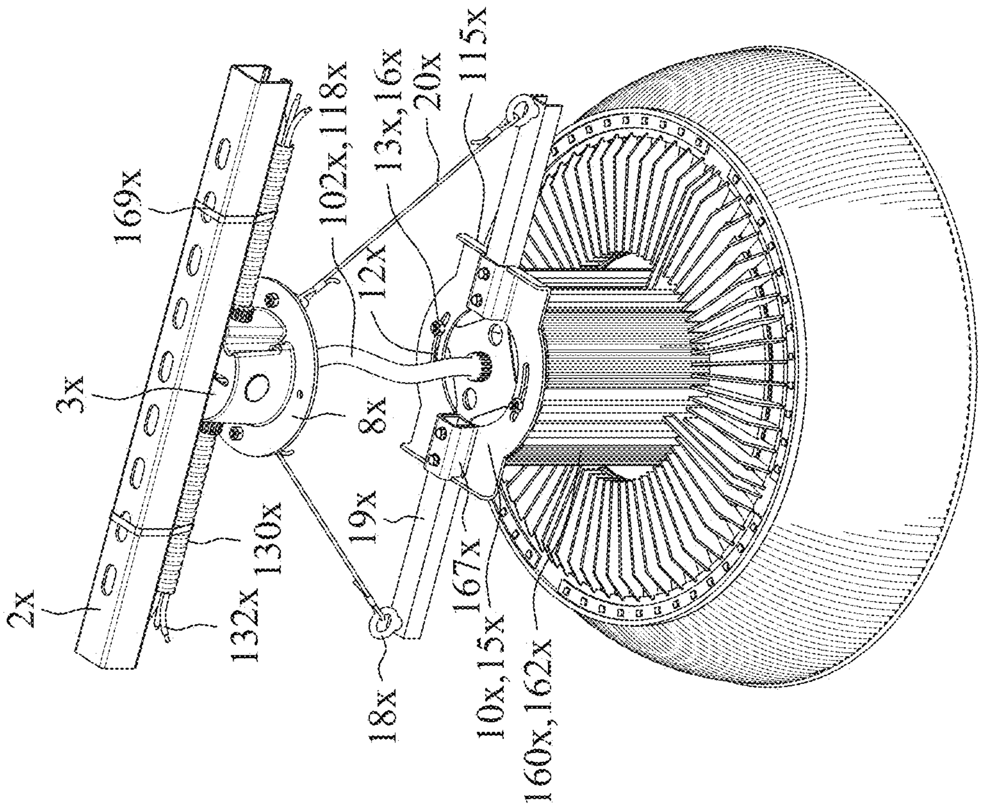

FIGS. 15*a* and 15*b* show perspective views of luminaires coupled to orientation hubs with extender arms corresponding to FIG. 11*a*. Both figures show the device assemblies mechanically supported by a J box.

FIG. 15*a* shows a luminaire 160*x* coupled to a hub 10*x* with extender arms 19*x* extending outwardly. The assembly including the luminaire 160*x* and the hub 10*x* is suspended from a support structure 2*x* above by aircraft cables 20*x* that couple to the extenders 19*x*. Power or power and data to the luminaire 160*x* originate/s from inside the J box 3*x*.

The elements shown include the rotational hub 10*x*, 15*x* coupled from above to the luminaire device housing 162*x*. Extender arms 19*x* coupled to the extender base 167*x* of the hub 10*x* are shown extending outwardly. Aircraft cables 20*x* coupled to the extender arms 19*x* at one end are coupled to a J box flange 8*x* of J box 3*x* above at the other end. The J box 3*x* couples to the support structure 2*x* and it is fixed in position.

The aircraft cables 20*x* of the present embodiment are shown coupled to eye loops 18*x* that in turn couple to the extenders 19*x*. In other embodiments, the suspension device can couple directly to the extenders' mounting bores on the hub's extender base 167*x*. The entire assembly weight including the luminaire (device) coupled, the hub 10*x*, the extenders 19*x*, and the suspension cables 20*x* with corresponding fittings are supported by the J box flange 8*x*.

The coupling of the hub disk 15*x* to the luminaire device housing 162*x* gives the luminaire its rotational capability. Protrusions 13*x* extending through the elongated bores 12*x* fasten the hub disk 10*x*, 15*x* to the luminaire 160*x*, 162*x*. Fastened by fasteners 16*x* from above, the hub disk 15*x* gives the luminaire the rotational ability for device orientation as well as, once aligned, fixates, and secures the assembly in place.

The present figure shows a power or power and data conductor 102*x*, 118*x* coupled at one end to the luminaire device housing 162*x* and coupled at the other end to the J box 3*x*. Above, power or power and data cables 130*x* are shown coupled to the J box and supported by straps 169*x* to the support structure 2*x*. The power/data extender cables 130*x* shown can include at least one conductor 132*x* that conveys power/data to the J box 3*x* and a plurality of conductors 132*x* inside cables and/or cords that convey power or power and data to a device mounted below and power consuming devices in the vicinity.

A power/data distribution hub (not shown) can be housed inside the J box 3*x*. The power/data distribution hub can be an element of a factory preconfigured modular wiring system. The extender cables 130*x* can couple the power/data distribution hub directly by couplers wherein the power distribution hub position inside the J box 3*x* is fixed. The power/data distribution hub can be coupled to the J box 3*x* cover.

The conductor 102*x*, 118*x* of the luminaire can couple the power/data distribution hub by a coupler and/or can be supplied with the balance of the modular wiring system elements and in the field couple to a reciprocating "plug n' play" receptacle disposed on a surface of the luminaire/device below. In other embodiments, power/data can be delivered to a luminaire through the J box by conventional pipe and wire assembly.

The present figure demonstrates one example of an "all in one" luminaire assembly system and a construction method wherein the mechanical, electrical and luminaire alignments can be accomplished in one step. This method requires a single "pass" where more traditional construction practices require at least two passes.

FIG. 15*b* shows a luminaire 160*x* coupled to a hub 10*x* with extender arms 19*x* extending outwardly. The assembly including the luminaire 160*x* and the hub 10*x* is suspended from a J box 3*x* above by aircraft cables 20*x* that couple to the extender arms 19*x*. Power or power and data to the luminaire is/are conveyed externally to the J box 3*x* by means of modular wiring from above.

The elements shown include a rotational hub 10*x*, 15*x* coupled from above to the luminaire device housing 162*x*. Extender arms 19*x* coupled to the extender base 167*x* of the hub 10*x* are shown extending outwardly. Aircraft cables 20*x* coupled to the extender arms 19*x* at one end are coupled to a J box flange 8*x* of J box 3*x* above at the other end. The J box 3*x* couples to the support structure 2*x* and it is fixed in position.

The aircraft cables 20*x* of the present embodiment are shown coupled to eye loops 18*x* that in turn couple to the extenders 19*x*. In other embodiments, the suspension device can couple directly to the extenders' mounting bores of the hub's extender base 167*x*. The entire assembly weight including the luminaire (device) coupled, the hub 10*x*, the extenders 19*x*, and the suspension cables 20*x* with corresponding fittings are supported by the J box flange 8*x*.

The coupling of the hub disk 15$x$ to the luminaire device housing 162$x$ gives the luminaire its rotational capability. Protrusions 13$x$ extending through the elongated bores 12$x$ of the hub disk 15$x$ fasten the hub disk 15$x$ to the luminaire 160$x$, 162$x$ by fasteners 16$x$ from above. The hub disk 15$x$ gives the luminaire the rotational ability for orientation as well as, once aligned, fixates, and secures the assembly in place.

The present figure shows a power or power and data conductor 102$x$, 118$x$ coupled at one end to the luminaire device housing 162$x$ and at the other end to a modular wiring system splitter. The power or power and data cables 130$x$ are shown coupled to the support structure 2$x$ by straps 169$x$. The power/data extender cables 130$x$ shown can include at least one conductor 132$x$ that conveys power/data through the splitter 171$x$ to power consuming devices beyond.

Through the splitter 171$x$ the power/data can be conveyed to conductors 102$x$, 118$x$ that conveys power/data to a device coupled below and at least one additional power/data consuming device in the vicinity. In other embodiments where modular wiring systems are not used, power/data can be delivered to a luminaire by conventional pipe and wire assembly that can include a J box.

The present figure demonstrates one example of an "all in one" luminaire assembly system and a construction method wherein the mechanical, electrical and luminaire alignments can be accomplished in one step. This method requires a single "pass" where more traditional construction practices require at least two passes.

Figure 16B:
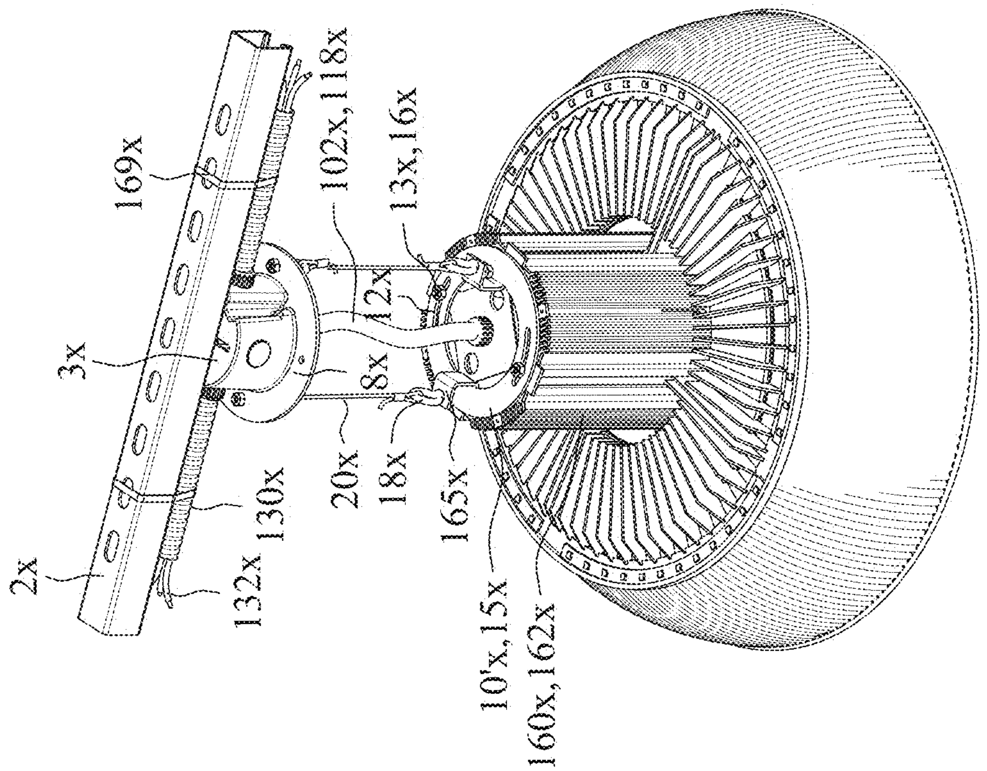
FIGS. 16*a* and 16*b* show perspective views of luminaires coupled to orientation hubs corresponding to FIGS. 11*a* and 12*a* respectively. The luminaires are suspended by aircraft cables from a J box flange that is coupled to a support structure above. Power/data is conveyed to the luminaire through the J box.
Figure 16A:
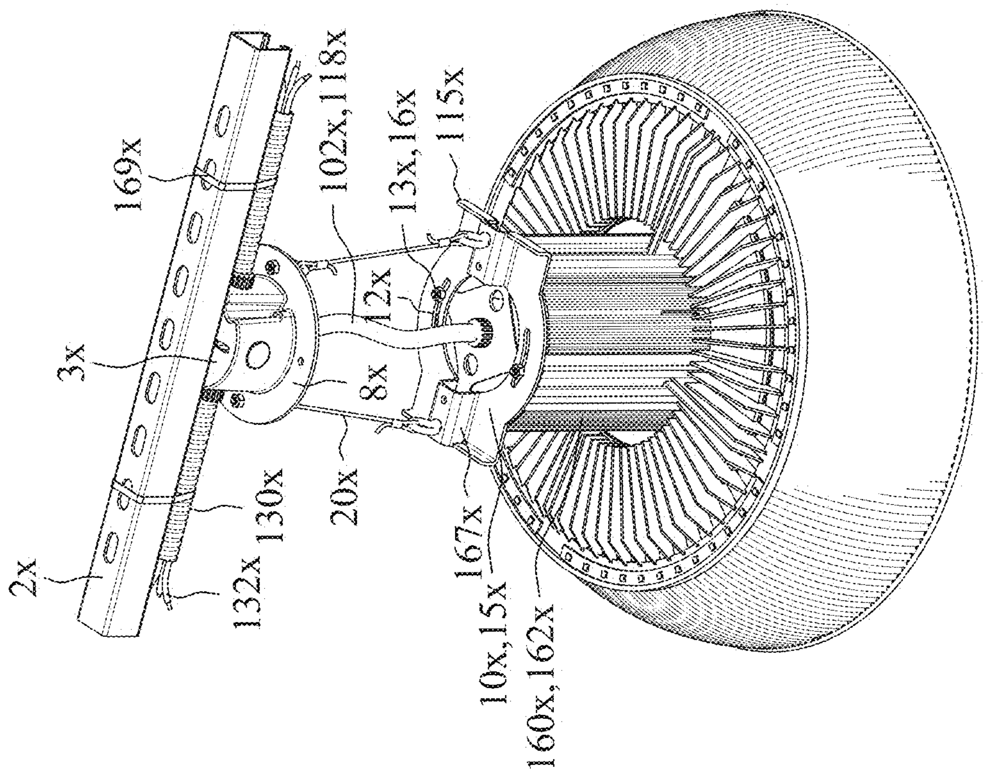

FIGS. 16$a$ and 16$b$ show perspective views of luminaires coupled to orientation hubs corresponding to FIGS. 11$a$ and 12$a$ respectively. The luminaires are suspended by aircraft cables from a J box flange that is coupled to a support structure above.

FIG. 16$a$ shows a luminaire coupled to a rotational hub 10$x$. The hub 10$x$ shown is suspended from above by aircraft cables 20$x$. The cables 20$x$ at one end are coupled to the hub 10$x$ and on the other end are coupled to a flange 8$x$ of a J box 3$x$ above. The J box 3$x$ is fixated to the above support structure 2. Power or power and data to the luminaire 160$x$ originate/s from inside the J box 3$x$.

The elements shown include the rotational hub 10$x$, 15$x$ coupled from above to the luminaire device housing 162$x$. The aircraft cables 20$x$ of the present embodiment are shown coupled to I-loops 18$x$. The entire assembly weight including the luminaire (device) coupled, the hub 10$x$, the extenders 19$x$, and the suspension cables 20$x$ with corresponding fittings are supported by the J box flange 8$x$.

The coupling of the hub disk 15$x$ to the luminaire device housing 162$x$ gives the luminaire its rotational capability. Protrusions 13$x$ extending through the elongated bores 12$x$ of the hub disk 15$x$ fasten by fasteners 16$x$ the hub 10$x$, 15$x$ and the luminaire 160$x$, 162$x$ assembly from above. The hub disk 15$x$ provides the luminaire (device) its rotational ability for horizontal rotational orientation, and can also, once aligned, fixate and secure the assembly in place.

The present figure shows a power or power and data conductor 118$x$ coupled at one end to the luminaire device housing 162$x$ and coupled at the other end to the J box 3$x$. Above, power or power and data extender cables 130$x$ are shown coupled to the J box 3$x$ and supported by straps 169$x$ to the support structure 2$x$. The power/data extender cables 130$x$ shown can include at least one conductor 132$x$ that conveys power/data to the J box 3$x$ and a plurality of conductors 132$x$ inside cables and/or cords that convey power or power and data to a device mounted below and power consuming devices in the vicinity.

A power/data distribution hub (not shown) can be housed inside the J box 3$x$. The power/data distribution hub can be a standard factory preconfigured modular wiring system component. The extender cables 130$x$ can couple the power/data distribution hub directly by couplers wherein the power distribution hub position inside the J box 3$x$ is fixed. The power/data distribution hub can be coupled to the J box 3$x$ cover.

The conductor 118$x$ of the luminaire can couple the power/data distribution hub by a coupler and/or can be supplied with the balance of the modular wiring system components. This component can be field coupled to a reciprocating "plug n' play" receptacle disposed on a surface of the device below. In other embodiments, power/data can be delivered to a luminaire through the J box by conventional pipe and wire assembly.

The present figure demonstrates one example of an "all in one" luminaire assembly construction method wherein the mechanical, electrical and luminaire alignments can be accomplished in one step. This method is contrary to more traditional construction practices that require at least two passes.

FIG. 16$b$ shows a luminaire coupled to a rotational alternate hub 10'. The alternate hub 10' shown is suspended by aircraft cables 20$x$. The cables 20$x$ at one end are coupled to the hub 10$x$ and on the other end are coupled to a flange 8$x$ of a J box 3$x$ above. The J box 3$x$ is fixated to the above support structure 2$x$. Power or power and data to the luminaire 160$x$ originate/s from inside the J box 3$x$.

The elements shown include the rotational alternate hub 10$x$, 15$x$ coupled from above to the luminaire device housing 162$x$. The aircraft cables 20$x$ of the present embodiment are shown coupled to eye loops 18$x$ that in turn couple to the hub mounting tables 165$x$ of the alternate hub 10'. In other embodiments, the suspension device can couple directly to mounting bores 166$x$ of the hub mounting tabs 165$x$. The entire assembly weight including the luminaire (device) coupled, the hub 10$x$, and the suspension cables 20$x$ with corresponding fittings are supported by the J box flange 8$x$.

The coupling of the hub disk 15$x$ to the luminaire device housing 162$x$ gives the luminaire its rotational capability. Protrusions 13$x$ extending through the elongated bores 12$x$ of the hub disk 15$x$ fasten by fasteners 16$x$ the hub 10$x$, 15$x$ and the luminaire 160$x$, 162$x$ assembly from above. The hub disk 15$x$ provides the luminaire (device) its rotational ability for horizontal rotational orientation, and can also, once aligned, fixate and secure=the assembly in place.

The present figure shows a power or power and data conductor 118$x$ coupled at one end to the luminaire device housing 162$x$ and at the other end to a modular wiring system splitter. The power or power and data cables 130$x$ are shown coupled to the support structure 2$x$ by straps 169$x$. The power/data extender cables 130$x$ shown can include at least one conductor 132$x$ that conveys power/data through the splitter to power consuming devices beyond.

Through the splitter the power/data can be conveyed to conductors 118$x$ that conveys power/data to a device coupled below and at least one additional power/data consuming device in the vicinity. In other embodiments where modular wiring system is not used, power/data can be delivered to a luminaire by conventional pipe and wire assembly that can include a J box.

The present figure demonstrates one example of an "all in one" luminaire assembly construction method wherein the mechanical, electrical and luminaire alignments can be accomplished in one step. This method is contrary to more traditional construction practices that require at least two passes.

Figure 17B:
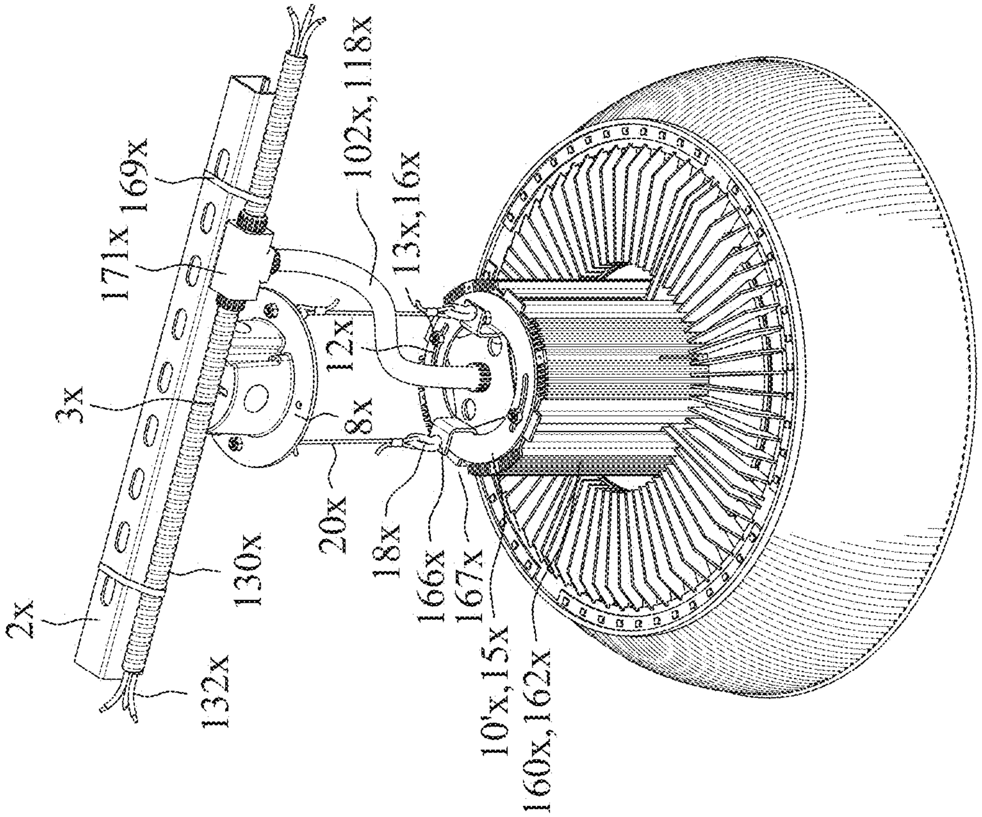
FIGS. 17*a* and 17*b* show perspective view of luminaires coupled to orientation hubs corresponding to FIGS. 11*a* and 12*a* respectively. The luminaires are suspended by aircraft cables from a J box flange that is coupled to support structures above. Power/data is conveyed to the luminaire externally to the J box by means of modular wiring cables.
Figure 17A:
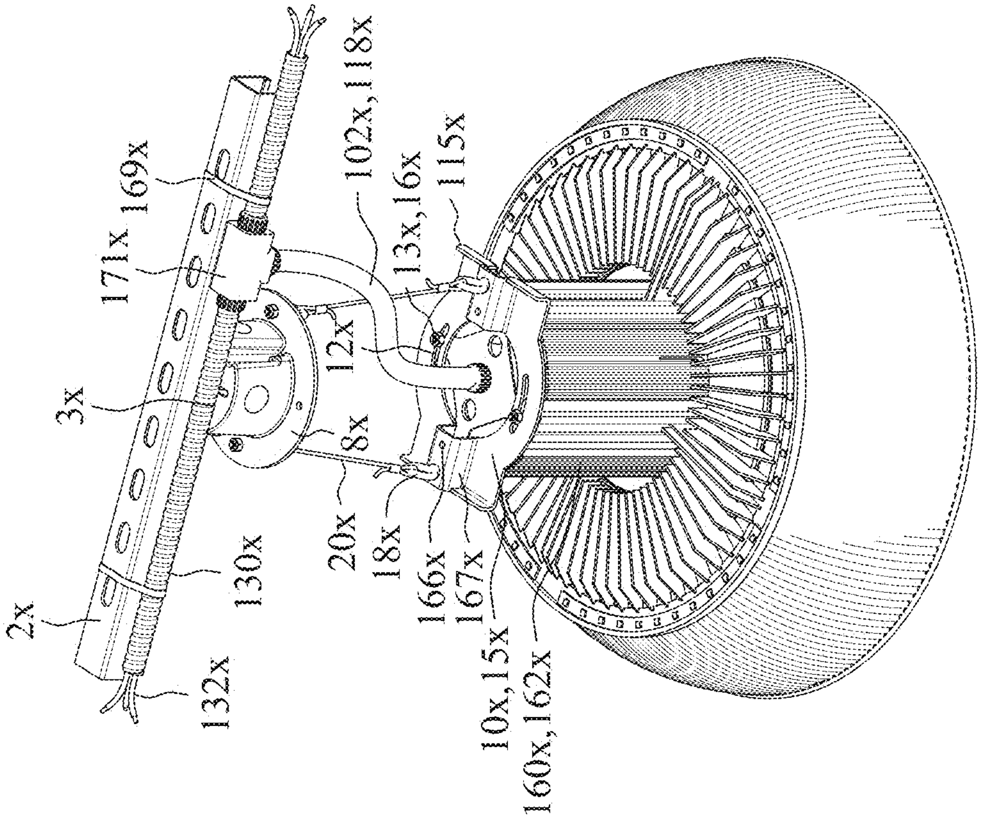

FIGS. 17*a* and 17*b* show perspective views of luminaires coupled to orientation hubs corresponding to FIGS. 11*a* and 12*a* respectively. The luminaires are suspended by aircraft cables from a J box flange that is coupled to support structures above. Power/data is conveyed to the luminaire externally to the J box by means of modular wiring cables.

FIG. 17*a* shows a luminaire coupled to a rotational hub 10*x*. The hub 10*x* shown is suspended by aircraft cables 20*x*.

The aircraft cables 20*x* at one end are coupled to the hub 10*x* and on the other end are coupled to a flange 8*x* of a J box 3*x* above. The J box 3*x* is fixated to the above support structure 2*x*. Power or power and data to the luminaire 160*x* originate/s externally to the J box 3*x*.

The elements shown include the rotational hub 10*x*, 15*x* coupled from above to the luminaire device housing 162*x*. The aircraft cables 20*x* of the present embodiment are shown coupled to I-loops 18*x* that in turn couple to the extender base 167*x* of the hub 10*x*. In other embodiments, the suspension devices can couple directly to mounting bores 166*x* of the extension base 167*x*. The entire assembly weight including the luminaire (device) coupled, the hub 10*x*, and the suspension cables 20*x* with corresponding fittings are supported by the J box flange 8*x*.

The coupling of the hub disk 15*x* to the luminaire device housing 162*x* gives the luminaire its rotational capability. Protrusions 13*x* extending through the elongated bores 12*x* of the hub disk 15*x* fasten by fasteners 16*x* the hub 10*x*, 15*x* and the luminaire 160*x*, 162*x* assembly from above. The hub disk 15*x* provides the luminaire (device) its rotational ability for horizontal rotational orientation, and can also, once aligned, fix and secure the assembly in place.

The present figure shows a power or power and data conductor 118*x* coupled at one end to the luminaire device housing 162*x* and at the other end to a modular wiring system splitter 171*x*. The power or power and data cables 130*x* are shown coupled to the support structure 2*x* by straps 169*x*. The power/data extender cables 130*x* shown can include at least one conductor 132*x* that conveys power/data through the splitter to power consuming devices beyond.

Through the splitter 171*x* the power/data can be conveyed to conductors 118*x* that conveys power/data to a device coupled below and at least one additional power/data consuming device in the vicinity. In other embodiments where modular wiring systems are not used, power/data can be delivered to a luminaire by conventional pipe and wire assembly that can include a J box.

The present figure demonstrates one example of an "all in one" luminaire assembly construction method wherein the mechanical, electrical and luminaire alignments can be accomplished in one step. This method is contrary to more traditional construction practices that require at least two passes.

FIG. 17*b* shows a luminaire 160*x* coupled to a rotational alternate hub 10'. The alternate hub 10' shown is suspended by aircraft cables 20*x*. The aircraft cables 20*x* at one end are coupled to the rotational alternate hub 10' and on the other end are coupled to a flange 8*x* of a J box 3*x* above. The J box 3*x* is fixated to the above support structure 2*x*. Power or power and data is conveyed to the luminaire 160*x* externally to the J box 3*x*.

The elements shown include the rotational alternate hub 10', 15*x* coupled from above to the luminaire device housing 162*x*. The aircraft cables 20*x* are shown coupled to I-loops 18*x* that in turn couple to the hub mounting tables 165*x* of the alternate hub 10'. In other embodiments, the suspension device can couple directly to mounting bore 166*x* of the hub mounting tab 165*x*. The entire assembly weight including the luminaire (device) coupled, the hub 10*x*, and the suspension cables 20*x* with corresponding fittings are supported by the J box flange 8*x*.

The coupling of the hub disk 15*x* to the luminaire device housing 162*x* gives the luminaire its rotational capability. Protrusions 13*x* extending through the elongated bores 12*x* of the hub disk 15*x* fasten by fasteners 16*x* the hub 10*x*, 15*x* and the luminaire 160*x*, 162*x* assembly from above. The hub disk 15*x* provides the luminaire (device) its rotational ability for horizontal rotational orientation, and can also, once aligned, fixate and secure the assembly in place.

The present figure shows a power or power and data conductor 118*x* coupled at one end to the luminaire device housing 162*x* and at the other end to a modular wiring system splitter 171*x*. The power or power and data cables 130*x* are shown coupled to the support structure 2*x* by straps 169*x*. The power/data extender cables 130*x* shown can include at least one conductor 132*x* that conveys power/data through the splitter to power consuming devices beyond.

Through the splitter 171*x* the power/data can be conveyed to conductors 118*x* that conveys power/data to a device coupled below and at least one additional power/data consuming device in the vicinity. In other embodiments where modular wiring systems are not used, power/data can be delivered to a luminaire by conventional pipe and wire assembly that can include a J box.

The present figure demonstrates one example of an "all in one" luminaire assembly construction method wherein the mechanical, electrical and luminaire alignments can be accomplished in one step. This method is contrary to more traditional construction practices that require at least two passes.

Figure 18:
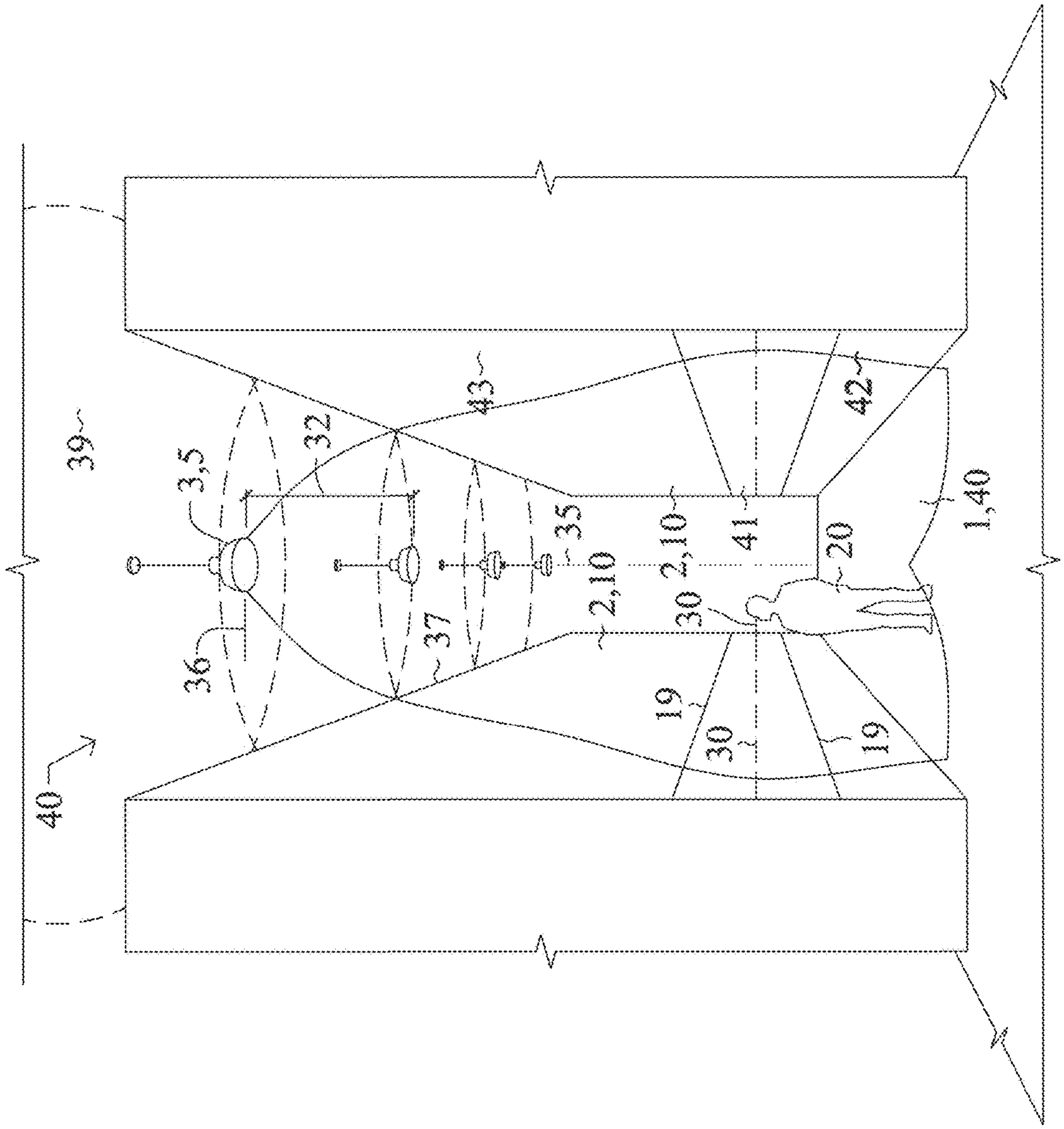
FIG. 18 shows a perspective of an aisle defined by a floor, two first vertical surfaces, a ceiling with luminaires suspended from above, and an adult human figure traversing the aisle.

FIG. 18 shows a perspective of an aisle defined by a floor, two first vertical surfaces, a ceiling with luminaires suspended from above and an adult human figure traversing the aisle. FIG. 18 illustrates an embodiment of several optical light control concepts that could only be attained through the electromechanical and optical solutions of the present innovation.

The elongated space shown in the present figure is a racked aisle 10. Buildings with racked aisles 10 are common to supermarkets, retail big box stores, manufacturing, and warehouse distribution spaces.

While buildings with racked aisles 10 can vary by aisle width 31, rack height 37 and different user types, they all have a common denominator—the highest light level needed by all users across the vertical surface of a rack, the first surface 2, is in proximity to an adult human eye level 30. An adult human eye level 30 in the western hemisphere is about 5'-0" above finished floor 1.

FIG. 18 shows above the floor 1, a plurality of orientation specific luminaires 5 suspended from a ceiling surface 39 above and positioned at approximately the center of the aisle 10. Dashed lined circles shown drawn above and around the luminaires 5 represent light emitted by each of the luminaires 5 toward a surface above 39. In most buildings, the surface above 39 suspended luminaires 5 is substantially horizontal. It is noted that the circles are configured to overlap. to maintain acceptable illumination uniformity across the plane of the ceiling surface 39.

FIG. 18 shows the down light ambient lighting component of the orientation specific luminaire 5 by a thicker line pattern emanating from the luminaire downwardly toward the floor 1. A person trained in the art will refer to the luminaire 5 light emittance pattern as the polar curve. The curve reflects the light emitted dispersion pattern. FIG. 18's light emittance pattern shows the light exiting the luminaire in downward and sideward directions.

The orientation specific luminaire's 5 novel lensed optics 24 disposed over the coupled downward facing light source 3 is configured to emit the luminaire's 5 light from nadir 35 down and sideways toward the first vertical surface 2 in an asymmetrical pattern. The asymmetrical emitted light elongated dispersion pattern direction is parallel to at least the first vertical surface 2 adjacent to the aisle the orientation specific luminaire 5 is suspended next to above.

The polar curve of the present figure also shows that the most intense light emitted falls over the racked first vertical surface 2 approximately at an adult person's 20 eye level 30. This polar curve is in contrast with the intensity light level distribution graphs of present-day art shown in FIGS. 1*a* and 1*b*. It is noted that the art of present day low and high bay luminaires shows the most intense light being emitted well above the height of an adult human 20 eye level 30.

FIG. 18 shows two first vertical surfaces 2 at opposite sides of the aisle's floor 1. Each of the first vertical surfaces 2 shows three subfields of illumination 8 stacked on one another. These subfields are referred to herein as the bottom range subfield 42, the inclusionary range subfield 41, and the top range subfield 43. The adult human 20 eye 30 has a cone of vision of approximately 60° from the horizontal −30° up and 30° down. For example, a person standing at a longitudinal central axis of a 10'-0" wide aisle looking at the first vertical surface 2 cone of vision covers a radius of 3'-9".

FIG. 18 shows the vertical center of an inclusionary range 41 of a first vertical surface 2 configured to align with an adult human 20 eye level 30. It is noted that the highest light intensity over a first vertical surface 2 is over the inclusionary range subfield 41 where most light is needed. The high light intensity level of the inclusionary range subfield 41 is followed by lesser emittance intensity levels over the bottom range subfield 42, and then followed by yet a lesser emittance intensity level over the surface of the top range subfield 43. It is further noted that while anchored about an adult human 20 eye level 30, the height of the inclusionary range subfield 41 top and/or bottom boundaries can vary.

The inclusionary range 41 is bound by top and bottom boundaries. The inclusionary range 41 bottom boundary is also the top boundary of the bottom range subfield 42. The bottom range subfield 42 extends from the inclusionary range 41 bottom boundary to the floor 1 below. The top range 43 extends from the top boundary of the inclusionary range 41 to the top of the first vertical surface 2. In at least one embodiment the number of ranges can vary; however all first vertical surface 2 configurations including lensed optics 24 tasked with illuminating an inclusionary range subfield 41 must have at least two subfield ranges.

Across the transverse direction of the racked aisle's 10 floor 1, the light emitted intensity by the orientation specific luminaire 5 is reduced at the aisle's center. The optical lens 24 of the orientation specific luminaire 5 can be configured to use the floor 1 surface as a reflective surface to enhance the light levels over the bottom range subfield 42 of the first vertical surface 2. The luminaire's 5 downwardly directed light falling on the floor 1 can be redirected toward the bottom range subfield 42.

The present electromechanical and optical innovation provides the means to control the light intensity over subfields surfaces 41, 42, 43 where the light is needed, maintains excellent uniformity ratios within vertical and horizontal surfaces' subfields, minimize or significantly reduce glare, and maintains balanced illumination ratios among the elongated space surfaces' subfields.

The present application teaches and shows a means to perfect complex illumination design that considers at least one of, surfaces' reflectance values, location of surfaces to be illuminated in relation to at least one light source, relation between one illuminated surface and another, glare mitigation, use of unique lensed optics over a plurality of light sources, and meeting target light levels over a plurality of surfaces by following the illumination ratios prescribed.

Egress

The Light Source of the Egress Luminaire—The present innovation employs at least one planar light emitted diode (LED) light source with a linear lens optics above. The dedicated lens optical pattern of the light source can be symmetrical or asymmetrical. The light source can include at least one LED lamp that is powered by a local or remote driver. The light sources can be arranged side-by-side, having dedicated lens optics or an optics system that is adapted to configure a plurality of light sources. The lens optics can be configured for a specific luminaire mounting height.

For example, a luminaire mounted below 12'-0" above the floor may have one or two light sources and may use one type of lens optics, while a luminaire mounted at 24'-0" above the floor may have four light sources with a different type of lens optics. In addition, the input power to each light source and the orientation of the light source with its coupled lens may vary based on the specific needs. The light source with its coupled lens optics and a heatsink collectively form a module.

The module couples to a power receptacle, or power and data receptacle. The module can rotate about its vertical axis. While the number of light source lamps, lenses, and input power may vary, the present innovation, at least in one embodiment, defines the light source aperture diameter to be equal to or smaller than 80 mm. In other embodiments, the maximum aperture diameter is 70 mm, 60 mm, 50 mm, 40 mm, 30 mm, 20 mm, or 10 mm. Having a defined standard for a light source module form factor and power/data enables usage of various output light sources with corresponding optics interchangeably inside the same aperture in a standardized luminaire housing.

The light source module can be a plug n' play device coupled to a standardized luminaire housing. The standardized aperture in the housing can then also retain other IOT devices with power and data connectivity. The orientation of this present innovation rotational light source module, coupled to the luminaire housing, is substantially horizontal. When installed, the installer simply aligns the lens beam directional designator with the center line of the path of egress below—no aiming by tilting is required.

The Power Source-Building Code requires that a building means of egress illuminates at least one exit sign and a defined path of egress to a legal exit door when house power is interrupted. To meet the code requirement, a standby back-up power source must be readily available to supply power to the exit and egress luminaires. The common back-up power sources include at least one of: an integral luminaire battery, a remote inverter, and a generator. Three technological advances have contributed to reduced power demands on today's building illuminated means of building egress:

Improved light source light output efficiency,
Improved power storage device efficiency, and
Improved lens optics These advances have contributed to a smaller size housing requirement where a battery is used and/or where inverters (converts direct current, DC, into alternating current, AC) are used. It is understood that the present innovation's reconfigured luminaire architecture is in part as a result of recognizing the lesser size housing requirements of the back-up power source.

Power Source Circuitry—Present egress luminaires commonly rely on an integral battery or batteries to power at least the egress luminaires when house power is interrupted. Normally, the battery is charged under house power and when house power is disrupted, the battery then discharges by applying its stored power to the egress luminaires. The power circuitry of the egress luminaires can require only a single input power circuit.

While the egress luminaire of the present innovation can utilize an integral battery, the present innovation recognizes several limitations associated with such use. Luminaires with integral back-up batteries are often placed in hard to reach locations, the battery life is unpredictable, and additional hardware is required to continuously monitor and test the battery's readiness. These limitations contribute to more opportunities for failure that in turn, add costs to the initial material, labor, and maintenance costs.

The present innovation in one embodiment uses a single inverter (a circuit that converts DC to AC) to provide the back-up AC power needs for the building's illuminated means of egress. The inverter can couple to the code-mandated luminaires by one or two power circuits. The inverter battery or batteries are configured to remain fully charged by house power and then available on standby for discharging their storage power in the event of power interruption. The power consuming devices coupled to a single circuit and the double circuits of this embodiment can be configured as follows:

Single Circuit—The single circuit configuration flows house power directly to downstream illuminating means of egress luminaires and to the battery charger of the inverter. Under house power, only the egress sign luminaires are required to be on. The other egress luminaires are switched off by a micro switch communicatively coupled to at least one of: an inverter controller, a building lighting controller and/or battery management system (BMS). When house power is disrupted, a transfer switch disconnects the house power engaging the inverter. As the inverter engages, a microswitch coupled to the egress luminaire switches on by a signal and/or the received power. The microswitch may use an in-built capacitor.

Double Circuit—The double circuit configuration utilizes two circuits. The first circuit referred herein as the house power circuit powers illuminated means of egress that are required to operate 24/7. Such illuminated means include at least one exit sign luminaire. The second circuit is referred herein as the standby emergency back-up power circuit. This circuit receives power only when house power is interrupted. When power flows through the circuit, all power consuming devices belonging to the illuminated means of egress receive their power from this circuit. These luminaires include at least one of: an egress luminaire and an exit sign luminaire.

The present innovation is configured to incorporate Internet of Things (IOT) devices, communication devices, sensing devices, output devices, and charging devices. These devices can be controlled by at least one processor/controller (computer processor) governed by local AI code, as will be discussed. The processor/controller provides adaptability and makes real time decisions concerning matters of life safety. Some of the devices coupled to the illuminated means of egress may be quasi-related to or not related to the illuminated means of egress. These devices may only share resources such as power or power and data while others for the benefit of other building disciplines. Control over the power usage of all devices is addressed under the specifications for the IOT devices.

The present embodiment recognizes that a single 1.0 kVA or 1.5 kVA output remote inverter powering luminaires employing efficient light sources and lens optics can satisfy the illuminated requirements of a large building. The inverter can be placed at an easy to access secured cabinet and its batteries can be industry standard used among other with vehicles.

IOT Devices—The architecture of the present innovation means of egress provides for the integration of IOT devices into the luminaire housing. A non-exhausted listing of IOT devices includes devices that are connectable, addressable, and controllable over computer networks (wired, wireless, or hybrid) such as temperature sensors, gas detectors, optical detectors, video and still cameras, seismic sensors, IR sensors, transceivers and the like. The building code mandates that the egress luminaires shall be positioned over and along main building circulation arteries to enable occupants to quickly arrive at the legal exit doors of the building. These egress luminaires along with exit sign luminaires are electrified. Since these electrified components are code mandated and are disposed in strategic building locations, they provide a platform for coupling IOT devices.

The IOT devices can be directly associated with the operational requirements of the means of egress luminaires. enhancing their capability to protect life. or can be unrelated sharing common resources coupled to the luminaire. In addition, unrelated devices can be coupled to the egress luminaires' housing, providing utility to quasi related or unrelated building system disciplines.

The IOT devices can include at least one of: a sensing device, a charging device, a communication device, a processing/controlling device, and an output device (e.g., an energy output device such as a speaker that emits audible sound, a warning light that emits a visible light of a certain color, intensity and/or pulsed characteristic, and/or a RF warning signal that is used to trigger another alarm). The sensing devices an include thermal, humidity, air quality/fire, radiation, vibration, audio and visual. The charging device can include a battery and capacitor charger, and a communication device can include a single or bi-directional transceiver that communicates by means of wire (Cat 5, etc.) and/or wireless (e.g., Wi-Fi, 5G, Bluetooth, etc.). The processing/controlling device can couple to at least one local device coupled to a luminaire housing including the light source and or luminaire driver. The output device can be a light source such as an egress path, an indicator, a strobe light source, and/or an audio device such as a speaker.

At minimum, the present innovation provides the full utility of present-day conventional illuminated means of egress. Coupling IOT devices to an egress luminaire with a processor/controller governed by an AI engine enhances the luminaires' utility and provides a novel means of protecting life.

The Processor/controller Code (non-transitory computer readable storage devices that include computer executable instructions)—At least one of the illuminated means of building egress can be coupled to a processor/controller. The processor/controller can be physically or communicatively coupled to at least one IOT device including a light source and a light source driver. The processor/controller is programmed to provide instructions that are compliant with the building codes. The computer code can employ at least one AI algorithm that operates on a trained model. The computer code is configured to process real time input from local and neighboring sensing devices, and to compile instructions that are received from a remote networked device and local data stored including operational logic. The processor can then in real time generate autonomous decisions pertaining to the egress luminaire and/or other devices the processor is communicatively coupled to.

The processor/controller code can have defining features that contribute to a paradigm shift in the perceived illuminated means of egress systems. The addition of sensing devices to a specific addressable location coupled with code that processes multiple inputs in real time, compiles the inputs and makes life saving actionable decisions is novel. The present innovation can bring full machine self-awareness to buildings, exceeding human perception and decision-making capacity. This attribute can be explained by the processor's ability to know what lies beyond and throughout the building.

Scenario 1 is an exemplary illustration of a means of egress luminaire coupled to IOT devices providing a direct utility. A processor/controller, a transceiver, and a sensing device such as a camera with a processor may be coupled to an egress luminaire, wherein the luminaire has a dedicated address and its location inside a building (or outside) is known.

The event-A fire broke out inside a building over an illuminated path of egress. An egress path luminaire equipped with a processor/controller, and a camera can alert an occupant not to follow the path. Without the sensing and processing equipment, the present code requirement could lead an occupant to his or her death by encouraging the occupant to follow a path that is obstructed by the fire. Conventional egress lighting does not assure an occupant that the path is safe. Yet, this is the path the occupant is expected to use in the event of fire in the building. The present innovation recognizes this deficiency and diverts the occupant to a different exit door, saving their life.

Scenario 2 is an illustration of a means of egress luminaire coupled to IOT devices providing predictive utility having the same IOT devices as scenario 1. Event—A camera image sensed and processed by a controller/processor, and communicated to a responsible party, can alert that a legal exiting door is blocked by boxes at a specific location in a building. This predictive observation will save life when fire breaks out and/or in an earthquake.

Scenario 3 is an illustration of a means of egress luminaire coupled to IOT devices providing utility having the same IOT devices as scenario 1. Event—An egress path luminaire coupled to IOT devices, acting as a building security device can relay notice of an unauthorized entry into a building, through the sensed camera input, to a person responsible for building security. The coupled IOT devices are a shared building disciplines resource used for enhanced life safety means and building security.

Scenario 4 is an illustration of a means of egress luminaire coupled to IOT devices providing an unrelated to illuminated means of egress utility. A processor/controller, a transceiver, and a sensing device such as a thermal probe may be coupled to an egress luminaire, wherein the luminaire has a dedicated address and its location inside a building (or outside) is known. A sensor signals the processor/controller that the ambient temperature exceeds a set threshold. The processor/controller sends an alert to the building's facility manager to correct the anomaly.

The processor/controller code can prioritize device operation by assigning each device a relational priority based on a condition/situation. The weighted relation between devices and priorities is rather complex and an AI code algorithm can configure best action based on programmed knowledge, learned experience, real time input, and above all understanding that its prime purpose is to protect life. As a part of the program, the AI code employs a predictive algorithm that anticipate events before they occur and can act including alerting humans and machines.

The AI code can be configured to operate independently from other remote devices or in unison. Acting in unison enables information exchange between devices wherein lifesaving decisions can be made based on sensed input. Event—A camera observes a person in a building with a handgun drawn and another sensor observes noise recognized as a gunshot. The AI code coupled to the plurality of the means of egress luminaires will likely:

Identify the incident as an active shooter event
Alert the authority/ies
Establish by communicating with all networked devices the safest evacuation route
Inform evacuees the path away from the shooter leading to a safe exit door
Keep visual contact with the shooter sharing visual feed with the authorities
Keep visual contact with trapped occupants The IOT devices in the example above, such as a listening device capable of identifying a gunshot and a camera with image recognition capability, are uncommon to building means of egress luminaires. Nonetheless, the scenario described demonstrates an expanded life protecting capability that can only be managed through multiple device communication.

The AI code can prioritize device operation using devices based on code requirements and real time situational needs. In so doing, the processor/controller monitors the power consumption of each coupled device and reduces the power to, and/or turns off devices while prioritizing life saving devices.

For example, a dual circuit remote power circuitry under house power powers an exterior mounted egress luminaire. The luminaire is also coupled to building security lighting and a camera. Under house power circuit the egress light sources are off while the other two devices are on. When building power is interrupted, the egress light sources turn on and the camera input power is switched to the remote power circuit. The building security lighting turns off. As the event proceeds, the local processor/controller monitoring available power alone or communicatively with other like devices, decides whether the camera must remain on, for what duration, and how often it must transmit an image.

To physically accommodate the IOT devices, at least the egress luminaire housing form factor requires reconfiguration. On the device level, at least two IOT devices' form factors, and means of electromechanical connectivity can interchangeably couple to at least one egress luminaire. These devices can be mechanically and electronically sized and configured to fit on or in luminaire housing retaining surfaces. Their electrical/data receptacle/s may also be configured to be electromechanically compatible with at least one light source.

On the luminaire housing level, and consistent with the overall design intent of system modularity, the present innovation has developed interchangeable housing modules that when put together become all elements needed for illuminated means of egress. The modules also provide for device provisions that require changing the housing form.

The illuminated means of egress is comprised of at least one of: an egress luminaire and an exit sign. The present innovation provides for a standalone exit sign and an exit sign that couples to an egress luminaire. The exit sign that couples to the egress luminaire is configured to couple from below or from above. The sign can be single or double sided. The sign can be directly coupled to the egress luminaire, or in a preferred embodiment can be coupled to an intermediary element referred herein as the adaptor.

The adaptor is a volumetric elongated element configured to couple to the exit sign from below. The adaptor can be unitary with an extender or a standalone element. The adaptor is configured to provide the following features: improve the visibility of an exit sign when an egress luminaire is coupled from below, allow power from above to enter the egress luminaire, adapt the assembly to at least one of a surface, a pendent, and wall mounting conditions, and couple to an extender that provides space to add electrical devices.

The adaptor can be mechanically coupled to at least one of: an exit sign, an egress luminaire, an extender, and a wall surface. Coupling the adaptor to at least one of the above elements can be toolless. The adaptor can be made of metallic and/or non-metallic material and can be configured to be used indoors and outdoors.

The extender is a volumetric element that can expand the capacity of the egress luminaire to support more devices. The devices can be disposed inside and/or the exterior surfaces of the extender. The extender is coupled to the egress luminaire from above and to the adaptor from below. For example, in applications where battery is required, the battery can be placed inside the extender. Power from above reaches the extender and is conveyed to the egress luminaire below.

The extender can be a standalone element or can be unitarily coupled to the adaptor, essentially turning the two elements into one element. The extender can be mechanically coupled to at least one of: an exit sign as a standalone element, an egress luminaire, an extender, and a wall surface. Coupling the extender to at least one of the above elements can be toolless. The extender can be made of metallic and/or non-metallic material and can be configured to be used indoors and outdoors.

The Exit Sign and Egress Luminaires—The exiting sign luminaire is a planar surface that is vertically oriented and coupled to a wall, a ceiling, or suspended from a ceiling. At least one side of the vertical planar surface displays written text for an exit and/or a symbol designation for an exit. The text and/or symbol can have a directional designator like a chevron directing building occupants toward an exit door. The text side of the planar surface is opposite to the direction of the occupant's path of travel in a manner that an occupant has visual contact with the sign.

The present innovation can couple IOT devices to the exit sign. It also can use the exit sign as a non-emergency sign. For example, a combination of an outdoor egress luminaire and an exit sign can be placed over a legal existing door. The exit sign can become a sign for a different purpose and not be connected to the electrical circuitry of the egress luminaire below. Similarly, only a portion of the egress luminaire below can be tasked with illuminating a path of egress from the building.

Code requires that the sign remains lit 24/7, and an LED light source is today's most common light source means to illuminate single- and double-sided egress exiting sign luminaires. The size and color of the text and/or symbols are mandated by codes of national and local jurisdictions.

The egress luminaire is coupled to a wall, a ceiling, or suspended from a ceiling. The egress path luminaire can have at least one light source that emits light symmetrically or asymmetrically. Moreover, the lens produces a light pattern that is asymmetric. The egress path luminaire is configured to illuminate a legal path of egress below the luminaire. A building path of egress can be comprised of a plurality of egress path luminaires forming a patchwork of linear continuous illuminated paths that can terminate by the building's legal egress door or can extend beyond the building's legal exit door to the exterior.

FIG. 1A of attachment 3 of U.S. provisional application No. 63/571,885 shows a conceptual circuitry diagram of a building's illuminated means of egress utilizing dual circuitry. This configuration is an exemplary power circuitry configuration; however, it is only a single exemplary circuitry configuration among several. The present innovation prefers powering the illuminated means of building egress through a remote centralized power source. There it is explained that an integral battery with an egress and exit sign luminaire is common in the building industry (not shown). The luminaires' power circuitry relies on a single house power circuit until the power is interrupted. Then, battery (or batteries) inside the luminaire/s power the egress luminaires and/or exit signs' luminaire light sources. When house power is uninterrupted, the batteries are charged.

Another common power circuitry configuration (not shown) includes a single dedicated emergency lighting circuit. The circuit can power all the building's illuminated means of egress or a selected group of luminaires. When house power is interrupted, a remote back-up power source sends power to the dedicated emergency lighting circuit. The balance of the luminaires can be powered by integral batteries.

A more forward-looking power circuitry configuration has a single power circuit operating under house power, powering a selected group of luminaires such as the exit sign luminaires. The balance of at least the egress luminaires is switched off. Each of the egress luminaires are optionally coupled to a computer processor that controls a microswitch to at least one light module and a transceiver (wired and/or wireless). When building power is interrupted, the circuit power switches to at least one remote power supply. The remote power supply can be at least one of the generator, a rectifier, and/or the inverter. When a switchover occurs, an internal sensor coupled to the at least one egress luminaire senses the power interruption and switches the egress luminaire light on. In another configuration the power supply includes a controller that can send a signal to the egress luminaires to turn on and off.

The illuminated means of egress can have a local temporary power source to power at least one of: a microswitch and the transceiver. It should be noted that other devices coupled to the illuminated means of building egress can be selectively switched off when power interruption is sensed or for the duration of such power interruption. Furthermore, illuminated means of building egress governed by a local and/or remote processor/controller can selectively control devices based on real time sensed conditions in the building and available power allocated to each device. The processor/controller may be referred to herein as a computer processor, processor, controller, and/or circuitry or processing circuitry.

The present innovation teaches that at a minimum a single small remote power back-up supply such as the inverter can provide ample power to illuminate the egress means of a large building. Further, the illuminated means of egress can become a device platform for coupled IOT devices. The platform enhances the capacity of the illuminated means of egress to protect life while providing utility for other building disciplines. Furthermore, at least one device that supports at least one unrelated building discipline can be coupled to the platform.

To avoid unnecessary lengthening of the present disclosure reference is made to figures and text from attachment 3 of U.S. provisional application No. 63/571,885, which is incorporated herein by reference. In this document, details of egress luminaires are described in FIGS. 2A-2C, 3A-3H, 4A-4F, 5A-5H, 6A-6D, and 7A-7C. Reference should be made to these figures and associated description for further details.

Figure 19:
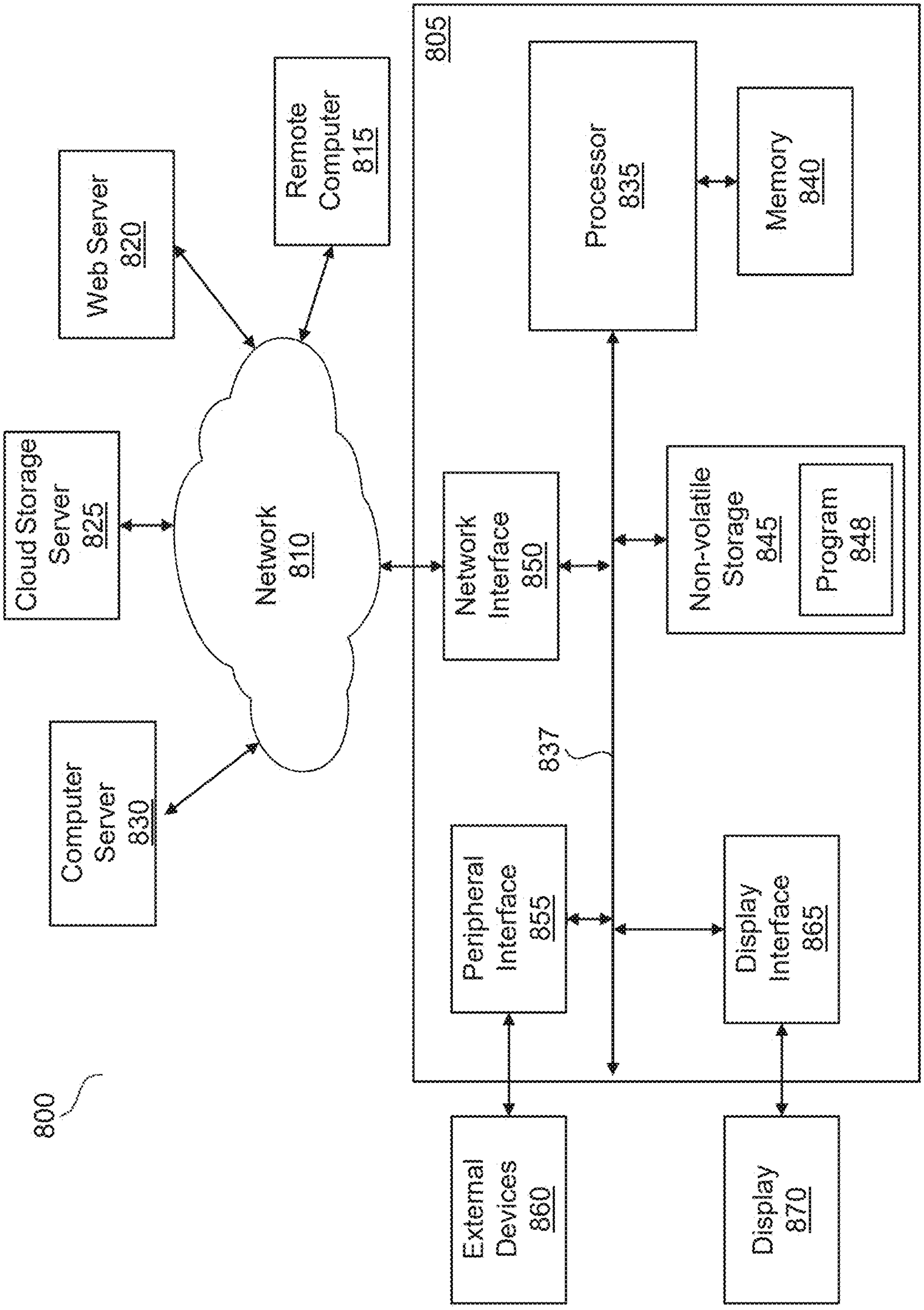
FIG. 19 is a block diagram of a processor/controller (processor circuitry) that controls a light source and egress luminaire according to various embodiments.

FIG. 19 illustrates a block diagram of a computer (processing circuitry) that may implement the various embodiments described herein.

Control aspects of the present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 19 is a functional block diagram illustrating a networked system 800 of one or more networked computers and servers. In an embodiment, the hardware and software environment illustrated in FIG. 1 may provide an exemplary platform for implementation of the software and/or methods according to the present disclosure.

Referring to FIG. 19, a networked system 800 may include, but is not limited to, computer 805, network 810, remote computer 815, web server 820, cloud storage server 825 and computer server 830. In some embodiments, multiple instances of one or more of the functional blocks illustrated in FIG. 19 may be employed.

Additional detail of computer 805 is shown in FIG. 19. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

Figure 20:
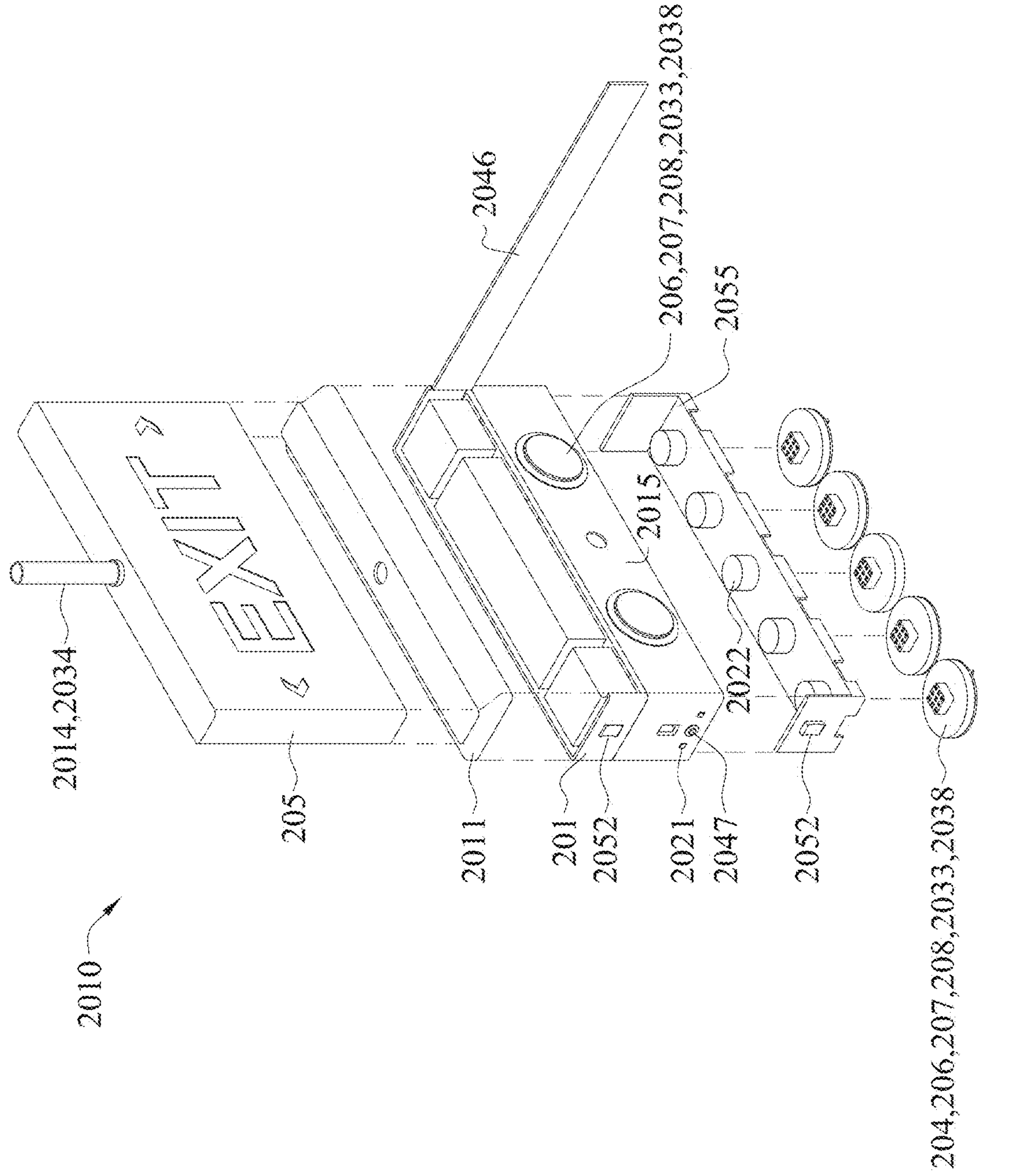
FIG. 20 is an exploded axonometric view of an exit/egress luminaire combination embodiment.

FIG. 20 shows an exploded perspective of an exit/egress luminaire combo 2010. Coupled from above to a conduit 2014, the elements shown from top to bottom include: an exit sign 205, an extender 201, an adaptor 2011, an egress luminaire 2015, a device tray 2055 with light modules 204, and a camera/occupancy sensor 207 below.

Both the extender 201 and the adaptor 2011 show latches 2052 coupled to the short walls of each of the elements. The extender 201 shows an extender door 2046 open, exposing electronic elements housed inside. These elements can include at least one of: a battery 209, a processor/controller 2023, a driver 2025, and a charging device 2037.

The device tray 2055 shows a plurality of power and/or data receptacles configured to couple to an array of IOT devices. These devices can include the light module 204 and the camera/occupancy sensor 207 shown.

The latches 2052 of both the extender 1 and the egress luminaire 2015 secure the extender door's 2046 and the device tray 2055 in place respectively. To release the extender door 2046 or the device tray 2055, one has to exert force by at least one of: pushing, pulling, sliding, and/or twisting at least one of the latches 2052. The figure also shows an indicator light 2021, a test button 2047, and an IOT device 208.

Figure 21:
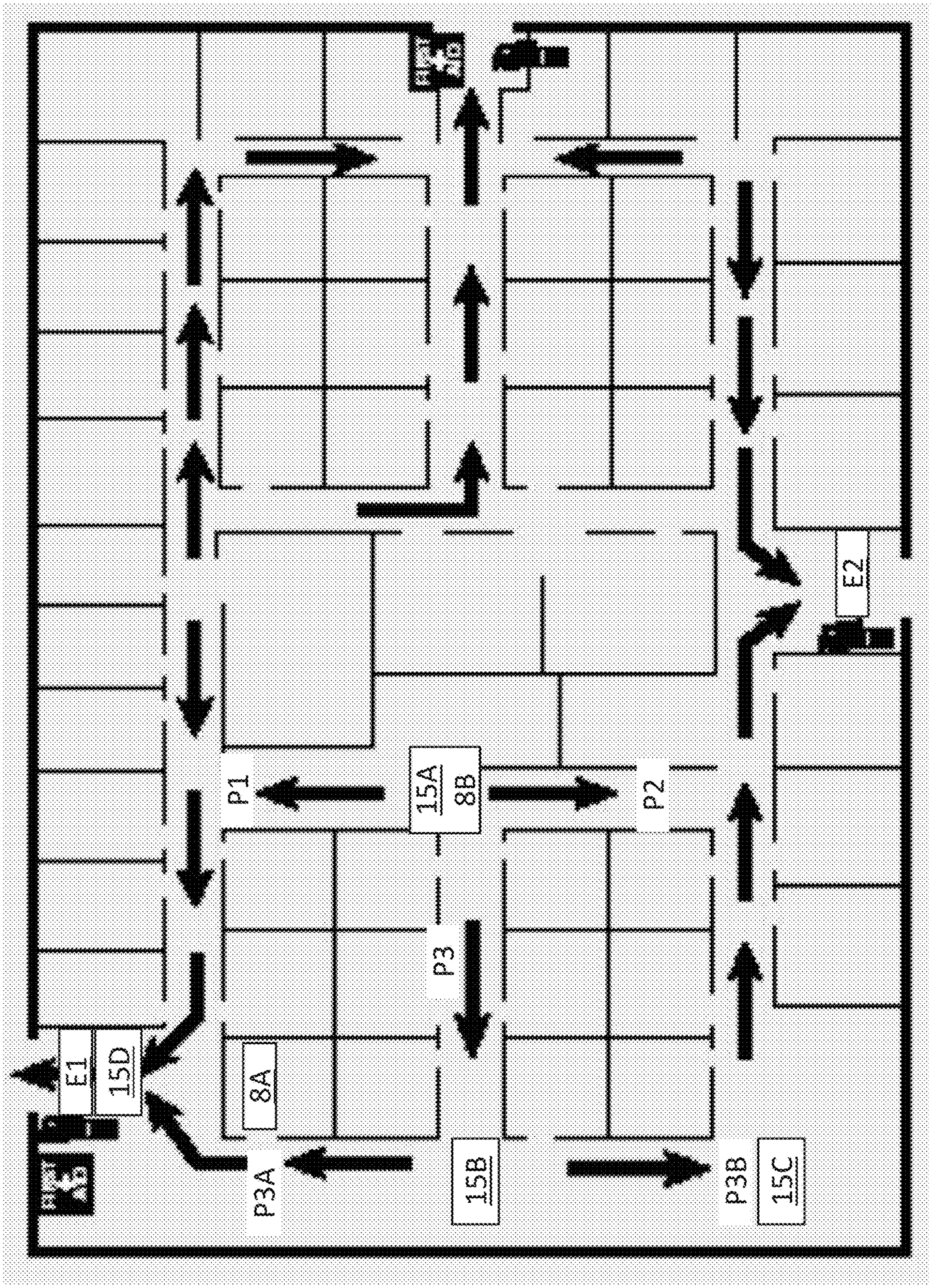
FIG. 21 is a floorplan of a commercial space in which at least one egress luminaire, according to the present disclosure, is provided.

FIG. 21 is an exemplary emergency egress plan showing means of egress for a commercial building, and is shown in a simplified form to complement the descriptions provided in the following figures regarding the application of an AI engine (trained model) to adaptively provide means of egress in the commercial building. In the plan of FIG. 21, exits E1 and E2 are located at South and North sides of the building respectively. Corridors between offices are shown in the plan with arrows pointing along various pre-determined egress routes, leading to an exit. In FIG. 21, 4 different egress luminaires are shown, 15A, 15B, 15C, and 15D. Each of these luminaires is equipped with the directional and reconfigurable light sources and optics to be able to illuminate different paths, depending on how an actual event materializes.

For example, suppose an individual is located near an office along path P1 north of egress luminaire 15A. Normally, supposing an IOT 8B detects a power outage in the building with other alarms sounding in other parts of the building, occupants in this area would normally be directed to exit E1 by following path P1 (the shortest path for this individual to exit E1). Moreover, P1 would be the predetermined path of egress for some in the corridor North of egress luminaire 15A. However, in this situation another IOT, IOT 8A, detects the audio from shots fired by an active shooter at exit E1. In this situation, an AI engine (discussed with reference to the following figures) executed in the computer processor of egress luminaire 15A determines that path P1 is no longer a suitable means of egress under this situation. Instead, the egress luminaire 15A determines that path P2 is a safer means (superior path) of egress out the south of the building at exit E2. The egress luminaire 15A responds by not illuminating path P1 but illuminating the path P2 so the occupant is guided way from exit E1 and toward Exit E2.

On the other hand, it is possible that the IOT 8B visually detects that path P2 is congested with other evacuees. In this situation, egress luminaire 15A communicates (via direct wired communications or wirelessly) with egress luminaire 15B, updating egress luminaire 15B of the congestion along path P2. In response to the recognition that there is an active shooter near exit E1, and that path P2 is congested, the AI engine operating in egress luminaire 15B cooperates with egress luminaire 15C to provide an illuminated means of egress along path P3B. Moreover, egress luminaire 15B chooses not to illuminate the pre-determined means of egress path P3A due to the detection of the active shooter, and instead cooperates with egress luminaire 15A and egress luminaire 15B to provide an alternative path toward exit E2, and thus avoiding the congested path P2 as well as path P3A, which leads toward the active shooter.

The above description is just one example of how an AI based egress luminaire can adaptively provide a safest and most efficient route in an active shooter situation, and/or a situation where certain standard means of egress are overly congested. As was previously discussed, the AI engine is trained to accommodate input from various IOT and other sensors for reacting and adapting to received communications as well as sensor input for temperature, sound, pressure, seismic, facial recognition, light, chemical (e.g., gases such as natural gas, CO, etc.), or toxic substance detection (e.g., sarin gas, radioactive materials).

Figure 22:
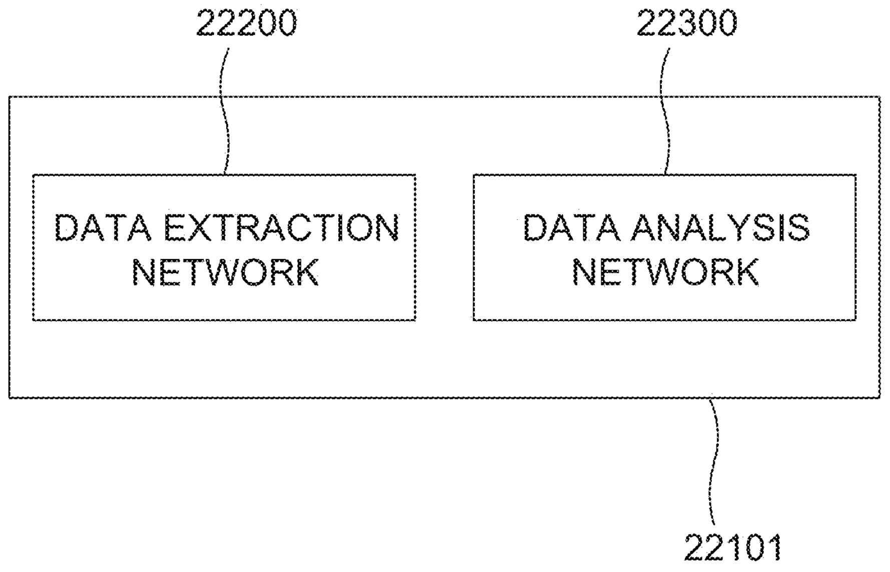
FIG. 22 is a block diagram of a computer-based system that includes two neural networks used to host artificial intelligence (AI) and machine learning processes described herein.

Turning to FIG. 22, an explanation is provided regarding how a computer-based system 22101 (which can be implemented with the computer hardware and software previously described with respect to FIG. 19) determines a best means of egress in varying conditions.

First, by referring to FIG. 22, a configuration of the computing computer-based system 22101 will be explained. The computer-based system 22101 may include a data extraction network 22200 and a data analysis network 22300.

Figure 23:
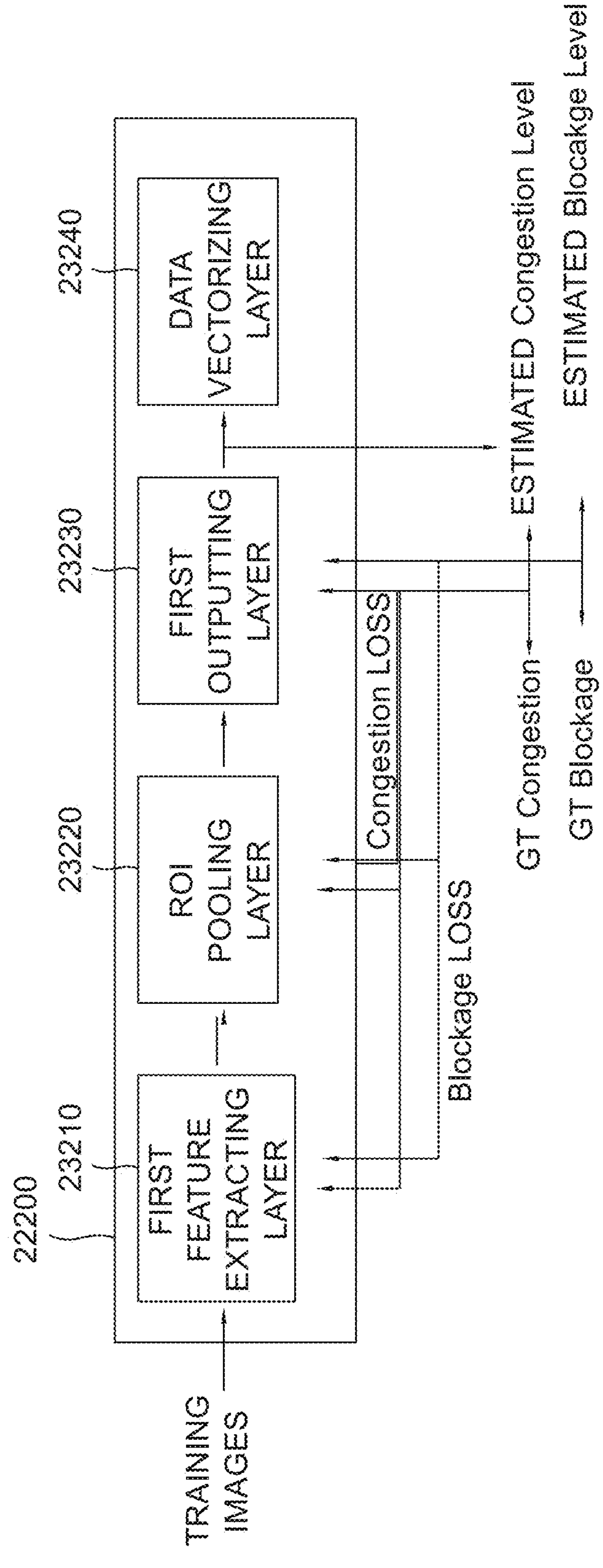
FIG. 23 is a more detailed block diagram of a computer-based data-extraction network shown in FIG. 22.

In reference to FIG. 23, the data extraction network 22200 may include at least one first feature extracting layer 23210, at least one Region-Of-Interest (ROI) pooling layer 23220, at least one first outputting layer 22230 and at least one data vectorizing layer 23240. And, also to be illustrated in FIG. 24, the data analysis network 24300 may include at least one second feature extracting layer 24310 and at least one second outputting layer 24320.

Below, specific processes of determining the means of egress will be explained.

In this non-limiting example, first, the computer-based system 22101 may acquire at least one subject image, perhaps from IOT 8B (FIG. 21). Of course, other input may be used as well such as temperature, sound, pressure, seismic, facial recognition, light, chemical, or toxic substance may be used as well, but in this example, an image (video or still image) is used. The image is of a scene along P2.

After the subject image is acquired, in order to generate a source vector to be inputted to the data analysis network 22300, the computing device 22100 may instruct the data extraction network 22200 to generate the source vector including (i) an apparent human congestion, and (ii) an apparent blockage due to non-human object(s).

In order to generate the source vector, the computer-based system 101 may instruct at least part of the data extraction network 22200 to detect the apparent human congestion from the subject image.

Specifically, the computer-based system 22101 may instruct the first feature extracting layer 23210 to apply at least one first convolutional operation to the subject image, to thereby generate at least one subject feature map. Thereafter, the computer-based system 23101 may instruct the ROI pooling layer 23220 to generate one or more ROI-Pooled feature maps by pooling regions on the subject feature map, corresponding to ROIs on the subject image which have been acquired from a Region Proposal Network (RPN) interworking with the data extraction network 22200. And, the computer-based system 101 may instruct the first outputting layer 23230 to generate at least one estimated congestion level and at least one estimated blockage level. That is, the first outputting layer 23230 may perform a classification and a regression on the subject image, by applying at least one first Fully-Connected (FC) operation to the ROI-Pooled feature maps, to generate each of the estimated congestion level and the blockage level, including information on coordinates of each of bounding boxes. Herein, the bounding boxes may include human occupants and items identified in images in the hallway.

After such detecting processes are completed, by using the estimated congestion amount and the estimated blockage amount, the computer-based system 22101 may instruct the data vectorizing layer 23240 to subtract a volume occupied by occupants (and items) to a volume present along path P2 to determine an apparent congestion and an apparent blockage.

After the apparent congestion and the apparent blockage are acquired, the computing device 22100 may instruct the data vectorizing layer 23240 to generate at least one source vector including the apparent congestion and the apparent blockage as its at least part of components.

Then, the computing device 22100 may instruct the data analysis network 22300 to calculate an estimated total congestion/blockage by using the source vector. Herein, the second feature extracting layer 24310 of the data analysis network 22300 may apply second convolutional operation to the source vector to generate at least one source feature map, and the second outputting layer 24320 of the data analysis network 22300 may perform a regression, by applying at least one FC operation to the source feature map, to thereby calculate the estimated total congestion/blockage. Once trained, the resulting AI engine may use the estimated total congestion/blockage as one layer of the AI's engine (as well as other layers trained to analyze the other parameters discussed herein) as input to the computer-based system 22101 in assessing whether the candidate path is superior to the existing egress path. Based on that that assessment, the computer processor and control the egress luminaire to illuminate the superior egress path to a safe exit.

As discussed above, the computer-based system 22101 includes two neural networks, i.e., the data extraction network 22200 and the data analysis network 22300. The two neural networks are trained to perform the processes properly. Below, a more detailed description of how to train the two neural networks will be explained in reference to FIGS. 11 and 12.

First, by referring to FIG. 23, the data extraction network 22200 may have been trained by using (i) a plurality of training images corresponding to scenes of the hallway for path P2 for training, photographed from the perspective of the egress luminaire 15A for training, as well as images of various scenes with various people, and objects sometimes in the hallway and other times not in the hallway, and (ii) a plurality of their corresponding ground truth (GT) congestion amounts of people and objects. More specifically, the data extraction network 22200 may have applied aforementioned operations to the training images, and have generated their corresponding estimated congestion and blockage levels. Then, (i) each of ground pairs of each of the estimated congestion amounts and each of their corresponding GT congestions and (ii) each of blockage amounts of various items and each of their blockage GTs are referred to, in order to generate at least one congestion loss and at least one blockage loss, by using any of loss generating algorithms, e.g., a smooth-L1 loss algorithm and a cross-entropy loss algorithm. Thereafter, by referring to the congestion loss and the blockage loss, backpropagation may have been performed to learn at least part of parameters of the data extraction network 200. Parameters of the RPN can be trained also, but a usage of the RPN is a well-known prior art, thus further explanation is omitted.

Herein, the data vectorizing layer 23240 may have been implemented by using a rule-based algorithm, not a neural network algorithm. In this case, the data vectorizing layer 23240 may not need to be trained, and may just be able to perform properly by using its settings inputted by a manager.

As an example, the first feature extracting layer 23210, the ROI pooling layer 23220 and the first outputting layer 23230 may be acquired by applying a transfer learning, which is a known technology, to an existing object detection network such as VGG or ResNet, etc.

Figure 24:
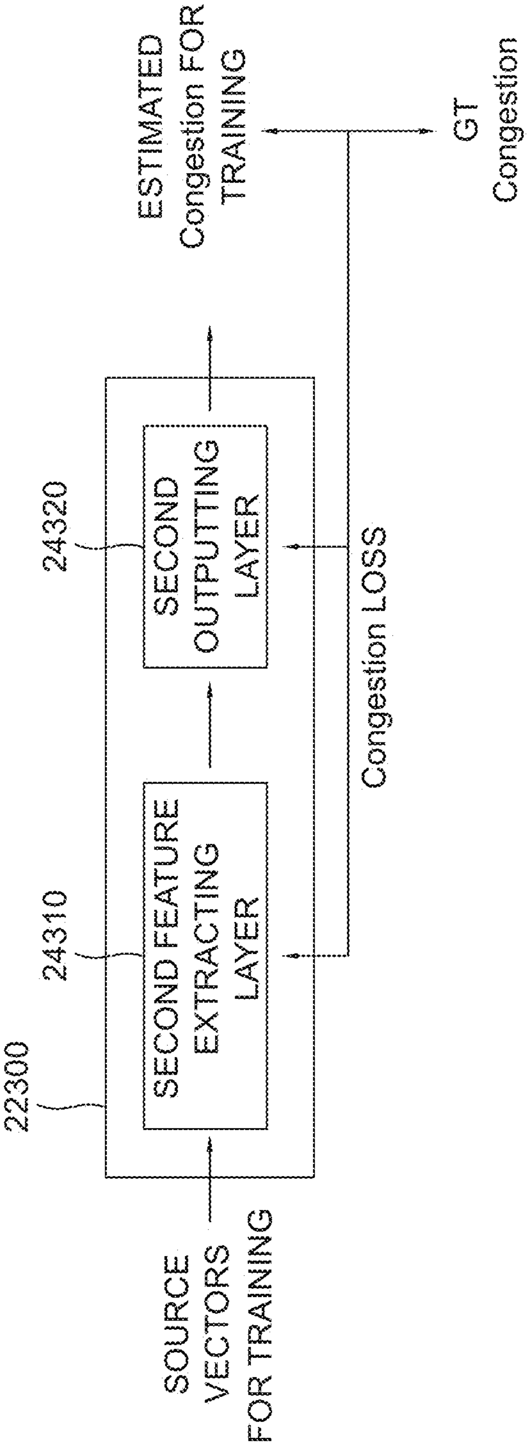
FIG. 24 is a more detailed block diagram of the computer-based data analysis network shown in FIG. 22.

Second, by referring to FIG. 24, the data analysis network 22300 may have been trained by using (i) a plurality of source vectors for training, including apparent congestion for training and apparent blockages for training as their components, and (ii) a plurality of their corresponding GT total congestion/blockage. More specifically, the data analysis network 22300 may have applied aforementioned operations to the source vectors for training, to thereby calculate their corresponding estimated congestion for training. Then each of congestion pairs of each of the estimated congestion amounts and each of their corresponding GT congestion amounts may have been referred to, in order to generate at least one congestion loss, by using any of the previously discussed loss algorithms. Thereafter, by referring to the congestion loss, backpropagation can be performed to learn at least part of parameters of the data analysis network 22300. After the total congestion/blockage is calculated, further training for additional parameters such as temperature, sound, pressure, seismic, facial recognition, light, chemical, or toxic substance may be used as well to further refine the process for adaptively identifying a best means of egress under the circumstances.

After performing such training processes, the computer-based system 22101 has trained the AI engine to properly calculate the congestion amount by using the subject image including the scene photographed from the IOT 8B. Moreover, as a consequence of training the computer-based system 22101 to implement the AI engine to consider the above described parameters, the AI engine may be used to select certain paths (e.g., path P2 may or may not be selected or not based on the congestion amount as compared to alternative paths, such as P3B, previously discussed) to adaptively identify a best means of egress under the circumstances. The computer-based system 22101 selects one or more means of egress by comparing candidate paths that have been evaluated with the AI engine according to the described parameters, and a path (or multiple paths) with the highest evaluation rating, or ratings above a threshold, is/are selected. In response to the selection, the egress luminaires (15A, 15B, 15C) in this example illuminate the selected means of egress (e.g., P3, P3B, and P2) in this example, and optionally egress Luminaire 15D does not illuminate a means of egress, and optionally extinguishes the light source for its exit luminaire so as to prevent inducing an occupant to head toward a safe exit. As discussed above, the AI engine may also be trained to consider other parameters (e.g., fire, gas leak, toxic chemicals, power outages, etc.) beyond congestion and blocking and the processes above may be used to train the AI engine in a similar way.

Hereafter, another embodiments will be presented for determining the total congestion amount.

As a second embodiment, it is considered that the perspective of the camera in the egress luminaire is elevated, and so the image of the hallway is tilted. To account for this factor, the source vector may further include an actual distance, which is a distance in a real world between the camera and the hallway floor, as an additional component of the source vector. For the second embodiment, it is assumed that a camera height, which is a distance between the IOT 8B and a ground directly below the camera in the real world, is provided. This embodiment is same as the first embodiment until the first outputting layer 23230 generates a tilt angle to better assess the amount of congestion even though the camera in the IOT 8B is not directly overhead, but takes the image from a tilt. Hereinafter, processes performed after the tilt angle is generated will be explained.

The computer-based system 22101 may instruct the data analysis network 23300 to calculate the actual distance by referring to information on the camera height, the tilt angle, a coordinate of the lower boundary of the main entrance door, by using a following formula:

$$d_{actual} = \sqrt{\frac{h^2 + h^2\tan^2\left\{\frac{\pi}{2} + \theta_{tilt} - a\tan\left(\frac{y-cy}{fy}\right)\right\}}{1 + \frac{(y-cy)^2}{fy^2}}\left(\frac{x-cx}{fx}\right)^2 + h^2\tan^2\left\{\frac{\pi}{2} + \theta_{tilt} - a\tan\left(\frac{y-cy}{fy}\right)\right\}}$$

In the formula, x and y may denote coordinates of the lower boundary of the floor, fx and fy may denote the focal lengths for each axis, cx and cy may denote coordinates of the principal point, and h may denote the camera height. A usage of such formula for calculating the actual distance is a well-known prior art, thus further explanation is omitted.

After the total congestion/blockage is calculated, further training for additional parameters such as temperature, sound, pressure, seismic, facial recognition, light, chemical, or toxic substance may be used as well to further refine the process for adaptively identifying a best means of egress under the circumstances.

Figure 25:
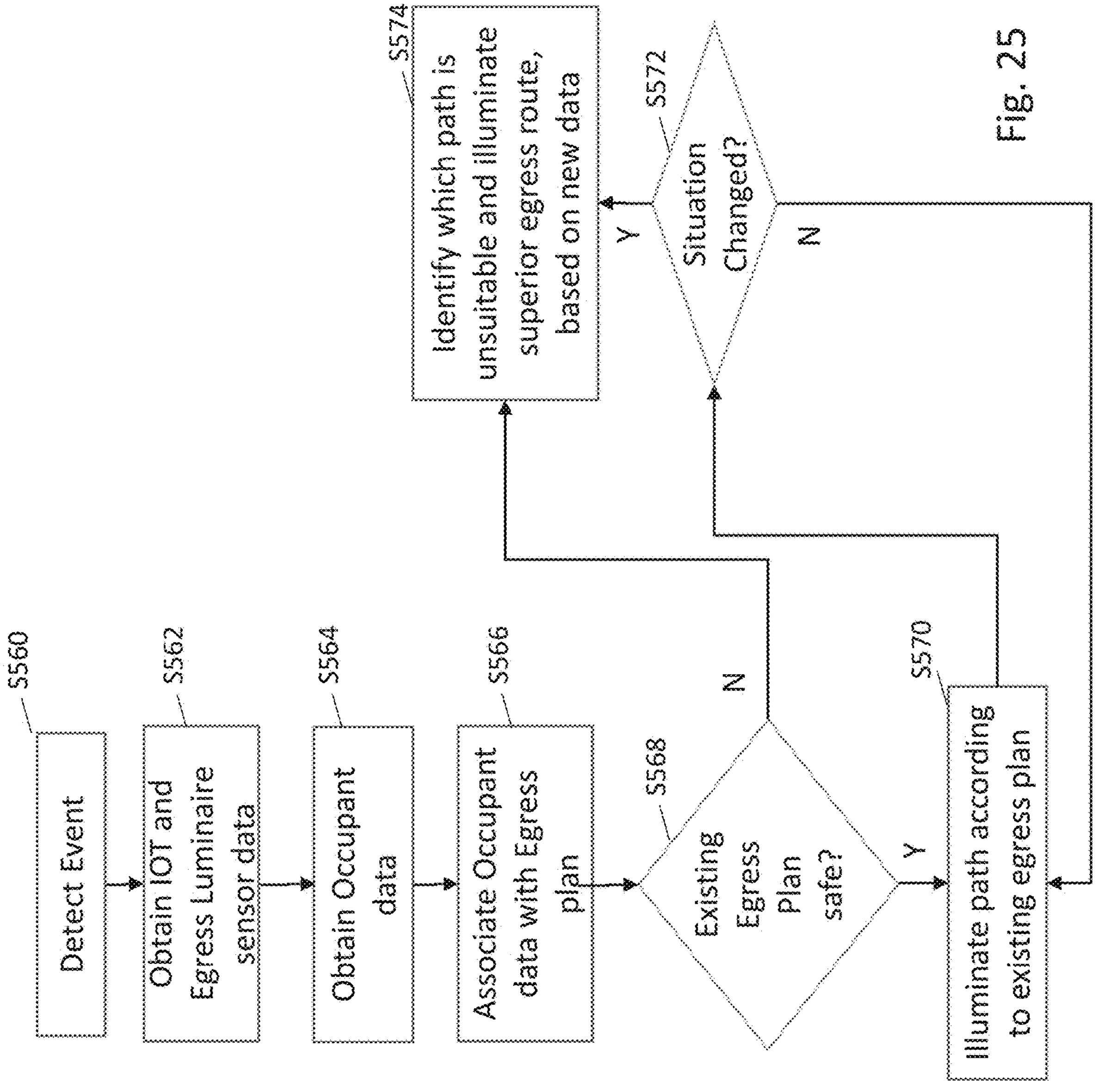
FIG. 25 is a flowchart of a process performed according to an embodiment of the present disclosure to adaptively illuminate a superior means of egress using an egress luminaire according to the present disclosure.

FIG. 25 is a flowchart of a computer-based algorithm performed according to the present disclosure to adaptively control and provide an illuminated means of egress. The process beings in step S560 in which an event is detected by the egress luminaire, the IOT, another device, or via a command signal from an external device in which occupants are to leave a space, and the egress luminaire is triggered to illuminate a means of egress. The process then proceeds to step S562 in which the egress luminaire receives other data (e.g., image data, sensor data and the like) used as input to the AI engine to identify an appropriate means of egress under the circumstances. The process then proceeds to S564 where additional input is received (optionally) that detects the presence of occupants (e.g., via cameras and/or IR detectors) in areas within the interior space so the egress luminaire can keep track of the occupants and continue to provide superior means of egress for remaining occupants as the situation in the building develops further. Under the condition that occupants are detected, then that occupancy data is associated with a preexisting egress plan in step S566 so the egress luminaire continues to illuminate superior means of egress for those occupants as the situation in the building develops (e.g., movement of fire, movement of active shooter, etc.).

The process then proceeds to a query in step S568 in which a determination is made regarding whether the predetermined (existing) egress plan, along with egress paths that are part of the plan, are sufficient under the circumstances. If the response to the query is affirmative, then the process proceeds to step S570 where the egress luminaire illuminates egress paths according to the existing egress plan. Then the process performs a query in step S572 to determine if the situation has changed (e.g., perhaps an active shooter has moved locations). If not, the process returns to step S570. However, if the response to the query in step S568 is negative, the process applies the AI engine to identify which path(s) is unsuitable (or inferior) to a superior egress route, and then directs the egress luminaire to illuminate that superior egress route. The process optionally continues to check whether the situation has changed that would cause the egress luminaire to identify a new route as a superior egress route under the circumstances and then illuminate that new route.

Figure 26:
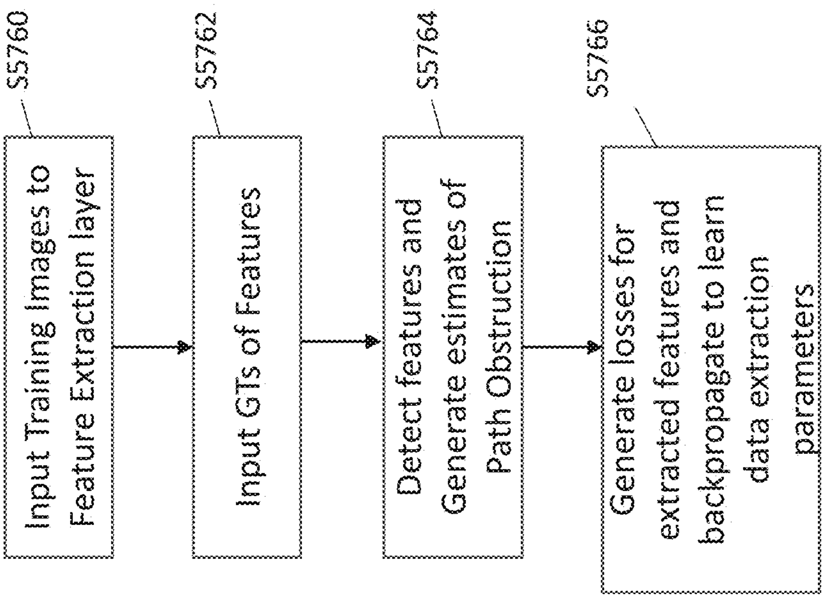
FIG. 26 is a flowchart of a process performed for training an AI engine to detect hallway congestion (or another observed parameter) based on images of hallways, occupants, and objects.

FIG. 26 is a flowchart of a process performed for training an AI engine to detect hallway congestion (or another observed parameter) based on images of hallways, occupants, and objects.

The process begins in step S5760 where training images (e.g., images such as images of a hallway that are fully or partially blocked by objects or congested with occupants, or include evidence of other dangerous issues that bear on the decision for which routes should be included/excluded for a superior egress route under the circumstances) are applied as a feature extraction layer where features are detected in the images, such as the bounding boxes showing selected features from images. The process then proceeds to step S5762 where ground truth (GT) images are input to the data extraction network in step S5762. Then in step S5764 estimates are generated for the detected features, and in step S5766 losses are generated for the extracted features, with respect to the GTs, and backpropagated so as to learn the data extraction parameters of the data extraction network.

Figure 27:
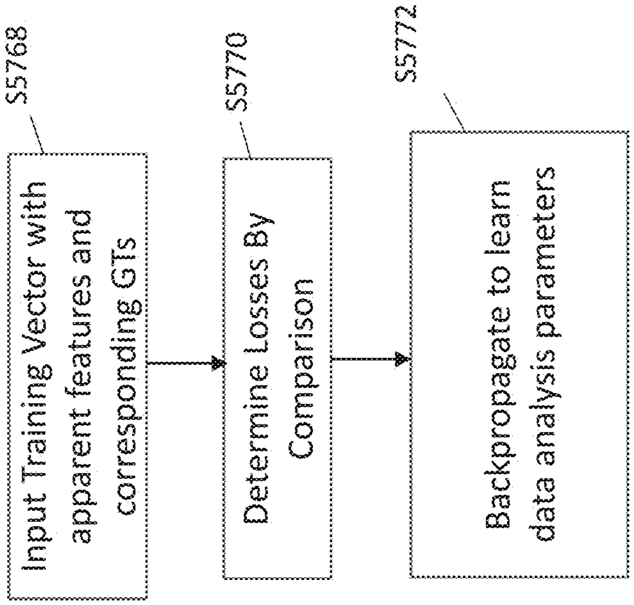
FIG. 27 is a flowchart of a process that uses the trained AI engine for detecting hallway congestion based on input images of at least the hallway possibly other parameters as well.

FIG. 27 is a flowchart that corresponds with the training of the data analysis network of the AI engine as previously discussed. The process begins in step S5768 where a training vector is input with respect to apparent features as well as corresponding vectors that are GTs. In step S5770 the losses for the parameters are determined by comparison, and then in step S5772 the losses are back-propagated so as to learn the data analysis parameters of the data analysis network.

Orientations of light modules included in receptacles and non-lit devices in receptables, are described in detail in reference to attachment 3 of U.S. provisional application No. 63/571,885, FIGS. 16A1 to 16C2.

FIGS. 17A and 17 B of attachment 3 to U.S. provisional application No. 63/571,885 shows an egress luminaire light module transverse beam angle light dispersion at a different mounting height of like luminaire 15.

Figure 28:
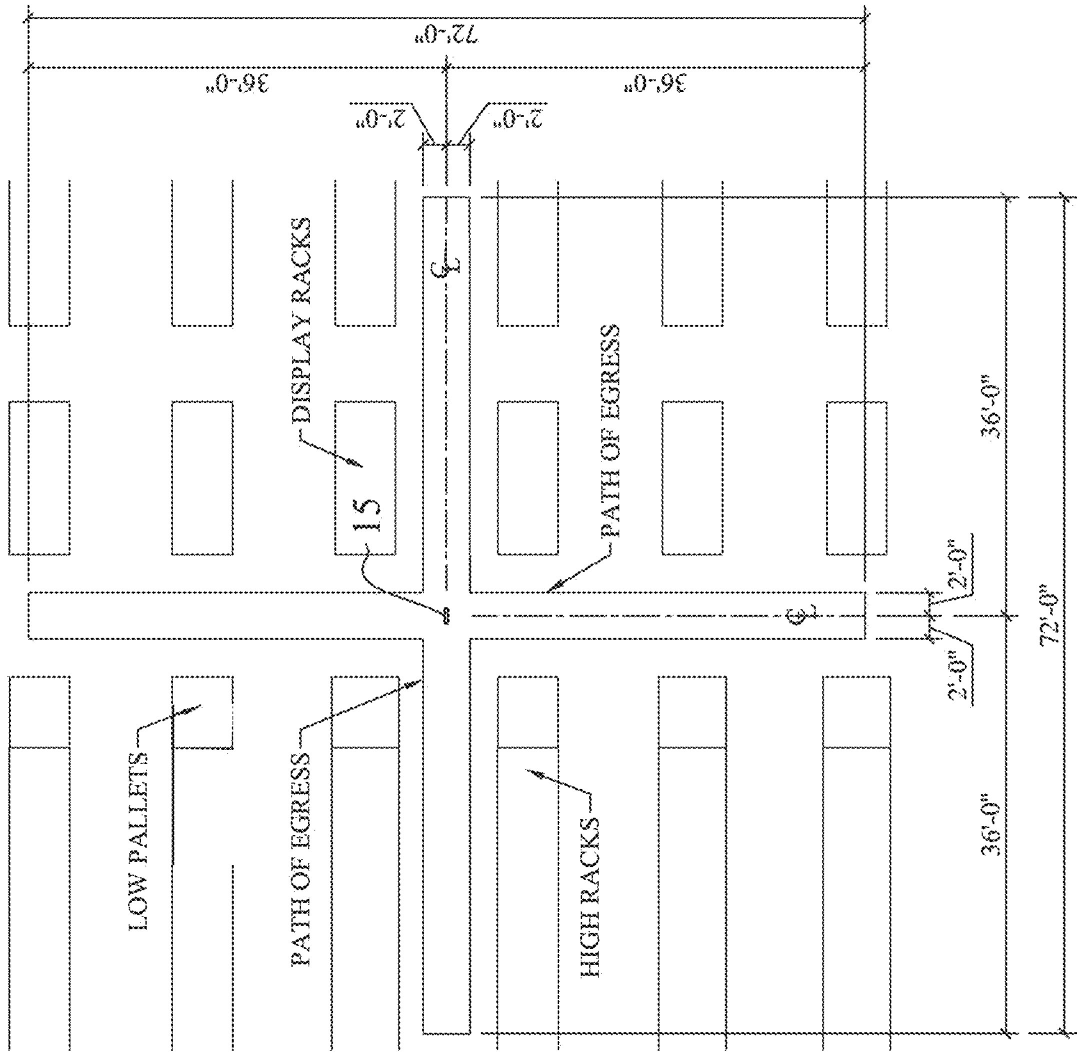
FIG. 28 is an overhead view from the perspective of an egress luminaire installed on the ceiling of a warehouse, and illustrating how the directivity of the traverse light beam may be set to illuminate a path of egress in more than one direction (e.g., North/South, and East/West).

FIG. 28 shows a single egress luminaire coupled to four light modules illuminating four distinct paths of egress in a typical "big box" retail store. The store floor furniture includes high racks with products on low pallets abutting at the short ends of the racks and display tables at the opposite side of the main aisle. The paths shown in this figure are configured at 90 degrees to one another. In addition, by utilizing a five-receptacle luminaire the path can be formed with an exit sign coupled to the center receptacle. The present figure egress luminaire mounting height shown is 23'-0" above floor. The four asymmetrical light modules configured back-to-back illuminate two path of egress crossings at 90 degrees paths of egress, each path approximately 72 ft long and four feet wide. The illumination level is configured to maintain code required minimum light levels for a duration of 90 minutes. This egress path configuration power consumption can be as little as 28 W. Coupled to an exit luminaire the "Combo" luminaire power consumption can be as low as 32 W. The five receptacle luminaire's versatility reduces the number of ceiling mounted luminaires that in turn reduces the installation and maintenance costs of a building illuminated means of egress.

Figure 29:
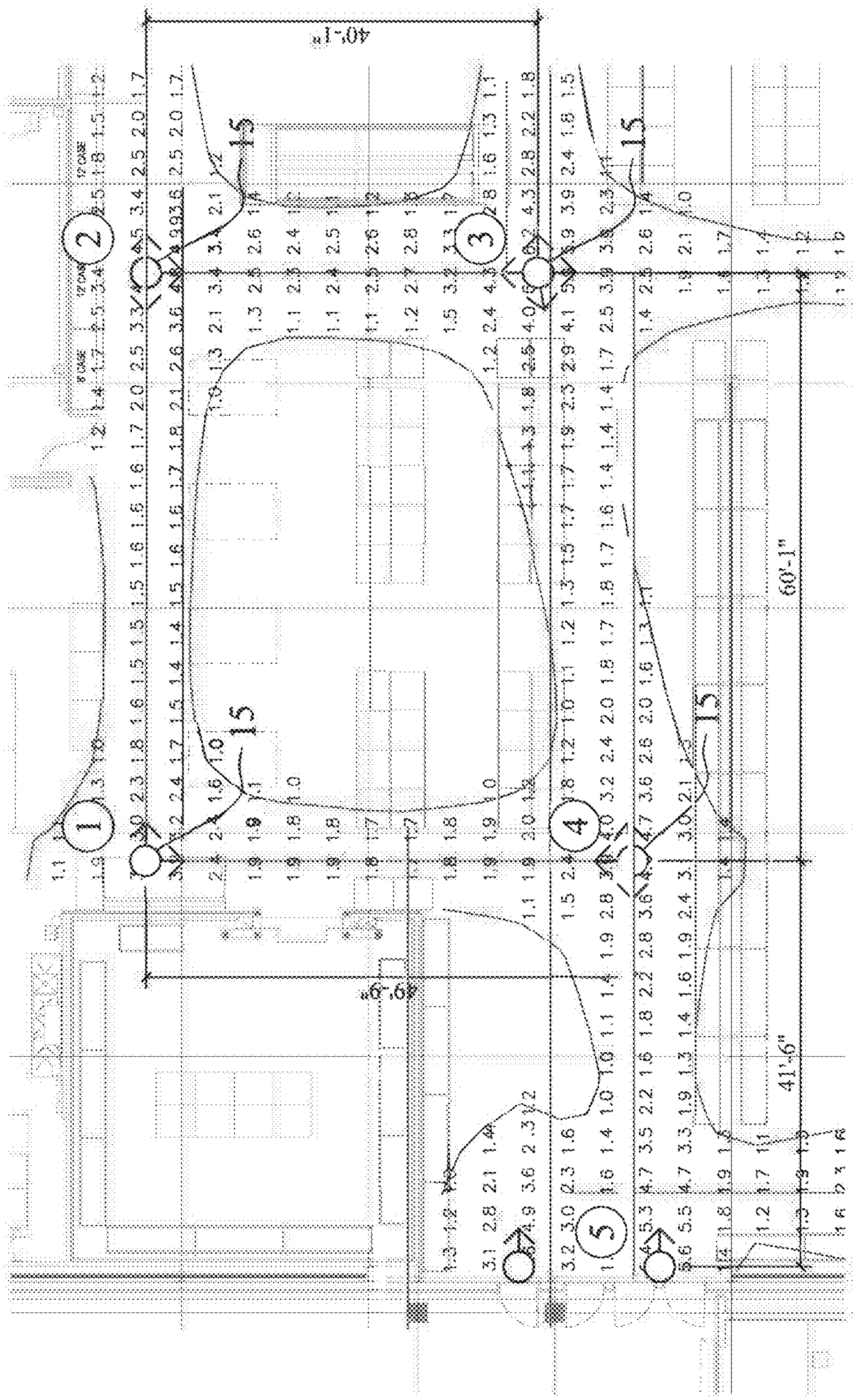
FIG. 29 is a more detailed illustration of an overhead view from the perspective of an egress luminaire that includes partial building egress light photometry at a floor level based on light emitted from a set of egress luminaires distributed at predetermined locations on a ceiling of a warehouse.

FIG. 29 shows a partial building egress light photometry at floor level with egress luminaires using different light modules and different light modules orientation. The luminaires' mounting height in this figure is also 23'-0" as in FIG. 28, and the spacing between the luminaires is as shown. Luminaire 1 is coupled to two light modules oriented at 90 degrees to one another to form a path of egress below with a light pattern arrangement similar to the letter L. Luminaire 2 is coupled to two light modules disposed back-to-back to form a straight 180 degree egress path of egress below. Luminaire 3 is coupled to four light modules. Three of the light modules are at 90 degrees to one another to form a path of egress below with a light pattern similar to the letter T. The fourth light module illuminates a skewed path of egress and is oriented toward luminaire number 4. Luminaire 4 is coupled to three light modules that are at 90 degrees to one another to form a light pattern arrangement similar to the letter T. The present figure demonstrates just a few among a number of possible light module configurations alone, coupled to an exit luminaire, and/or at least one sensing and/or output device.

FIGS. 20A and 20B of attachment 3 to U.S. provisional application No. 63/571,885 shows in a partial reflective ceiling plan a bottom view of a 2'-0"×4'-0" ambient lighting luminaire with an egress light module 60 coupled forming an ambient/egress lighting luminaire 75. The bottom surface of the luminaire 75 is facing the room side. The luminaire 75 can lie in a T-bar ceiling grid or can be suspended from a structure above.

In some embodiments, the emergency egress lighting light sources and/or the camera can be coupled to universal receptacles. The universal receptacles can convey power or power and data. The ambient/egress lighting luminaire can be coupled to and supported by a plurality of IOT devices. At least one other than the devices aforementioned can provide utility under primary and/or secondary power. The secondary power can include the auxiliary power (e.g., battery), the inverter, or the generator. In addition, at least one device can operate under primary and secondary power. Further, the type of utility and performance characteristics of the device operating under primary and secondary power sources can be different.

The ambient/emergency lighting luminaire emergency egress light module can receive power from a coupled power supply or from a remote location. The coupled power supply can be coupled to the ambient/emergency lighting luminaire from inside the housing, coupled to an exterior surface, or placed in the vicinity of the luminaire. Other devices coupled to the ambient/emergency lighting luminaire can include a processor/controller (e.g., computer processor circuitry), with resident memory, and code, a communication device (e.g., transceiver), a sensory device (e.g., camera), and an output device (e.g., the emergency egress light modules).

The form of the ambient/emergency lighting luminaire and the housing's cover surfaces retaining the electronic devices of the luminaire can vary. The electronic devices and more particularly devices coupled to the ambient/emergency lighting luminaire that are associated with a building means of egress lighting can include an automatic and/or manual power supply testing device subjecting the emergency egress lighting devices to periodic testing. In some embodiments, the power supply testing device comprises the testing button and an indicator light(s) showing the emergency lighting readiness mode. In a different embodiment the automatic power supply self-testing device can be remotely located.

FIG. 20B of attachment 3 to U.S. provisional application No. 63/571,885 shows in a partial reflective ceiling plan the bottom view of a round ambient/emergency lighting luminaire (e.g., a round high bay ambient lighting luminaire) with egress light modules coupled. The bottom surface of the now ambient/egress lighting luminaire is facing the room side (i.e., interior space of the room). The round formed luminaire can be used in medium and high luminaire mounting applications. As with the rectangular shaped ambient/egress lighting luminaire, the round formed luminaire can couple to at least the same IOT devices and can provide equal utility for both the ambient and the emergency egress lighting illumination.

According to some embodiments, the round ambient/emergency lighting luminaire includes four emergency lighting light sources showing directional arrows, an occupancy sensor, an indicator light, a manual test button, and a switching device. According to some aspects of the disclosed subject matter, a wireless or wired communication device can be coupled to the ambient/egress lighting luminaire. In some embodiments, an antenna is coupled to the communication device (e.g., transceiver) and/or coupled to the ambient/egress lighting luminaire housing exterior.

At least one processing/controlling device (e.g., processor/controller) can be coupled to the ambient/egress lighting luminaire housing's interior. As with the rectangular shaped ambient/egress lighting luminaire, the round shaped ambient lighting luminaire coupled to the emergency egress light module can have at least one integral secondary power source coupled or can receive power from a secondary remote power source. Furthermore, as with the rectangular shaped ambient/egress lighting luminaire, the round ambient/emergency lighting luminaire (e.g., a round high bay ambient lighting luminaire) and the ambient/egress low and high bay luminaire can have shapes other than a round form.

FIGS. 21A, 21B, 21C and 21D of attachment 3 to U.S. provisional application No. 63/571,885 show partial cross-sections and bottom face elevations of an ambient lighting luminaire with coupled emergency egress light module 60 receptacles for detachable and fixed light sources. In this configuration, aligning the emergency egress light module with the designated path of egress below only requires pulling down and rotating the emergency egress light module, and then releasing the emergency egress light module when the light source's center beam is optimally aligned with the longitudinal axis of the designated path of egress below.

FIG. 22 of attachment 3 to U.S. provisional application No. 63/571,885 shows a partial reflected ceiling plan of an interior space using 2'-0"×4'-0" ambient and ambient/egress lighting luminaires above a linear path of egress.

FIG. 23 of attachment 3 to U.S. provisional application No. 63/571,885 shows an open ceiling arrangement of high bay luminaires. According to some embodiments, the luminaires are spaced on a 24'-0"×24'-0" grid at 24'-0" AFF.

FIG. 24 of attachment 3 to U.S. provisional application No. 63/571,885 shows a partial reflected ceiling plan of an interior corridor 68 using 2'-0"×4'-0" luminaires in a T-bar ceiling located above a nonlinear path of egress.

FIG. 25 of attachment 3 to U.S. provisional application No. 63/571,885 shows a partial reflected ceiling plan of an interior space using 2'-0"×4'-0" luminaires installed in a T-bar ceiling and a coupled camera monitoring multiple corridors.

The above configuration represents only a fraction of permutations and functionalities that can be derived by employing ambient lighting luminaires in conjunction with ambient/egress lighting luminaires light source/s and other IOT devices. FIG. 26 of attachment 3 to U.S. provisional application No. 63/571,885 is a diagram expanding on such permutations and functionalities.

Powering an egress lighting light source can be provided by a primary source or primary and secondary power sources. The present diagram articulates means to expand the utility of the ambient/egress lighting luminaire with coupled egress light module/s and IOT devices. Further, the ambient/egress luminaire can be coupled to a processor/controller and execute in real time operation using resident code. The processor/controller in real time receives and acts on at least one of: an environmental input, programmatic parameter input, and remote instructions/data resulting in enhanced capability to protect life and property.

Among the features that the enhanced ambient/egress lighting luminaire coupled to a processor/controller and IOT device/s can provide include, but are not limited to: sensory inputs of which some cannot be detected by humans, and communication capabilities that include alerting occupants and remote clients. The processor/controller operating by AI code can have self-learning algorithms, learning the environmental conditions surrounding the ambient/egress lighting luminaire's location. The processor/controller compiles a plurality of inputs from the onboard code programming, compiles inputs communicated from remote device/s, and compiles resident sensory device input to make intelligent decisions concerning at least one of:

1. Device power draw;
2. Device power activation and deactivation;
3. Time and duration of device use;
4. Local and/or remote communication;
5. Who and when to contact based on a detected event;
6. Monitor and test operational readiness; and
7. Anticipate events and take preventive measure/s.

The code modules of the processor/controller can be modularly compiled in relation to the anticipated IOT devices to be coupled to ambient lighting luminaire/s and ambient/egress lighting luminaire/s at any one space. The processor/controller can operate the IOT devices individually or in concert with one another. In addition, the processor/controller can communicate with and/or operate remote IOT devices that are not coupled to ambient lighting luminaire/s and ambient/egress lighting luminaire/s.

The power entering the ambient/egress lighting luminaire can be selectively controlled. A power management module is configured to sense the entering power source and to selectively decide on one of the sources to power at least one device coupled to the ambient/egress lighting luminaire. Under normal primary house power, the power management module, with or without controlling processor/controller input, can direct power to at least one ambient lighting device through a driver.

When house power is interrupted, a transfer switch switches the power source to a secondary power, and at least one emergency light source receives power through an emergency light source driver. In some embodiments, the secondary power source can supply power to at least one egress light module directly.

In addition to the light emitting devices, the ambient/egress lighting luminaire can couple to at least one processor/controller, a communication device, and a myriad of IOT devices. At least one of the IOT devices can be configured to couple to a universal receptacle that is also configured to couple to at least one emergency light source. The processor/controller receives its power from the power management module. Once power is received by the processor/controller, the processor/controller can fully govern the operation of the power management module, as the power management module under secondary power may have limited power capacity.

The processor/controller may comprise resident memory and programmed code. The programmed code modules can include charging, alerting, input/output, monitoring, testing, sensing, self-learning, predicting, communicating, and scheduling modules. According to some embodiments, the processor/controller coupled to the communication device can receive and send data to devices coupled to the ambient/egress lighting luminaire, devices in the vicinity of the ambient/egress lighting luminaire, and remote clients.

The IOT devices coupled to the ambient/egress lighting luminaire and/or located in the vicinity of the luminaire can include at least one of: a camera, an occupancy sensor, an air quality sensor, a temperature probe, a speaker/microphone, an indicator light, a signage device, and a photocell, and a test button. The processor/controller can also control the luminaire's, ambient lighting light source power input and/or color temperature. The processor/controller can partially or fully operate under primary and/or secondary power configured to control the ambient lighting luminaire devices under primary power, and under secondary power selectively control devices that are configured to protect life and property. Such capability is in addition to operating the egress light module/s.

The processor/controller can further prioritize the devices powered, based on available power disconnecting, or limiting the flow of power to coupled devices less important for life safety. According to one or more aspects of the disclosed subject matter, the processor/controller can be configured to periodically test at least one of the devices coupled to the ambient/egress lighting luminaire. The testing can include the secondary power source storage device, the charger, and the egress light module/s.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. An apparatus comprising:

a microswitch; and a light source having an optical lens that directs light toward a surface below in a light source pattern that includes at least one of a linear symmetrical pattern and a linear asymmetrical pattern;

a retaining housing;

a reduced form light emitting device coupled to a surface of the retaining housing, the reduced form light emitting device is configured to horizontally rotate about a vertical axis thereof;

processing circuitry that is configured by execution of computer code to perform control operations, the processing circuitry including an addressable processor, a wireless communication transceiver, and a controllable microswitch, wherein the processing circuitry is electrically in communication with the wireless communication transceiver, the light source, and the controllable microswitch, the processing circuitry is configured to perform two-way communication with a remote client via the wireless communication transceiver, and in response to the processing circuitry triggering the microswitch to be placed in an ON state, the light source receives electrical power and emits light.

2. The apparatus of claim 1, wherein the processing circuitry controls a current flow from backup power to the light source under a condition that house power fails.

3. The apparatus of claim 1, wherein the reduced form light emitting device is detachably attached to the retaining housing.

4. The apparatus of claim 1, further comprising a mechanical device configured to restrain a rotational mobility of the reduced form light emitting device.

5. The apparatus of claim 1, further comprising a coupling device that couples the reduced form light emitting device to the retaining housing is configured to convey power or power and signal.

6. The apparatus of claim 1, wherein another light source other than the light source is also coupled to the reduced form light emitting device and is in electrical communication with the microswitch.

7. The apparatus of claim 1, further comprising a sensor that is coupled to at least one of the reduced form light emitting device and the retaining housing.

8. An apparatus comprising:

a microswitch; and a light source having an optical lens that directs light toward a surface below in a light source pattern that includes at least one of a linear symmetrical pattern and a linear asymmetrical pattern;

a retaining housing;

a reduced form light emitting device coupled to a first electrical receptacle disposed in a surface of the retaining housing, the reduced form light emitting device is configured to horizontally rotate about a vertical axis thereof;

processing circuitry that is configured by execution of computer code to perform control operations, the processing circuitry being coupled to the retaining surface and including an addressable processor, a wireless communication transceiver, a controllable microswitch, the first electrical receptacle, and a second electrical receptacle, wherein the processing circuitry is electrically in communication with the wireless communication transceiver, the light source, and the controllable microswitch, the processing circuitry is configured to communicate with a remote client via the wireless communication transceiver and receive input from a sensor coupled to the second electrical receptacle or coupled to the retaining housing, and the processing circuitry is configured to react to input from at least one of the remote client or the sensor by triggering the microswitch to be placed in an ON state so the light source receives electrical power and emits light.

9. The apparatus of claim 8, further comprising a back-up power supply electrically coupled to at least one of the wireless communication transceiver, the processing circuitry, and the microswitch.

10. The apparatus of claim 9, wherein the back-up power is configured to supply power to the apparatus until a remotely located backup power source energizes at least the apparatus.

11. The apparatus of claim 8, wherein the sensor is at least one of a camera, an occupancy sensor, a microphone, a speaker, a thermal sensor, an air quality/smoke sensor, a radiation sensor, a gaseous sensor, and a vibration sensor.

12. The apparatus of claim 8, wherein the processing circuitry is programmably configured to operate in an emergency mode and a non-emergency operational mode.

13. The apparatus of claim 8, wherein the processing circuitry is configured to operate in an emergency mode of operating in which the processing circuitry conveys locally a sensed condition to the remote client.

14. The apparatus of claim 8, wherein the processing circuitry is configured to implement a self-test of egress lighting and communicate a diagnostic result to the remote client.

15. An apparatus comprising:

a microswitch; and a first light source having an optical lens that directs light toward a surface below in a light source pattern that includes at least one of a linear symmetrical pattern and a linear asymmetrical pattern;

a second light source configured to provide ambient area illumination;

a retaining housing;

a reduced form light emitting device coupled to a first power/data receptacle disposed in a surface of the retaining housing, the reduced form light emitting device is configured to horizontally rotate about a vertical axis thereof;

processing circuitry that is configured by execution of computer code to perform control operations, the processing circuitry being coupled to the retaining surface and including an addressable processor, a wireless communication transceiver, a controllable microswitch, the first power/data receptacle, and a second power/data receptacle that hosts a non-lit sensing device, wherein the processing circuitry is electrically in communication with the wireless communication transceiver, the first power/data receptacle, the second power/data receptacle, and the controllable microswitch, the processing circuitry is configured to bi-directionally communicate with a remote client via the wireless communication transceiver and at least receives input from a sensor physically coupled to the apparatus, and the processing circuitry is configured to react to input from at least one of the remote client or the sensor by triggering the microswitch to be placed in an ON state so the first light source receives electrical power and emits light for egress lighting.

16. The apparatus of claim 15, wherein the processing circuitry is configured to be prompted by receipt of a message from the remote client to perform scheduled egress lighting operational condition diagnostics.

17. The apparatus of claim 15, further comprising an audio device configured to provide audio information under control of the processing circuitry.

18. The apparatus of claim 15, wherein input received by the processing circuitry from a coupled camera dictates the processing circuitry to alter an illuminated direction of egress toward a legal egress door.

19. The apparatus of claim 15, wherein input received by the processing circuitry from a coupled camera is transmitted by the processing circuitry to a first responder.

20. The apparatus of claim 15, wherein input received by the processing circuitry from a coupled camera is processed by the processing circuitry to ascertain a risk level to an occupant.

* * * * *